United States Patent
Wang et al.

(10) Patent No.: US 9,537,542 B2
(45) Date of Patent: Jan. 3, 2017

(54) METHOD FOR PROCESSING INFORMATION AND ELECTRONIC DEVICE

(71) Applicants: Beijing Lenovo Software Ltd., Beijing (CN); Lenovo (Beijing) Co., Ltd., Beijing (CN)

(72) Inventors: Yan Wang, Beijing (CN); Hong Cheng, Beijing (CN); Xuexia Li, Beijing (CN); Hai Lu, Beijing (CN); Jie Yang, Beijing (CN); Qiang Zhang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 92 days.

(21) Appl. No.: 14/585,937

(22) Filed: Dec. 30, 2014

(65) Prior Publication Data

US 2015/0317024 A1    Nov. 5, 2015

(30) Foreign Application Priority Data

May 4, 2014    (CN) .......................... 2014 1 0184590
Jun. 19, 2014   (CN) .......................... 2014 1 0276991
Jul. 22, 2014   (CN) .......................... 2014 1 0350701
Aug. 22, 2014   (CN) .......................... 2014 1 0418031

(51) Int. Cl.
*G06F 3/041*    (2006.01)
*H04B 5/00*     (2006.01)
*G01D 18/00*    (2006.01)

(52) U.S. Cl.
CPC ........... *H04B 5/0081* (2013.01); *G06F 3/0416* (2013.01); *H04B 5/0031* (2013.01); *H04B 5/0056* (2013.01); *G01D 18/00* (2013.01)

(58) Field of Classification Search
CPC ........ G01D 18/00; G06F 3/0416; G06F 21/10; H04B 5/0056; H04B 5/0031; H04B 5/0081
USPC .......................... 340/10.3; 345/174; 702/104
See application file for complete search history.

(56) References Cited

U.S. PATENT DOCUMENTS

2013/0174223 A1*  7/2013  Dykeman ............... G06F 21/10
                                                        726/4
2014/0244198 A1*  8/2014  Mayer .................... G01D 18/00
                                                        702/104

* cited by examiner

*Primary Examiner* — Ali Neyzari
(74) *Attorney, Agent, or Firm* — Harness, Dickey & Pierce, P.L.C.

(57) ABSTRACT

A method for processing information and an electronic device are provided. The method includes: sending a first instruction to a second electronic device through a radio frequency identification unit to inquire identification information of the second electronic device; acquiring the identification information of the second electronic device; and obtaining position information of the second electronic device according to the identification information of the second electronic device. With the disclosure, a more enriched usage scene for man-machine interaction is provided, and user experience is improved.

22 Claims, 30 Drawing Sheets

METHOD FOR PROCESSING INFORMATION AND ELECTRONIC DEVICE

CROSS-REFERENCES TO RELATED APPLICATIONS

The present application claims the priority to Chinese Patent Application 201410184590.8, entitled "METHOD FOR PROCESSING INFORMATION, ELECTRONIC DEVICE AND SYSTEM", filed with the Chinese State Intellectual Property Office on May 4, 2014, the priority to Chinese Patent Application No. 201410276991.6, entitled "POSITIONING METHOD AND ELECTRONIC DEVICE", field with the Chinese State Intellectual Property Office on Jun. 19, 2014, the priority to Chinese Patent Application No. 201410350701.8, entitled "INTERACTION METHOD AND ELECTRONIC DEVICE", field with the Chinese State Intellectual Property Office on Jul. 22, 2014, and the priority to Chinese Patent Application No. 201410418031.9, entitled "METHOD FOR PROCESSING INFORMATION AND ELECTRONIC DEVICE", field with the Chinese State Intellectual Property Office on Aug. 22, 2014 which are incorporated herein by reference in their entireties.

FIELD

The present disclosure relates to the near-field communication technology in the field of communication, and in particular to a method for processing information and an electronic device.

BACKGROUND

In an electronic device including a capacitive touch screen, a direct interaction between a man and a machine is more and more widely adopted, such as operation of a finger on a touch screen. However, it is necessary for the electronic device to provide more enriched interaction scene sometimes, so that the electronic device can sense a type and a location of an entity on a capacitive touch screen. For example, a user can control a screen of the electronic device to display a chessboard, and then place a chessman on the chessboard, and thus the electronic device can sense the location and the type of the chessman.

SUMMARY

In view of this, it is an object of the disclosure to provide a method for processing and an electronic device, for providing a more enriched usage scene for man-machine interaction and improving user experience.

It is provided a method for processing information according to the embodiments of the disclosure, which is applicable to a first electronic device. The method includes:
sending a first instruction to a second electronic device through a radio frequency identification unit to inquire identification information of the second electronic device;
acquiring the identification information of the second electronic device; and
obtaining position information of the second electronic device according to the identification information of the second electronic device.

It is provided an electronic device according to the embodiments of the disclosure. The electronic device includes: a radio frequency identification unit, one or more processors and memory having instructions stored thereon, the instructions, when executed by the one or more processors, cause the processors to perform operations including:
sending a first instruction to a second electronic device through the radio frequency identification unit to inquire identification information of the second electronic device;
acquiring the identification information of the second electronic device; and
obtaining position information of the second electronic device according to the identification information of the second electronic device.

DETAILED DESCRIPTION

The disclosure will be described in further detail in conjunction with the drawings and embodiments.

Figure 1:
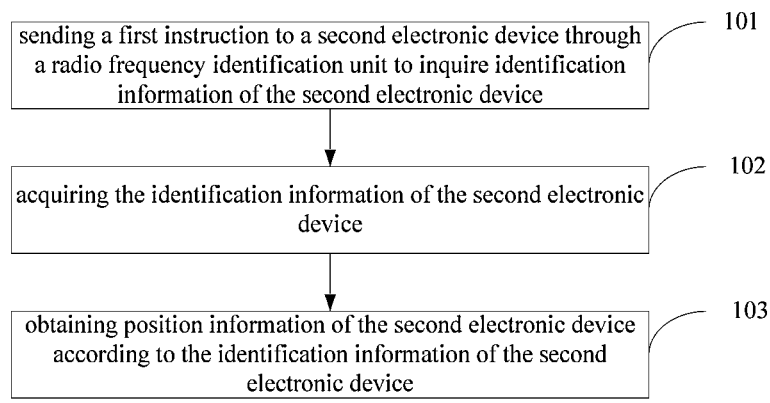
FIG. 1 is a schematic flowchart of a method for processing information according to an embodiment of the disclosure.

It is provided a method for processing information according to an embodiment of the disclosure, which is applicable to a first electronic device, as shown in FIG. 1, the method includes:

Step 101 including: sending a first instruction to a second electronic device through a radio frequency identification unit to inquire identification information of the second electronic device;

Step 102 including: acquiring the identification information of the second electronic device; and Step 103 including: obtaining position information of the second electronic device according to the identification information of the second electronic device.

Figure 2:
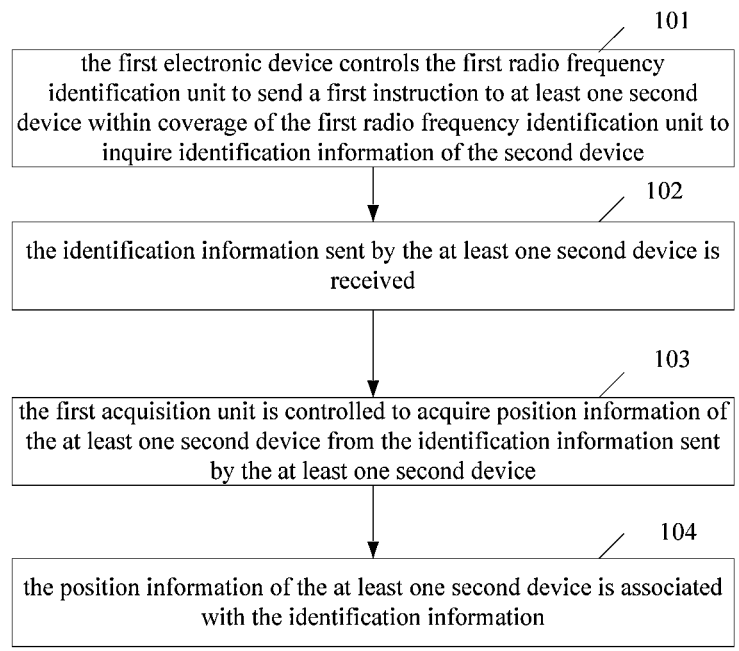
FIG. 2 is a schematic flowchart of a method for processing information on a side of a first electronic device according to an embodiment of the disclosure.

It is provided a method for processing information according to an embodiment of the disclosure, which is applicable to a first electronic device including a first radio frequency identification unit and a first acquisition unit. As shown in FIG. 2, the method includes steps 201 to 204 as follows.

In step 201, the first electronic device controls the first radio frequency identification unit to send a first instruction to at least one second device within coverage of the first radio frequency identification unit to inquire identification information of the second device.

In step 202, the identification information sent by the at least one second device is received.

In step 203, the first acquisition unit is controlled to acquire position information of the at least one second device from the identification information sent by the at least one second device.

In step 204, the position information of the at least one second device is associated with the identification information.

Here, the first radio frequency identification unit may be a unit capable of sending a radio frequency signal of Radio Frequency IDentification (RFID). For example, the first radio frequency identification unit may include a RFID antenna 22 as shown in FIG. 3, and may also include a reader.

Figure 4:
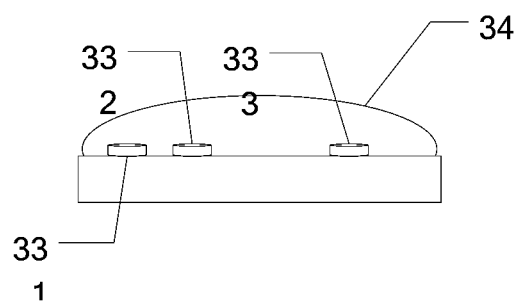
FIG. 4 is a schematic top view of a position relation between a first electronic device and a second device according to an embodiment of the disclosure.

Further, the coverage of the first radio frequency identification unit may be the coverage 34 as shown in FIG. 4, i.e., within a upper surface of the first electronic device.

Figure 3:
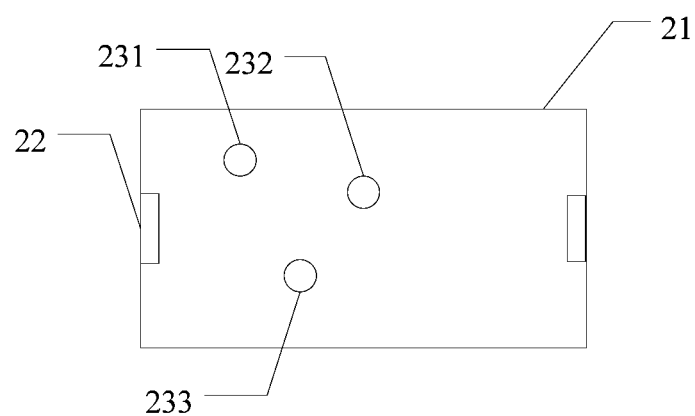
FIG. 3 is a schematic top view of a position relation between a first electronic device and a second device according to an embodiment of the disclosure.

The at least one second device may be a tag in the RFID technique, which may be an active tag or a passive tag, such as a first tag 231, a second tag 232 or a third tag 233 as shown in FIG. 3.

The first instruction may be a radio frequency signal at a preset frequency sent by the first radio frequency identification unit. The radio frequency signal may functions to instruct the at least one second device to return the identification information of the at least one second device by announcing that the at least one second device has entered into magnetic field coverage of the first radio frequency identification unit. The preset frequency may be set according to the actual condition, which is not described in detail here.

The first acquisition unit may be a capacitive touch screen of the first electronic device.

The associating may be pairing and storing the position information and the identification.

Preferably, the above step 201 may be performed periodically. For example, if the first electronic device is adopted by a user to perform an interaction operation, such as play chess, step 201 may be performed in every 20 seconds, and thereby it can be ensured that the current number of the second device and the corresponding position information are updated in a real-time manner.

It can be understood that the old position information of the second device may be deleted if new position information of the same second device is acquired, and only the most recently acquired position information is associated with the identification information. By recording the time when the position information is acquired, the position information of the second device that is acquired most recently is identified. Alternatively, the number of the position information to be saved may be set. For example, it may be set to save only the position information that is acquired the last three times.

Figure 5:
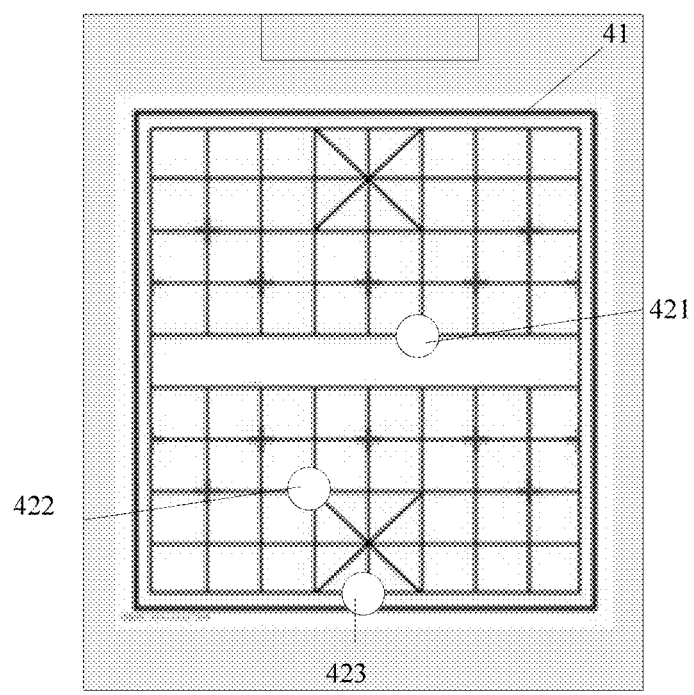
FIG. 5 is a schematic diagram of a usage scene according to an embodiment of the disclosure.

A usage scene of this embodiment will be described below. As shown in FIG. 5, it is assumed that the first electronic device includes a large-size capacitive touch screen, a chessboard 41 is displayed in a display area of the first electronic device, and three second devices each are the chesses.

Firstly, the first electronic device sends a first instruction to the three second devices via the first radio frequency identification unit.

Three pieces of identification information returned by the three second devices are received.

It is identified by the first electronic device based on the identification information returned by the three second devices that the three second devices are respectively a second device A 421, a second device B 422 and a second device C 423.

Then, the first electronic device acquires the position information of the three second devices individually.

Then, for each of the three second devices, the position information is associated with the identification information, and thereby the first electronic device can determine the positions of the second device A 421, the second device B 422 and the second device C 423 finally.

It can be seen that with the above solution, the first electronic device identifies the identification information of the second device, acquires the position of the second device with respect to the first acquisition unit, associates the identification information of the second device with the position information, and obtains the operation performed by the user using the second device. Thus, a more enriched usage scene for man-machine interaction is provided, and user experience is improved.

Figure 6:
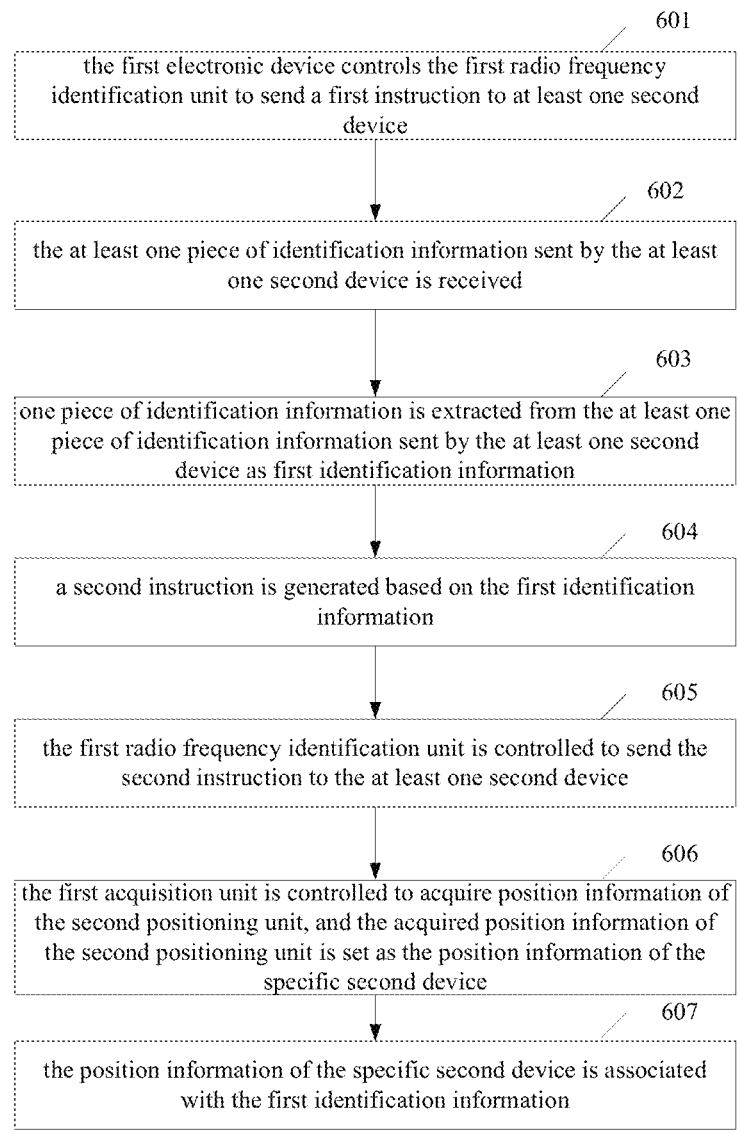
FIG. 6 is a schematic flowchart of a method for processing information on a side of a first electronic device according to a second embodiment of the disclosure.

It is provided a method for processing information according to an embodiment of the disclosure, which is applicable to a first electronic device including a first radio frequency identification unit and a first acquisition unit. As shown in FIG. 6, the method includes steps 601 to 607 as follows.

In step 601, the first electronic device controls the first radio frequency identification unit to send a first instruction to at least one second device within coverage of the first radio frequency identification unit to inquire at least one piece of identification information.

In step 602, the at least one piece of identification information sent by the at least one second device is received.

In step 603, one piece of identification information is extracted from the at least one piece of identification information sent by the at least one second device as first identification information.

In step 604, a second instruction is generated based on the first identification information.

In step 605, the first radio frequency identification unit is controlled to send the second instruction to the at least one second device within the coverage of the first radio frequency unit, the at least one second device judges whether the first identification information in the second instruction matches the identification information of itself, where a specific second device activates a second positioning unit of the specific second device in a case that the first identification information matches the identification information of the specific second device.

In step 606, the first acquisition unit is controlled to acquire position information of the second positioning unit, and the acquired position information of the second positioning unit is set as the position information of the specific second device.

In step 607, the position information of the specific second device is associated with the first identification information.

It can be understood here that the above steps 603 to 607 are performed in a circular manner, until the identification information of each of the at least one second devices is associated with the corresponding position information of the second device.

The first radio frequency identification unit may be a unit capable of sending a radio frequency signal of Radio Frequency IDentification (RFID). For example, the first radio frequency identification unit may include a RFID antenna 22 as shown in FIG. 3, and may also include a reader.

Further, the coverage of the first radio frequency identification unit may be the coverage 34 as shown in FIG. 4, i.e., within a upper surface of the first electronic device.

The at least one second device may be a tag in the RFID technique, which may be an active tag or a passive tag, such as a first tag 231, a second tag 232 or a third tag 233 as shown in FIG. 3.

Preferably, the first instruction may be a radio frequency signal at a preset frequency sent by the first radio frequency identification unit. The radio frequency signal may functions to instruct the at least one second device to return the identification information of the at least one second device by announcing that the at least one second device has entered into magnetic field coverage of the first radio frequency identification unit. The preset frequency may be set according to the actual condition, which is not described in detail here.

The first acquisition unit may be a capacitive touch screen of the first electronic device.

The process of generating a second instruction based on the first identification information may include a process of modulating the first identification information as a radio frequency instruction at a preset frequency in a preset modulation mode. The preset modulation mode is used in the RFID technique, such as OOK modulation, BPSK modulation, ASK modulation with any modulation factor, or PR-ASK modulation, which is not defined in detail here.

Optionally, the above step 601 may be performed periodically. For example, if the first electronic device is adopted by a user to perform an interaction operation, such as play chess, step 601 may be performed in every 20 seconds, and thereby it can be ensured that the current number of the second device and the corresponding location information are updated in a real-time manner.

It can be understood that the old position information of the second device may be deleted if new position information of the same second device is acquired, and only the most recently acquired position information is associated with the identification information. By recording the time when the position information is acquired, the position information of the second device that is acquired most recently is identified. Alternatively, the number of the pieces of position information to be saved may be set. For example, it may be set to save only the position information that is acquired the last three times.

The process of extracting one piece of identification information from the at least one of piece of identification information sent by the at least one second device as first identification information may include: extracting the identification information individually as the first identification information in a descending order of the time instants at which the identification information is acquired; or extracting the identification information individually as the first identification information in a descending order of the sizes of the identification information; or extracting the un-extracted identification information as the first identification information with no specified extraction order.

This embodiment will be described by still taking the scene in the first embodiment as an example. As shown in FIG. 5, the first electronic device includes a large-size capacitive touch screen, a chessboard 41 is displayed in a display area of the first electronic device, and three second devices each are the chesses.

Firstly, the first electronic device sends a first instruction to the three second devices via the first radio frequency identification unit.

Three pieces of identification information returned by the three second devices are received.

It is identified by the first electronic device based on the identification information returned by the three second devices that the three second devices are respectively a pawn 421, a second device B 422 and a second device C 423.

Then, the first electronic device extracts one piece of identification information from the at least one of identification information sent by the three devices as first identification information. In this embodiment, the description is given by taking the identification information corresponding to the "pawn" 421 as the first identification information.

A second instruction is generated based on the first identification information.

A second instruction is sent by the first radio frequency identification unit. In this case, the three devices, i.e., the pawn 421, the second device B 422 and the second device C 423, each receives the second instruction, and only the pawn 421 judges that the first identification information in the second instruction matches its identification information, thus the second device pawn 421 activates its second positioning unit.

The first obtaining unit obtains position information of the second positioning unit.

The position information of the second device pawn 421 is associated with the identification information of the second device pawn 421.

Then, by following the above procedure, the first electronic device obtains the position information of the other two second devices and associates the position information with the identification information.

It can be seen that with the above solution, the first electronic device identifies the identification information of the second device, acquires the position of the second device with respect to the first acquisition unit, associates the identification information of the second device with the position information, and acquires the operation performed by the user using the second device. Thus, a more enriched usage scene for man-machine interaction is provided, and user experience is improved.

Figure 7:
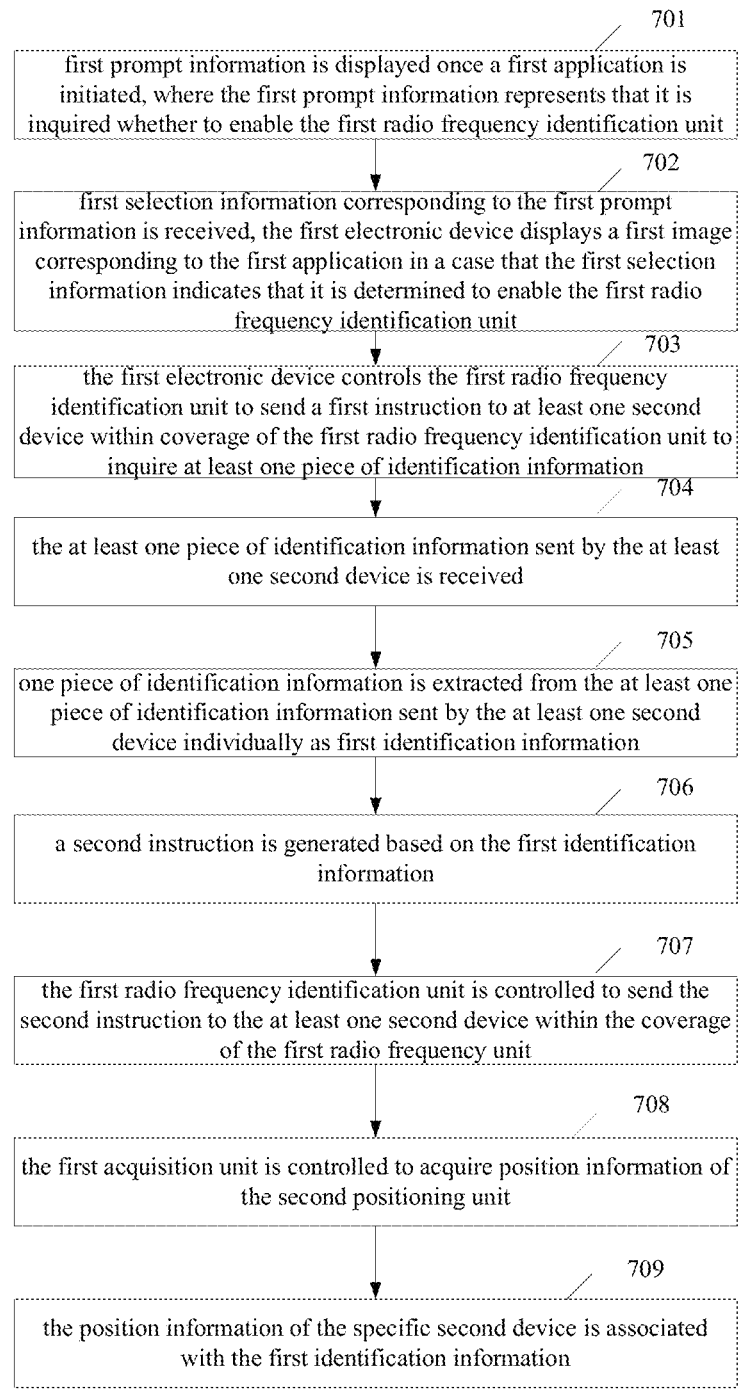
FIG. 7 is a schematic flowchart of a method for processing information on a side of a first electronic device according to a third embodiment of the disclosure.

It is provided a method for processing information according to an embodiment of the disclosure, which is applicable to a first electronic device including a first radio frequency identification unit and a first acquisition unit. As shown in FIG. 7, the method includes steps 701 to 709 as follows.

In step 701, first prompt information is displayed once a first application is initiated, where the first prompt information represents that it is inquired whether to enable the first radio frequency identification unit.

In step 702, first selection information corresponding to the first prompt information is received, the first electronic device displays a first image corresponding to the first application in a case that the first selection information indicates that it is determined to enable the first radio frequency identification unit.

In step 703, the first electronic device controls the first radio frequency identification unit to send a first instruction to at least one second device within coverage of the first radio frequency identification unit to inquire at least one piece of identification information.

In step 704, the at least one piece of identification information sent by the at least one second device is received.

In step 705, one piece of identification information is extracted from the at least one piece of identification information sent by the at least one second device individually as first identification information.

In step 706, a second instruction is generated based on the first identification information.

In step 707, the first radio frequency identification unit is controlled to send the second instruction to the at least one second device within the coverage of the first radio frequency unit, the at least one second device judges whether the first identification information in the second instruction matches the identification information of itself, where a specific second device activates a second positioning unit of the specific second device in a case that the first identification information matches the identification information of the specific second device.

In step 708, the first acquisition unit is controlled to acquire position information of the second positioning unit, and the acquired position information of the second positioning unit is set as the location information of the specific second device.

In step 709, the position information of the specific second device is associated with the first identification information.

It can be understood here that the above steps 705 to 709 are performed in a circular manner, until the identification information of each of the at least one second devices is associated with the corresponding position information of the second device.

The first prompt information may be used for inquiring the user whether to enable the first radio frequency function when the user initiates the first application and the first application needs to enable the first radio frequency function. The first application may be an application to be implemented by interaction between multiple second devices, such as an application of a chess function to be implemented by the chessboard displayed on the touch screen together with multiple second devices.

Accordingly, the process of displaying a first image by the first electronic device may include: displaying an image according to the initiated first application, such as the chessboard 41 in FIG. 5.

The first radio frequency identification unit may be a unit capable of sending a radio frequency signal of Radio Frequency IDentification (RFID). For example, the first radio frequency identification unit may include a RFID antenna 22 as shown in FIG. 3, and may also include a reader.

Further, the coverage of the first radio frequency identification unit may be the coverage 34 as shown in FIG. 4, i.e., within a upper surface of the first electronic device.

The at least one second device may be a tag in the RFID technique, which may be an active tag or a passive tag, such as a first tag 231, a second tag 232 or a third tag 233 as shown in FIG. 2.

Preferably, the first instruction may be a radio frequency signal at a preset frequency sent by the first radio frequency identification unit. The radio frequency signal may functions to instruct the at least one second device to return the at least one piece of identification information by announcing that the at least one second device has entered into magnetic field coverage of the first radio frequency identification unit. The preset frequency may be set according to the actual condition, which is not described in detail here.

The first acquisition unit may be a capacitive touch screen of the first electronic device.

The process of generating a second instruction based on the first identification information may include a process of modulating the first identification information as a radio frequency instruction at a preset frequency in a preset modulation mode. The preset modulation mode is used in the RFID technique, such as OOK modulation, BPSK modulation, ASK modulation with any modulation factor, or PR-ASK modulation, which is not defined in detail here.

Preferably, the above step 703 may be performed periodically. For example, if the first electronic device is adopted by a user to perform an interaction operation, such as play chess, step 703 may be performed by setting 20 seconds as a cycle, and thereby it can be ensured that the current number of the second device and the corresponding position information are updated in a real-time manner.

It can be understood that the old position information of the second device may be deleted if new position information of the same second device is acquired, and only the most recently acquired position information is associated with the identification information. By recording the time when the position information is acquired, the position information of the second device that is acquired most recently is identified. Alternatively, the number of the pieces of position information to be saved may be set. For example, it may be set to save only the position information that is acquired the last three times.

The process of extracting identification information from the identification information sent by the at least one second device individually as first identification information may include: extracting the identification information individually as the first identification information in a descending order of the time instants at which the identification information is acquired; or extracting the identification information individually as the first identification information in a descending order of the sizes of the identification information; or extracting the un-extracted identification information as the first identification information with no specified extraction order.

This embodiment will be described by still taking the scene in the first embodiment as an example. As shown in FIG. 5, it is assumed that the first electronic device includes a large-size capacitive touch screen, a chessboard 41 is displayed in a display area of the first electronic device, and three second devices each are the chesses.

Firstly, the user selects to initiate the first application, which is an application for displaying a chessboard for playing chess by the user using multiple second devices.

The first prompt information is displayed, for inquiring the user whether to enable the first radio frequency identification unit.

If the user judges that the first radio frequency identification unit is to be enabled, a first image, i.e., the chessboard 41, is displayed.

Then, the first electronic device sends a first instruction to the three second devices via the first radio frequency identification unit.

Three pieces of identification information returned by the three second devices are received.

It is identified by the first electronic device based on the identification information returned by the three second devices that the three second devices are respectively a pawn 421, a second device B 422 and a second device C 423.

The first electronic device extracts one piece of identification information from the three pieces of identification information sent by the three devices as first identification information. In this embodiment, the description is given by taking the identification information corresponding to the "pawn" 421 as the first identification information.

A second instruction is generated from the first identification information.

A second instruction is sent by the first radio frequency identification unit. In this case, the three devices, i.e., the pawn 421, the second device B 422 and the second device C 423, each receive the second instruction, and only the pawn 421 judges that the first identification information in the second instruction matches its identification information, thus the second device pawn 421 activates its second positioning unit.

The first acquisition unit acquires position information of the second positioning unit of the pawn 421.

The position information of the second device pawn 421 is associated with the identification information of the second device pawn 421.

By following the above procedure, the first electronic device acquires the position information of the other two second devices and associates the position information with the identification information.

It can be seen that with the above solution, the first electronic device identifies the identification information of the second device, acquires the position of the second device with respect to the first acquisition unit, associates the identification information of the second device with the position information, and obtains the operation performed by the user using the second device. Thus, a more enriched usage scene for man-machine interaction is provided, and user experience is improved.

Figure 8:
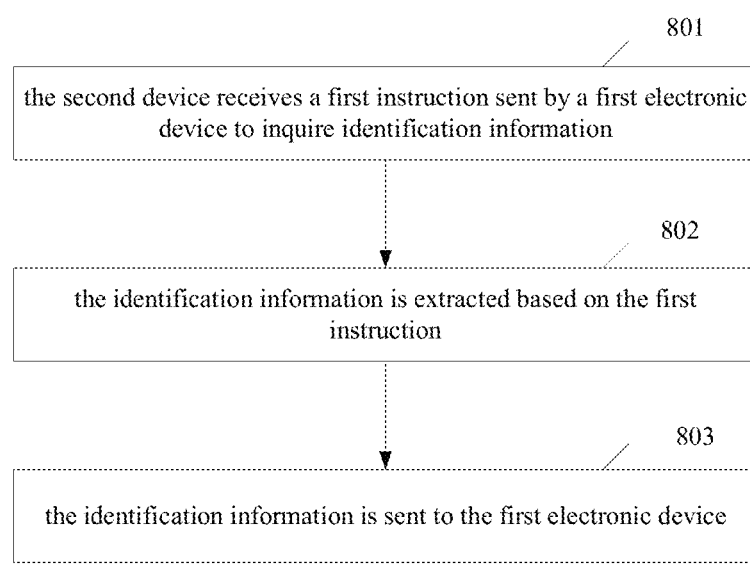
FIG. 8 is a schematic flowchart of a method for processing information on a side of a second device according to a first embodiment of the disclosure.

It is provided a method for processing information according to an embodiment of the disclosure, which is applicable to a second device. As shown in FIG. 8, the method includes steps 801 to 803 as follows.

In step 801, the second device receives a first instruction sent by a first electronic device to inquire identification information.

In step 802, the identification information is extracted based on the first instruction.

In step 803, the identification information is sent to the first electronic device, where the first electronic device acquires position information of the second device based on the identification information and associates the position information of the second device with the identification information.

Here, the second device may be a tag in the RFID technique, which may be an active tag or a passive tag, such as a first tag 231 as shown in FIG. 3.

The first instruction may be a radio frequency signal at a preset frequency. The radio frequency signal may functions to announce that the second device enters into the coverage of the magnetic field of the first electronic device. The preset frequency may be set according to the actual condition, which is not described in detail here.

The identification information is information preset in the second device for uniquely identifying the second device, and may be coding information.

It can be seen that with the above solution, the electronic device sending the first instruction senses the type and position of an entity on the touch screen of the electronic device. Thus, a more enriched usage scene for man-machine interaction is provided, and user experience is improved.

Figure 9:
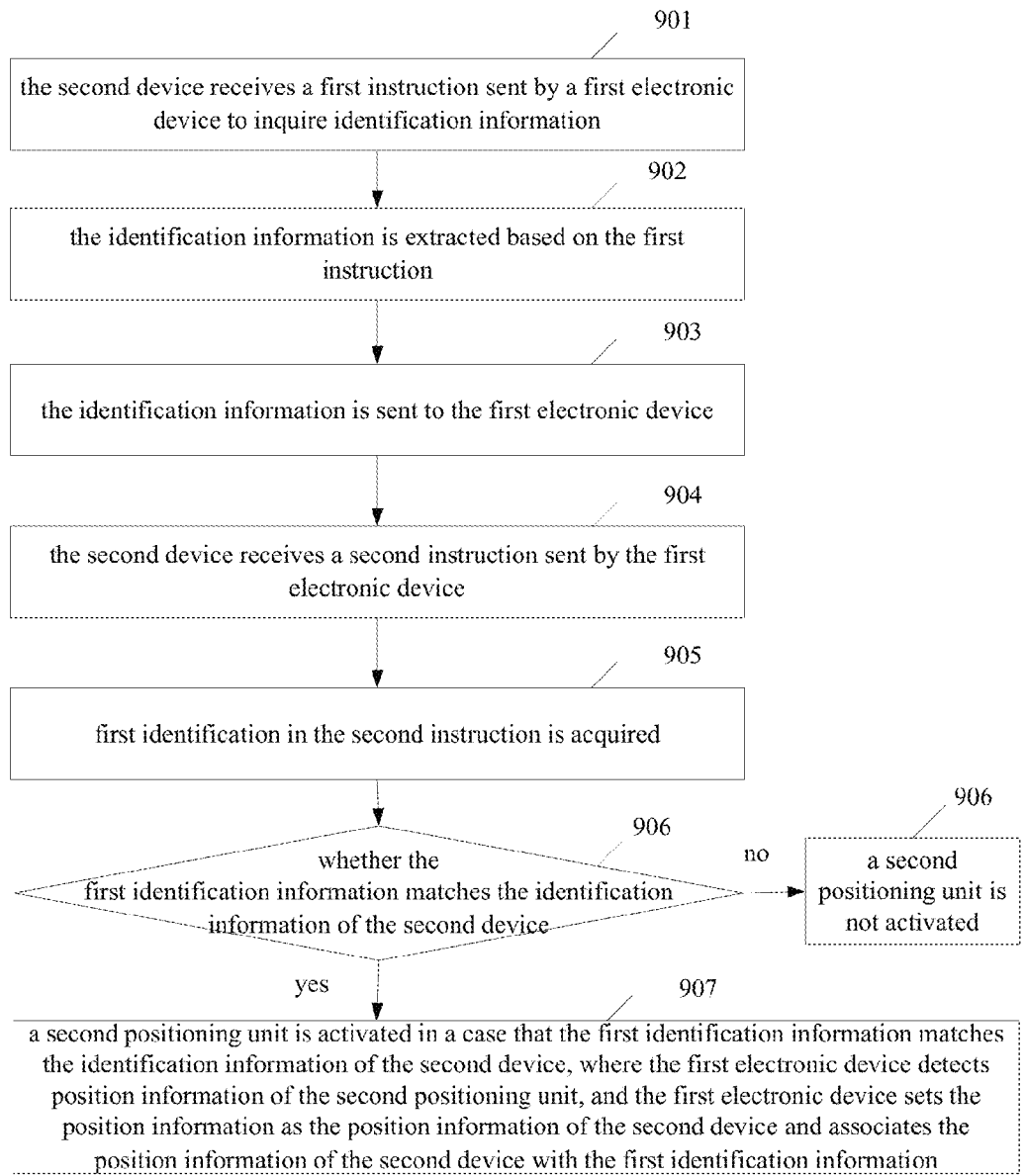
FIG. 9 is a schematic flowchart of a method for processing information on a side of a second device according to a second embodiment of the disclosure.

It is provided a method for processing information according to an embodiment of the disclosure, which is applicable to a second device. As shown in FIG. 9, the method includes steps 901 to 907 as follows.

In step 901, the second device receives a first instruction sent by a first electronic device to inquire identification information.

In step 902, the identification information is extracted based on the first instruction.

In step 903, the identification information is sent to the first electronic device.

In step 904, the second device receives a second instruction sent by the first electronic device.

In step 905, first identification in the second instruction is acquired.

In step 906, it is judged whether the first identification information matches the identification information of the second device, where step 804 is performed without activating the second positioning unit in a case that the first identification information mismatches with the identification information of the second device; or else, step 907 is performed.

In step 907, a second positioning unit is activated in a case that the first identification information matches the identification information of the second device, where the first electronic device detects position information of the second positioning unit, and the first electronic device sets the position information as the position information of the second device and associates the position information of the second device with the first identification information.

Here, the second device may be a tag in the RFID technique, which may be an active tag or a passive tag, such as a first tag 231 as shown in FIG. 3.

The first instruction may be a radio frequency signal at a preset frequency. The radio frequency signal may functions to announce that the second device enters into the coverage of the magnetic field of the first electronic device. That is to say, the second device receives the first instruction sent by the first electronic device once the second device senses that the second device enters into the coverage of the magnetic field of the RFID antenna. The preset frequency may be set according to the actual condition, which is not described in detail here.

The identification information is information preset in the second device for uniquely identifying the second device, and may be coding information.

The second instruction may be a radio frequency instruction at a preset frequency generated by modulating the identification information in a preset modulation mode. The preset modulation mode is used in the RFID technique, such as OOK modulation, BPSK modulation, ASK modulation with any modulation factor, or PR-ASK modulation, which is not defined in detail here.

Accordingly, the process of acquiring the first identification information in the second instruction may be demodulating the second instruction in a demodulation mode corresponding to the modulation mode to obtain the first identification information.

The matching may be that the first identification information is identical to the identification information stored in the second device.

This embodiment will be described below. As shown in FIG. 5, the first electronic device includes a large-size capacitive touch screen, a chessboard 41 is displayed in a display area of the first electronic device, and the second device in this embodiment may be the second device C 423 in FIG. 5.

Firstly, the second device receives the first instruction, extracts the identification of the second device based on the first instruction, and sends the identification information to the first electronic device.

Then, the second device receives the second instruction sent by the first electronic device.

The first identification is extracted from the second instruction.

It is judged whether the first identification information matches the identification information stored in the second device, the second positioning unit is enabled in a case of a positive determination, where the first electronic device acquires the location information of the second device and associates the location information with the identification information.

It can be seen that with the above solution, the electronic device sending the first instruction senses the type and position of an entity on the touch screen of the electronic device. Thus, a more enriched usage scene for man-machine interaction is provided, and user experience is improved.

Figure 10:
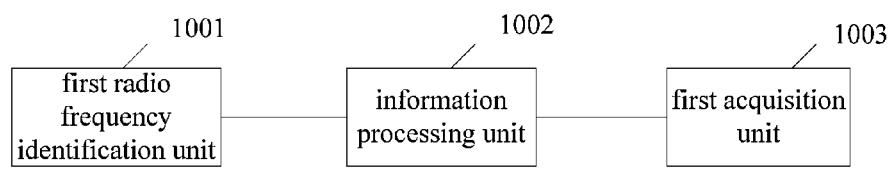
FIG. 10 is a schematic structural diagram of an electronic device according to an embodiment of the disclosure.

It is provided an electronic device according to an embodiment of the disclosure. As shown in FIG. 10, the electronic device includes a first radio frequency identification unit 1001, an information processing unit 1002 and a first acquisition unit 1003.

The first radio frequency identification unit 1001 is configured to send a first instruction to at least one second device within coverage of the first radio frequency identification unit to inquire identification information, and receive the identification information sent by the at least one second device.

The information processing unit 1002 is configured to control the first acquisition unit to operate, and associate position information of the at least one second device with the identification information.

The first acquisition unit 1003 is configured to acquire the position information of the at least one second device under the control of the information processing unit.

Here, the first radio frequency identification unit may include a RFID antenna, and may also include a reader.

Further, the coverage of the first radio frequency identification unit may be the coverage 34 as shown in FIG. 4, i.e., within a upper surface of the first electronic device.

The at least one second device may be a tag in the RFID technique, which may be an active tag or a passive tag, such as a first tag 231, a second tag 232 or a third tag 233 as shown in FIG. 3.

Specifically, the first radio frequency identification unit 1001 is configured to take a process of sending a radio frequency signal at a preset frequency as the first instruction. The radio frequency signal may functions to instruct the at least one second device to return the identification information of the at least one second device by announcing that the at least one second device has entered into magnetic field coverage of the first radio frequency identification unit. The preset frequency may be set according to the actual condition, which is not described in detail here.

The first acquisition unit may be a capacitive touch screen of the first electronic device.

The associating may be pairing and storing the location information and the identification.

Preferably, the first radio frequency identification unit 1001 may be configured to send the first instruction to at least one second device within coverage of the first radio frequency identification unit periodically. For example, if the first electronic device is adopted by a user to perform an interaction operation, such as play chess, the cycle may be set as 20 seconds, and thereby it can be ensured that the current number of the second device and the corresponding location information are updated in a real-time manner.

It can be understood that the old position information of the second device may be deleted if new position information of the same second device is acquired, and only the most recently acquired position information is associated with the identification information. By recording the time when the position information is acquired, the position information of the second device that is acquired most recently is identified. Alternatively, the number of the position information to be saved may be set. For example, it may be set to save only the position information that is acquired the last three times.

It can be seen that with the above solution, the first electronic device identifies the identification information of the second device, acquires the position of the second device with respect to the first acquisition unit of the second device, associates the identification information of the second device with the position information, and obtains the interaction operation performed by the user using the second device. Thus, a more enriched usage scene for man-machine interaction is provided, and user experience is improved.

It is provided an electronic device according to an embodiment of the disclosure, which includes a first radio frequency identification unit, an information processing unit and a first acquisition unit.

The first radio frequency identification unit is configured to send a first instruction to at least one second device within coverage of the first radio frequency identification unit to inquire at least one piece of identification information, and receive the at least one piece of identification information sent by the at least one second device.

The information processing unit is configured to control the first acquisition unit to operate, and associate position information of the at least one second device with the identification information.

The first acquisition unit is configured to acquire the position information of the at least one second device under the control of the information processing unit.

Specifically, the information processing unit is configured to extract one piece of identification information from the at least one piece of identification information sent by the at least one second device as first identification information, generate a second instruction based on the first identification information, and control the first radio frequency identification unit to send the second instruction to instruct the at least one second device to judge whether the first identification information in the second instruction matches the identification information of itself, where a specific second device activates a second positioning unit of the specific second device in a case that the first identification information matches the identification information of the specific second device. The information processing unit is further configured to control the first acquisition unit to acquire position information of the second positioning unit, and set the acquired position information of the second positioning unit as the position information of the specific second device. Accordingly, the first radio frequency identification unit is further configured to send the second instruction to the at least one second device within the coverage of the first radio frequency unit.

Specifically, the information processing unit is configured to associate the position information of the specific second device with the first identification information.

It can be understood here that the information processing unit is configured to perform the process of obtaining the position information of the at least one second device and associating the position information with the identification information in a circular manner, until the identification information of each of the at least one second devices is associated with the position information of the second device.

The first radio frequency identification unit may be a unit capable of sending a radio frequency signal of Radio Frequency IDentification (RFID). For example, the first radio frequency identification unit may include a RFID antenna 22 as shown in FIG. 3, and may also include a reader.

Further, the coverage of the first radio frequency identification unit may be the coverage 34 as shown in FIG. 4, i.e., within a upper surface of the first electronic device.

The at least one second device may be a tag in the RFID technique, which may be an active tag or a passive tag, such as a first tag 231, a second tag 232 or a third tag 233 as shown in FIG. 3.

Specifically, the first radio frequency identification unit 1001 is configured to set sending a radio frequency signal at a preset frequency as the first instruction. The radio frequency signal may functions to instruct the at least one second device to return the identification information of the at least one second device by announcing that the at least one second device has entered into magnetic field coverage of the first radio frequency identification unit. The preset frequency may be set according to the actual condition, which is not described in detail here.

The first acquisition unit may be a capacitive touch screen of the first electronic device.

Specifically, the information processing unit is configured to take a process of modulating the first identification information as a radio frequency instruction at a preset frequency as the second instruction in a preset modulation mode. The preset modulation mode is a modulation mode specified to be used in the RFID technique, such as OOK modulation, BPSK modulation, ASK modulation with any modulation factor, or PR-ASK modulation, which is not defined in detail here.

Preferably, the above first radio frequency identification unit may perform the process of sending the first instruction periodically. For example, if the first electronic device is adopted by a user to perform an interaction operation, such as play chess, the cycle may be set as 20 seconds, and thereby it can be ensured that the current number of the second device and the corresponding location information are updated in a real-time manner.

It can be understood that the old location information may be deleted by the information processing unit if new location information of the same second device is acquired, and only the most recently acquired location information is associated with the identification information. By recording the time when the location information is acquired, the location information of the second device that is acquired most recently is identified. Alternatively, the number of the location information to be saved may be set. For example, it may be set to save only the location information that is obtained the last three times.

Specifically, the information processing unit is configured to: extract the identification information individually as the first identification information in a descending order of the time instants at which the identification information is acquired; or extract the identification information individually as the first identification information in a descending order of the sizes of the identification information; or extract the un-extracted identification information as the first identification information with no specified extraction order.

It can be seen that with the above solution, the first electronic device identifies the identification information of the second device, acquires the location of the second device with respect to the first acquisition unit of the second device, associates the identification information of the second device with the location information, and obtains the interaction operation performed by the user using the second device. Thus, a more enriched usage scene for man-machine interaction is provided, and user experience is improved.

It is provided an electronic device according to an embodiment of the disclosure, which includes a first radio frequency identification unit, an information processing unit and a first acquisition unit.

The first radio frequency identification unit is configured to send a first instruction to at least one second device within coverage of the first radio frequency identification unit to inquire identification information, and receive the identification information sent by the at least one second device.

The information processing unit is configured to control the first acquisition unit to operate, and associate location information of the at least one second device with the identification information.

The first acquisition unit is configured to acquire the location information of the at least one second device under the control of the information processing unit.

Specifically, the information processing unit is configured to extract identification information from the identification information sent by the at least one second device individually as first identification information, generate a second instruction from the first identification information, and control the first radio frequency identification unit to send the second instruction to instruct the at least one second device to judge whether the first identification information in the second instruction matches the identification information of the at least one second device, where a specific second device activates a second positioning unit of the specific second device in a case that the first identification information matches the identification information of the specific second device. The information processing unit is further configured to control the first acquisition unit to acquire location information of the second positioning unit, and set the acquired location information of the second positioning unit as the location information of the specific second device. Accordingly, the first radio frequency identification unit is further configured to send the second instruction to the at least one second device within the coverage of the first radio frequency unit.

Specifically, the information processing unit is configured to associate the location information of the specific second device with the first identification information.

The information processing unit is further configured to display first prompt information after a first application is initiated, where the first prompt information represents that it is inquired whether to enable the first radio frequency identification unit; and receive first selection information corresponding to the first prompt information, where the first electronic device displays a first image corresponding to the first application in a case that the first selection information indicates that it is determined to enable the first radio frequency identification unit.

It can be understood here that the information processing unit is configured to perform the process of acquiring the location information of the at least one second device in a circular manner, until the identification information of each of the at least one second devices is associated with the location information of the second device.

The first prompt information described above may include: inquiring the user on whether to enable the first radio frequency function when the user initiates the first application and the first application needs to enable the first radio frequency function. The first application may be an application to be implemented by interaction between multiple second devices, such as an application of a chess function to be implemented by the chessboard displayed on the touch screen together with multiple second devices.

Accordingly, the process of displaying a first image by the first electronic device may include: displaying an image according to the initiated first application, such as the chessboard 41 in FIG. 5.

The first radio frequency identification unit may be a unit capable of sending a radio frequency signal of Radio Frequency IDentification (RFID). For example, the first radio frequency identification unit may include a RFID antenna 22 as shown in FIG. 3, and may also include a reader.

Further, the coverage of the first radio frequency identification unit may be the coverage 34 as shown in FIG. 4, i.e., within a upper surface of the first electronic device.

The at least one second device may be a tag in the RFID technique, which may be an active tag or a passive tag, such as a first tag 231, a second tag 232 or a third tag 233 as shown in FIG. 3.

Specifically, the first radio frequency identification unit is configured to take the process of sending a radio frequency signal at a preset frequency as the first instruction. The radio frequency signal may functions to instruct the at least one second device to return the identification information of the at least one second device by announcing that the at least one second device has entered into magnetic field coverage of the first radio frequency identification unit. The preset frequency may be set according to the actual condition, which is not described in detail here.

The first acquisition unit may be a capacitive touch screen of the first electronic device.

Specifically, the information processing unit is configured to take the process of modulating the first identification information as a radio frequency instruction at a preset frequency as the second instruction in a preset modulation mode. The preset modulation mode is a modulation mode specified to be used in the RFID technique, such as OOK modulation, BPSK modulation, ASK modulation with any modulation factor, or PR-ASK modulation, which is not defined in detail here.

Preferably, the above first radio frequency identification unit may be configured to perform the process of sending the first instruction periodically. For example, if the first electronic device is adopted by a user to perform an interaction operation, such as play chess, the cycle may be set as 20 seconds, and thereby it can be ensured that the current number of the second device and the corresponding location information are updated in a real-time manner.

It can be understood that the old location information may be deleted by the information processing unit if new location information of the same second device is acquired, and only the most recently acquired location information is associated with the identification information. By recording the time when the location information is acquired, the location information of the second device that is acquired most recently is identified. Alternatively, the number of the location information to be saved may be set. For example, it may be set to save only the location information that is obtained the last three times.

Specifically, the information processing unit is configured to extract the identification information individually as the first identification information in a descending order of the time instants at which the identification information is acquired; or extract the identification information individually as the first identification information in a descending order of the sizes of the identification information; or extract the un-extracted identification information as the first identification information with no specified extraction order.

This embodiment will be described below. As shown in FIG. 5 it is assumed that the first electronic device is an electronic device including a large-size capacitive touch screen, a chessboard 41 is displayed in a display area of the first electronic device, and three second devices each are the chesses.

Firstly, the user selects to initiate the first application, which is an application for displaying a chessboard for playing chess by the user using multiple second devices.

The first prompt information is displayed, for inquiring the user on whether to enable the first radio frequency identification unit.

If the user judges that the first radio frequency identification unit is to be enabled, a first image, i.e., the chessboard 41, is displayed.

Then, the first electronic device sends a first instruction to the three second devices described above via the first radio frequency identification unit.

The identification information returned by the three second devices is received.

It is identified based on the identification information returned by the three second devices that the three second devices are respectively a pawn 421, a second device B 422 and a second device C 423.

The information processing unit extracts identification information from the identification information sent by the three devices individually as first identification information. In this embodiment, the description is given by taking the identification information corresponding to the "pawn" 421 as the first identification information.

A second instruction is generated from the first identification information.

A second instruction is sent by the first radio frequency identification unit. In this case, the three devices, i.e., the pawn 421, the second device B 422 and the second device C 423, each receive the second instruction, and only the pawn 421 judges that the first identification information in the second instruction matches its identification information, thus the second device pawn 421 activates its second positioning unit.

The first acquisition unit acquires location information of the second positioning unit of the pawn 421.

The location information of the second device pawn 421 is associated with the identification information of the second device pawn 421.

By following the above procedure, the location information of the other two second devices is acquired and the location information is associated with the identification information.

It can be seen that with the above solution, the first electronic device identifies the identification information of the second device, acquires the location of the second device with respect to the first acquisition unit of the second device, associates the identification information of the second device with the location information, and obtains the interaction operation performed by the user using the second device. Thus, a more enriched usage scene for man-machine interaction is provided, and user experience is improved.

Figure 11:
FIG. 11 is a schematic structural diagram of a device according to a first embodiment of the disclosure.

It is provided a device according to an embodiment of the disclosure. As shown in FIG. 11, the device includes a second radio frequency identification unit 1101 and a control storage unit 1102.

The second radio frequency identification unit 1101 is configured to receive a first instruction sent by a first electronic device to inquire identification information, extract identification information from the first instruction, and send the identification information to the first electronic device, where the first electronic device acquires location information of a second device from the identification information and associates the location information of the second device with the identification information.

The control storage unit 1102 is configured to store the identification information.

Here, the second device may be a tag in the RFID technique, which may be an active tag or a passive tag, such as a first tag 231 as shown in FIG. 3.

The first instruction may be a radio frequency signal at a preset frequency. The radio frequency signal may functions to announce that the second device enters into the coverage of the magnetic field of the first electronic device. The preset frequency may be set according to the actual condition, which is not described in detail here.

The identification information is information preset for uniquely identifying the second device, and may be coding information.

It can be seen that with the above solution, the electronic device sending the first instruction senses the type and location of an entity on the touch screen of the electronic device. Thus, a more enriched usage scene for man-machine interaction is provided, and user experience is improved.

Figure 12:
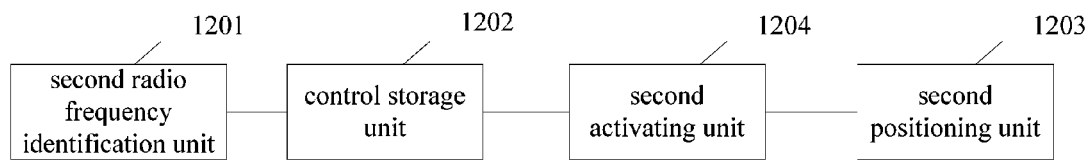
FIG. 12 is a schematic structural diagram of a device according to a second embodiment of the disclosure.

It is provided a device according to an embodiment of the disclosure. As shown in FIG. 12, the device includes a second radio frequency identification unit 1201 and a control storage unit 1202.

The second radio frequency identification unit 1201 is configured to receive a first instruction sent by a first electronic device to inquire identification information, extract identification information from the first instruction, and send the identification information to the first electronic device, where the first electronic device acquires location information of a second device from the identification information and associates the location information of the second device with the identification information.

The control storage unit 1202 is configured to store the identification information.

Preferably, the device further includes a second positioning unit configured to receive control of the control storage unit. Accordingly, the control storage unit 1202 is further configured to receive a second instruction via the second radio frequency identification unit, acquire first identification information in the second instruction, judge whether the first identification information matches the identification information of the second device, and activate a second positioning unit 1203 via the second activating unit 1204 in a case that the first identification information matches the identification information of the second device, the first electronic device detects location information of the second positioning unit, and the first electronic device sets the location information as the location information of the second device and associates the location information of the second device with the first identification information.

The control storage unit 1202 is further configured to not to activate the second positioning unit 1203 in a case that the first identification information mismatches with the identification information of the second device.

Here, the second device may be a tag in the RFID technique, which may be an active tag or a passive tag, such as a first tag 231 as shown in FIG. 3.

The first instruction may be a radio frequency signal at a preset frequency. The radio frequency signal may functions to announce that the second device enters into the coverage of the magnetic field of the first electronic device. That is to say, the second device receives the first instruction sent by the first electronic device once the second device senses that the second device enters into the coverage of the magnetic field of the RFID antenna. The preset frequency may be set according to the actual condition, which is not described in detail here.

The identification information is information preset for uniquely identifying the second device, and may be coding information.

The second instruction may be a radio frequency instruction at a preset frequency generated by modulating the identification information in a preset modulation mode. The preset modulation mode is a modulation mode specified to be used in the RFID technique, such as OOK modulation, BPSK modulation, ASK modulation with any modulation factor, or PR-ASK modulation, which is not defined in detail here.

Accordingly, the process of acquiring the first identification information in the second instruction may be demodulating the second instruction in a demodulation mode corresponding to the modulation mode to obtain the first identification information.

Figure 13:
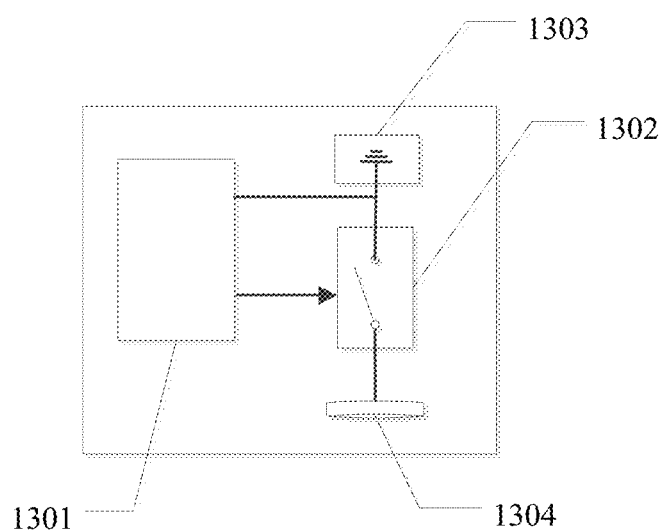
FIG. 13 is a schematic structural diagram of a circuit of a device according to a second embodiment of the disclosure.

Circuit connection of a device according to an embodiment of the disclosure is shown in FIG. 13. The gating circuit 1301 may be hardware for controlling the storage unit and the second radio frequency identification unit. The switch 1302 may be hardware for implementing the second activating unit. The capacitive touch point 1304 and the starting part 1303 of the capacitive touch point 1304 may be hardware for implementing the second positioning unit. The capacitive touch point 1304 is in touch with the capacitive touch screen in use. The starting part 1303 of the capacitive touch point is a means for grounding. The starting part 1303 of the capacitive touch point may be a conductive line which is touchable by a hand. The starting part 1303 of the capacitive touch point is in touch with a human body in use. The starting part 1303 of the capacitive touch point is grounded physically by the human body, or may be grounded virtually.

Specifically, the gating circuit 1301 is configured to store the identification information, receive the first instruction, extract the identification information of the gating circuit 1301 from the first instruction, send the identification information to the first electronic device, receive the second instruction, extract the first identification information from the second instruction, determine whether the first identification information matches the stored identification information of the gating circuit 1301, and switch on the switch 1302 in the case that the first identification information matches the stored identification information of the gating circuit 1301.

When the switch 1302 is switched on, the starting part 1303 of the capacitive touch point communicates with the capacitive touch point 1304, so that the touch screen of the first electronic device acquires the location information of the capacitive touch point 1304.

It can be seen that with the above solution, the electronic device sending the first instruction senses the type and location of an entity on the touch screen of the electronic device. Thus, a more enriched usage scene for man-machine interaction is provided, and user experience is improved.

Figure 14:
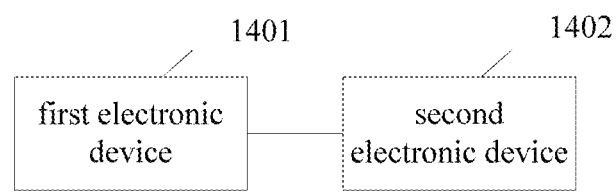
FIG. 14 is a schematic structural diagram of an information processing system according to an embodiment of the disclosure.

It is provided an information processing system according to an embodiment of the disclosure. As shown in FIG. 14, the information processing system includes a first electronic device 1401 and at least one second device 1402.

The first electronic device 1401 is configured to control the first radio frequency identification unit to send a first instruction to at least one second device within coverage of the first radio frequency identification unit to inquire identification information; receive the identification information sent by the at least one second device; control the first acquisition unit to acquire location information of the at least one second device from the identification information sent by the at least one second device; and associate the location information of the at least one second device with the identification information.

The second device 1402 is configured to receive a first instruction sent by a first electronic device to inquire identification information; extract identification information from the first instruction; and send the identification information to the first electronic device.

The specific functions of the first electronic device 1401 and the second device 1402 have been described in the above embodiments, which will not be described in detail here.

By means of providing an antenna array including N coil antennas behind a touch-screen and a display control module set of an electronic device, according to the technical solution in the embodiments of the disclosure, it is solved that the technical problem in the conventional technology that a device can not determine a position of an electronic tag on the device's screen when the electronic tag is placed thereon and it is provided a location method for an electronic tag to achieve the technical effect of location of the electronic tag on the display screen.

With the above solution, the electronic device sending the first instruction senses the type and location of an entity on the touch screen of the electronic device. Thus, a more enriched usage scene for man-machine interaction is provided, and user experience is improved.

According to the embodiment, it is provided a positioning method applied to an electronic device including N coil antennas, where N is a positive integer. In practice, the N coil antennas may constitute an antenna array arranged behind a touch-screen and a display control module set of an electronic device. The electronic device further includes a reader-writer that may communicate with a processor of the electronic device. In the embodiment of the disclosure, the electronic device may be a smart phone, a tablet computer and the like, but is not limited thereto.

Specifically, the length of a coil antenna may be equal to the width or the length of the display screen, and the width of the coil antenna is not limited by the size of the tag. However, for the purpose of reducing the number of the coil antennas, the width of the coil antenna is normally greater than 1.5 times the diameter of the tag, but not too wide because an exceeding width of the coil antenna leads to a problem that the center of the coil antenna can not be read. Adjacent coil antennas overlap to each other, and the diameter of the overlapping part is normally greater than a quarter of the diameter of the tag and less than a half of the width of the coil, thus it is avoided that the electronic tag can not be detected at a join of two coil antennas. By this way, the electronic tag can be detected by at least one coil antenna wherever the electronic tag is on the display screen. In the embodiment of the disclosure, the coil antenna may be a NFC antenna, and the electronic tag may be a NFC tag.

Figure 15:
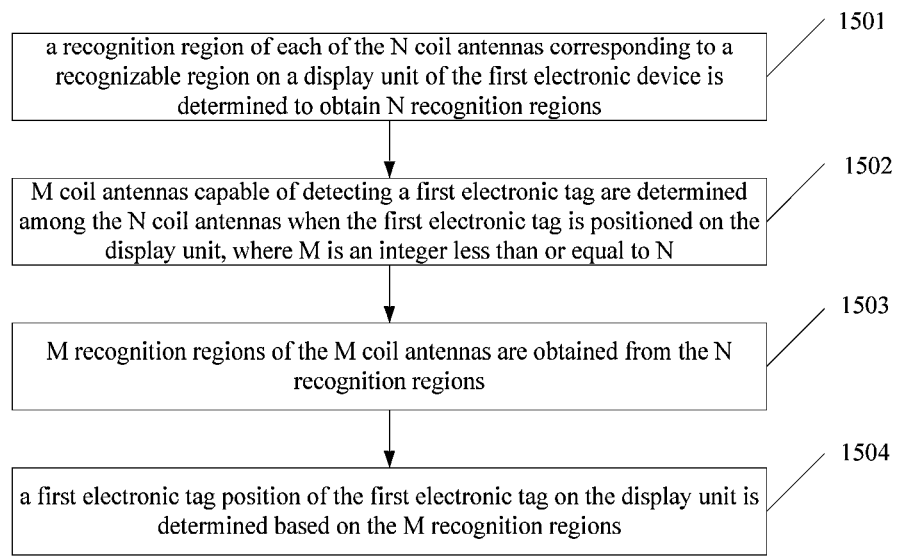
FIG. 15 is a flowchart of a positioning method in a first embodiment of the disclosure.

As shown in FIG. 15, the method includes steps 1501 to 1504.

In step 1501, a recognition region of each of the N coil antennas corresponding to a recognizable region on a display unit of the first electronic device is determined to obtain N recognition regions.

In the embodiment of the disclosure, N may be equal to 5, 8 or 10, but not limited thereto.

Specifically, the recognition region of each coil antenna may be determined by the following two ways, but is not limited thereto in practice.

In a first way, the coil antennas in the antenna array are turned on in turn, and a region, which can be recognized by one of the coil antennas when the coil antenna is turned on, is determined as the recognition region of the coil antenna. The recognition region of each of the coil antennas is obtained by performing the process in turn.

Specifically, the electronic device in the embodiment further includes multiple switches through which each coil antenna in the antenna array is connected to the reader-writer, a micro control unit (MCU) is connected to the coil antennas through the switches. In practice, the switches may be radio frequency switches.

For example, if an antenna array includes five coil antennas, five switches are needed to be connected to each coil antenna respectively.

By receiving a switch control instruction sent by the processor, the micro control unit controls each of the switches to be in an on-state or an off-state. If a switch is in the off-state, a coil antenna connected to the switch is in the off-state; and if a switch is in the on-state, a coil antenna connected to the switch is in the on-state, at which time the coil antenna sends a radio frequency signal to detect a nearby electronic tag.

In a second way, a position right above each of the coil antennas on the display unit is determined as a recognition region of the coil antenna.

Next, the above determination of a recognition region will be explained by taking a smart phone as an example.

Specifically, if the length of a display screen of the smart phone is 8 cm and the width thereof is 4.5 cm, and the length of a coil antenna is 8 cm and the width thereof is 1.5 cm, then the antenna array includes four coil antennas arranged in parallel with the length side of the display screen, and the width of an overlapping part of adjacent two coil antennas is 0.5 cm.

If the recognition region of each coil antenna is determined by the second way, a vertex of the screen is set to be an original point of a coordinate system, the width side is set to be the x-axis, and the length side is set to be the y-axis, then from left to right, the recognition region of a first coil antenna is the region left to the line x=1.5 cm on the display screen, the recognition region of a second coil antenna is the region between the line x=1 cm and the line x=2.5 cm on the display screen, the recognition region of a third coil antenna is the region between the line x=2 cm and the line x=3.5 cm on the display screen, and the recognition region of a fourth coil antenna is the region between the line x=3 cm and the line x=4.5 cm on the display screen.

In step 1502, M coil antennas capable of detecting a first electronic tag are determined among the N coil antennas when the first electronic tag is positioned on the display unit, where M is an integer less than or equal to N.

Specifically, the reader-writer generates and sends a radio sine wave to the tag and then reads data from the tag. For example, in a mobile phone imbedded with a NFC chip, a reader-writer generates a sine wave with a central frequency of 13.45 MHz when a FNC module is started. If a tag is within a range of magnetic disturbance generated by the sine wave, the tag obtains energy from the magnetic disturbance and generates a wave with a phase-reversal frequency of the original sine wave or a changed frequency property. The mobile phone detects the wave to know there is a tag nearby and records a responding antenna identifier and an ID number of the tag. In the embodiment, the antenna identifier may be a code number of the antenna. For example if the device includes four coil antennas, the four coil antennas may be numbered with 1, 2, 3 and 4 respectively.

Figure 16:
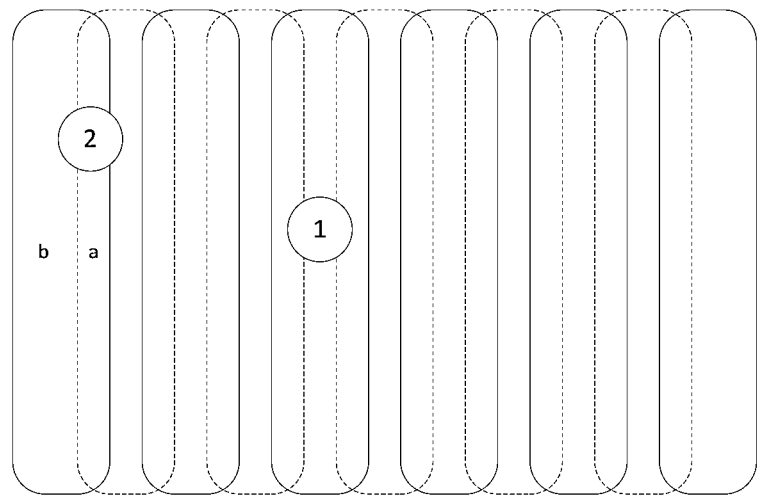
FIG. 16 is a schematic diagram of a first layout of an antenna array in an embodiment of the disclosure.

Still using the example in step 1502, since every two adjacent coil antennas partly overlap with each other, the determined M coil antennas include the following two cases:

in a first case, only one coil antenna is capable of detecting an electronic tag, such as a tag 1 in FIG. 16; and in a second case, two overlapping antennas are capable of detecting an electronic tag. For example, a first coil antenna and a second coil antenna are capable of detection a tag 2, as shown in FIG. 16.

In step 1503, M recognition regions of the M coil antennas are obtained from the N recognition regions.

Still using the recognition regions of the coil antennas determined in step 1501, if the coil antenna determined in step 1502 is the first coil antenna, a determined recognition region is the region left to the line x=1.5 cm on the display screen, alternatively, if the coil antennas determined in step 1502 are the first coil antenna and the second coil antenna, two determined recognition regions are respectively the region left to the line x=1.5 cm and the region between the line x=1 cm and the line x=2.5 cm on the display screen.

In step 1504, a first electronic tag position of the first electronic tag on the display unit is determined based on the M recognition regions.

Specifically, in the embodiment, the multiple coil antennas are turned on from left to right in turn. In the first case where only one coil antenna is capable of detecting an electronic tag, the recognition region, corresponding to a part of the coil antenna that does not overlap with the coil antenna on its right side, is determined as the position of the electronic tag; and in the second case where two overlapping antennas are capable of detecting an electronic tag, the recognition position corresponding to the overlapping part of the two coil antenna is determined as the position of the electronic tag.

For example, if a determined recognition region is the region left to the line x=1.5 cm on the display screen, the position of the electronic tag is the region left to the line x=1.5 cm on the display screen; and if two determined recognition regions are respectively the region left to the line x=1.5 cm and the region between the line x=1 cm and the line x=2.5 cm on the display screen, the position of the electronic tag is the overlapping region of the above two regions, i.e., the region between the line x=1 cm and the line x=1.5 cm on the display screen.

In the embodiment, in order to precisely position the electronic tag, the antenna array in the disclosure may adopt the following three layouts, but is not limited thereto in practices.

In a first layout, an antenna array includes a row of coil antennas, as shown in FIG. 16.

Specifically, each of the coil antennas includes two parts, namely a first part overlapping with an adjacent coil antenna, as shown by A in FIG. 16, and a second part other than the first part, as shown by B in FIG. 16.

In a second layout, an antenna array includes two rows of coil antennas. In the embodiment, this antenna array is an antenna array improved from the above antenna array for a display screen with a larger size, to realize a seamless recognition of larger size.

Figure 17:
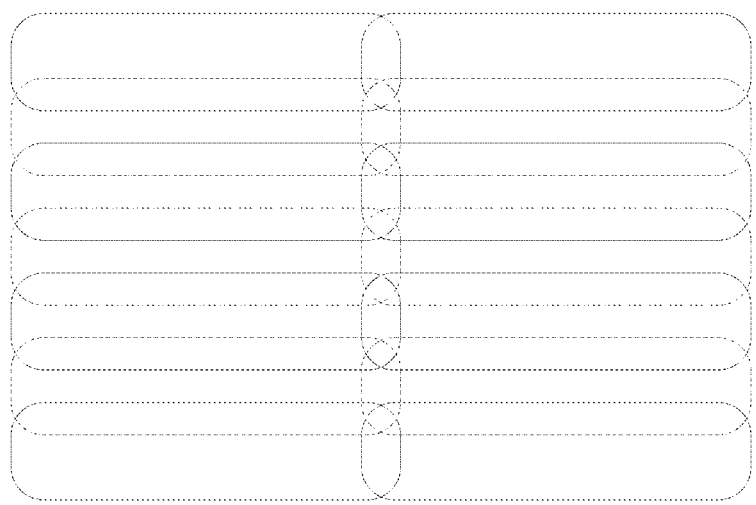
FIG. 17 is a schematic diagram of a second layout of an antenna array in an embodiment of the disclosure.

Specifically, the number and layout of the coil antennas in a second row are the same as those in a first row, and each of the coil antennas in the second row partly overlaps with a corresponding coil antenna in the first row, as shown in FIG. 17.

Specifically, with the second layout, a detection result may be in the following three cases depending on the number of coil antennas that detect the electronic tag:

in a first case, one or two coil antennas in the first row are capable of detecting the electronic tag, and none of the coil antennas in the second row is capable of detecting the electronic tag;

in a second case, one antenna in the first row is capable of detecting the electronic tag, and one antenna in the second row is capable of detecting the electronic tag; and in a third case, two antennas in the first row are capable of detecting the electronic tag, and two antennas in the second row are capable of detecting the electronic tag.

For the determination of the position of the electronic tag on the screen in the above three cases, reference can be made to the determination method mentioned in the first layout, which will not be repeated here.

In a third layout, an antenna array includes two rows of coil antennas.

With the first layout or the second layout, the position of the electronic tag can be determined in only one direction. However, with the third layout, the position of the electronic tag can be determined in two directions by providing a row of coil antennas in each of the two directions, in which a layout of a second row of coil antennas is the same as that of a first row of coil antennas. In practice, the length of a coil antenna is normally less than a doubled width of the electronic tag.

Figure 18:
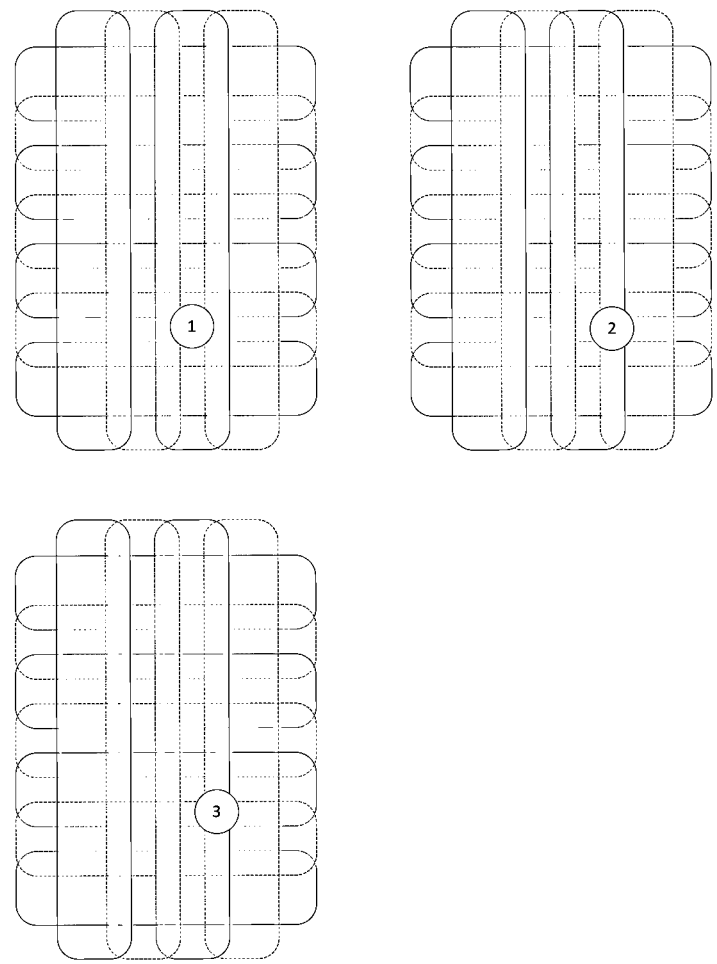
FIG. 18 is a schematic diagram of a third layout of an antenna array in an embodiment of the disclosure.

In the embodiment, the second row of coil antennas may be provided to be vertical to the first row of the coil antennas, as shown in FIG. 18. If the first row of coil antennas is parallel to a first side of the screen, the second row of coil antennas is parallel to a second side of the screen, a vertex of the screen is set to be an original point of a coordinate system, the first side is set to be the x-axis, and the second side is set to be the y-axis, then the range of coordinates of the electronic tag on the screen can be determined through the two rows of coil antennas in the directions of x-axis and y-axis.

Specifically, if the length of a display screen of a mobile phone is 7.5 cm and the width thereof is 4.5 cm, the length of a coil antenna in the first row is 7 cm and the width thereof is 1.5 cm, and the width of the overlapping part of two adjacent coil antennas is 0.5 cm, then the first row of coil antennas includes four coil antennas arranged in parallel to the second side (y-axis) of the display screen; and if the length of a coil antenna in the second row is 4.5 cm and the width thereof is 1.5 cm, and the width of the overlapping part of two adjacent coil antennas is 0.5 cm, then the second row of coil antennas includes seven coil antennas arranged in parallel to the first side (x-axis) of the display screen.

In this case, from left to right, the recognition region of a first coil antenna is the region left to the line x=1.5 cm on the display screen, the recognition region of a second coil antenna is the region between the line x=1 cm and the line x=2.5 cm on the display screen, the recognition region of a third coil antenna is the region between the line x=2 cm and the line x=3.5 cm on the display screen, and the recognition region of a fourth coil antenna is the region between the line x=3 cm and the line x=4.5 cm on the display screen.

From bottom to top, the recognition region of a first coil antenna is the region below the line y=1.5 cm on the display screen, the recognition region of a second coil antenna is the region between the line y=1 cm and the line y=2.5 cm on the display screen, the recognition region of a third coil antenna is the region between the line y=2 cm and the line y=3.5 cm on the display screen, and so forth.

Specifically, with the third layout, a detection result may be in the following three cases depending on the number of coil antennas that detect the electronic tag.

In a first case, one antenna in the first row is capable of detecting the electronic tag, and one antenna in the second row is capable of detecting the electronic tag.

If the third coil antenna in the first row and the second coil antenna in the second row are capable of detecting the electronic tag, then the position of the electronic tag is in a region on the display screen defined by lines x=2 cm, x=3.5 cm, y=1 cm and y=2.5 cm, as shown by tag 1 in FIG. 18.

In a second case, two antennas in the first row are capable of detecting the electronic tag, and one antenna in the second row is capable of detecting the electronic tag.

If the third coil antenna and the fourth coil antenna in the first row and the second coil antenna in the second row are capable of detecting the electronic tag, then the position of the electronic tag is in a region on the display screen defined by lines x=3 cm, x=3.5 cm, y=1 cm and y=2.5 cm, as shown by tag 2 in FIG. 18.

In a third case, two antennas in the first row are capable of detecting the electronic tag, and two antennas in the second row are capable of detecting the electronic tag.

If the third coil antenna and the fourth coil antenna in the first row and the second coil antenna and the third coil antenna in the second row are capable of detecting the electronic tag, then the position of the electronic tag is in a region on the display screen defined by lines x=3 cm, x=3.5 cm, y=2 cm and y=2.5 cm, as shown by tag 3 in FIG. 18.

In the embodiment, the device may read information written in the electronic tag when determining the position of the electronic tag on the display screen, and thus may perform a function written in the electronic tag. The device may also perform other new function through the recognition and location of the electronic tag.

Next, a new function in the embodiment will be explained in connection with an example in which a mobile phone recognizes a NFC tag located on its screen to perform a corresponding function.

In the example, multiple coupons are displayed on the screen of the mobile phone, and each of the coupons needs to be downloaded locally for use. At this point, a user places a NFC tag, in which a function for downloading a coupon is written, on the screen. Then, using the positioning method for an electronic tag in the embodiment, the mobile phone locates a coupon corresponding to the place where the NFC tag is placed, whereby the coupon can be selected and downloaded.

In the embodiment, multiple electronic tags on the screen can be located by recording identifiers of coil antennas that detect the electronic tags and ID numbers of the electronic tags.

If an identifier of a coil antenna is a code number of the coil antenna, a reader-writer reads an ID number of an electronic tag and a code number of a coil antenna. Then an electronic device determines a position of an electronic tag with an ID number based on a recognition region of coil antenna that reads the same ID number.

Fourteenth Embodiment

Figure 19:
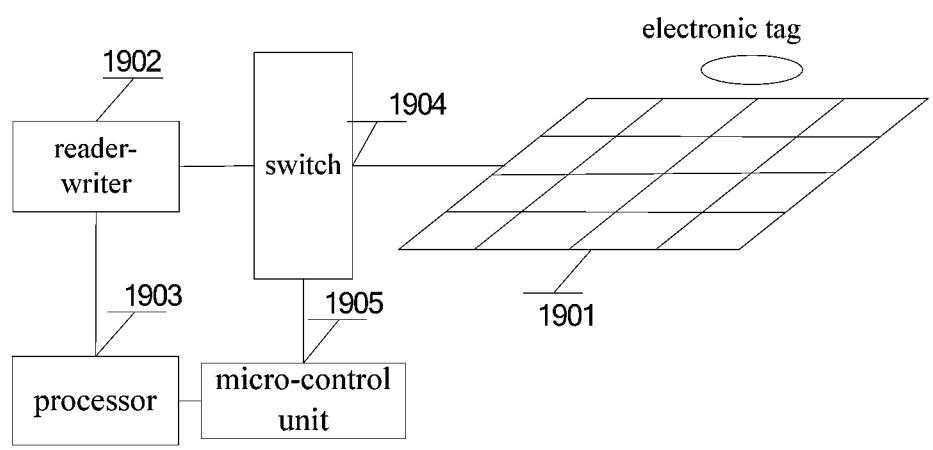
FIG. 19 is structural schematic diagram of an electronic device in an embodiment of the disclosure.

Based on the same inventive conception, according to a second embodiment, it is provided an electronic device as shown in FIG. 19, the electronic device includes:

a first antenna array 1901, where the first antenna array 1901 includes N coil antennas, where N is a positive integer; and an $i^{th}$ coil antenna of the N coil antennas includes a first part overlapping with a $(i+1)^{th}$ coil antenna and a second part other than the first part, where i is any positive integer less than or equal to N, and the $(i+1)^{th}$ coil is a coil antenna partly overlapping with the $i^{th}$ coil antenna;

a reader-writer 1902 connected to the N coil antennas, where the reader-writer is configured to determine the $i^{th}$ coil antenna and/or the $(i+1)^{th}$ coil antenna of the N coil antenna that are capable of detecting a first electronic tag when the first electronic tag is positioned on a display unit of the electronic device; and a processor 1903 connected to the reader-writer 1902 and configured to determine a tag position of the first electronic tag on the display unit based on an $i^{th}$ recognition region corresponding to the $i^{th}$ coil antenna and/or an $(i+1)^{th}$ recognition region corresponding to the $(i+1)^{th}$ coil antenna.

Optionally, the processor 1903 is configured to:

determine a first part position corresponding to the first part as the tag position of the first electronic tag in the case that the reader-writer 1902 determines that both the $i^{th}$ coil antenna and the $(i+1)^{th}$ coil antenna are capable of detecting the first electronic tag; or determine a second part position corresponding to the second part as the tag position of the electronic tag in the case that the reader-writer 1902 determines that the $i^{th}$ coil antenna is capable of detecting the first electronic tag while the $(i+1)^{th}$ coil antenna is not capable of detecting the first electronic tag.

Optionally, the electronic device further includes:

a second antenna array including M coil antennas connected to the reader-writer 1902 where M is equal to N;

where a $j^{th}$ coil antenna in the second antenna array includes a third part overlapping with the $i^{th}$ coil antenna in the first antenna array 1901 and a fourth part other than the third part, where j is a positive integer less than or equal to N, and the $j^{th}$ coil antenna in the second antenna array is a coil antenna partly overlapping with the $i^{th}$ coil antenna in the first antenna array 1901 where j is equal to i.

Optionally, the reader-writer 1902 is further configured to determine whether the M coil antennas include the $j^{th}$ coil antenna and/or a $(j+1)^{th}$ coil antenna that are capable of detecting the first electronic tag and obtain a second determination result; and determine the $j^{th}$ coil antenna and/or the $(j+1)^{th}$ coil antenna that are capable of detecting the first electronic tag if the second determination result indicates that the M coil antennas include the $j^{th}$ coil antenna and/or the $(j+1)^{th}$ coil antenna that are capable of detecting the first electronic tag.

the processor 1903 is configured to determine the first electronic tag position based on a $j^{th}$ recognition region corresponding to the $j^{th}$ coil antenna and/or a $(j+1)^{th}$ recognition region corresponding to the $(j+1)^{th}$ coil antenna together with the $i^{th}$ recognition region and/or the $(i+1)^{th}$ recognition region, if the second determination result indicates that the M coil antennas include the $j^{th}$ coil antenna and/or the $(j+1)^{th}$ coil antenna that are capable of detecting the first electronic tag.

Optionally, the electronic device further includes:

a third antenna array including P coil antennas connected to the reader-writer 1902, where P is a positive integer;

where for i being a value from 1 to N in turn, a $k^{th}$ coil antenna of the P coil antennas includes an $i^{th}$ overlapping part overlapping with the $i^{th}$ coil antenna in the first antenna array 1901, where k is a positive integer less than or equal to P.

Optionally, the reader-writer 1902 is further configured to determine the $k^{th}$ coil antenna and/or a $(k+1)^{th}$ coil antenna that are capable of detecting the first electronic tag among the P coil antennas; and the processor 1903 is configured to determine the position of the first electronic tag based on the $i^{th}$ recognition region and/or the $(i+1)^{th}$ recognition region together with a $k^{th}$ recognition region corresponding to the $k^{th}$ coil antenna and/or a $(k+1)^{th}$ recognition region corresponding to the $(k+1)^{th}$ coil antenna.

Optionally, the electronic device further includes:

N switches 1904;

where the reader-writer 1902 is connected to the $i^{th}$ coil antenna via an $i^{th}$ switch of the N switches 1904; and the $i^{th}$ coil antenna is in a on-state when the $i^{th}$ switch is in the on-state, and the $i^{th}$ coil antenna is in an off-state state when the $i^{th}$ switch is in the off-state.

Optionally, the electronic device further includes:

a micro control unit 1905 connected to the N switches 1904 and the processor 1903;

where the micro-control unit 1905 is configured to receive a switch control instruction sent from the processor 1903 to control each of the N switches 1904 to be in the on-state or the off-state.

With the above one or more technical solutions in the embodiments of the present disclosure, one or more of the following technical effects can be achieved.

1. In the technical solution of the disclosure, an antenna array including N coil antennas is provided behind a touch-screen and a display control module set of an electronic device. N recognition regions are obtained by determining a recognition region of each of the N coil antennas corresponding to a recognizable region on a display unit of the electronic device; M coil antennas capable of detecting a first electronic tag are determined among the N coil antennas when the first electronic tag is positioned on the display unit, where M is an integer less than or equal to N; M recognition regions of the M coil antennas are obtained from the N recognition regions; and a position of the first electronic tag on the display unit is determined based on the M recognition regions. In the solution of the disclosure, a position of an electronic tag is determined by calibrating a position of each coil antenna and determining based on a position of a coil antenna that detects the electronic tag. Therefore, according to the solution of the disclosure, it is solved the technical problem in the conventional technology that a device can not determine a position of an electronic tag on the device's screen when the electronic tag is placed thereon, and it is provided a positioning method for an electronic tag to achieve the technical effect of location of the electronic tag on the display screen.

2. In the technical solution of the disclosure, after a coil antenna that is capable of detecting the electric tag is determined, an identifier of the coil antenna and an ID number of the electronic tag are recorded. Information written in the electronic tag is read while the recognition region of the coil antenna is determined based on the identifier of the coil antenna, to control the device to perform a corresponding function. Thus a location of the electronic tag is performed while a conventional NFC function is implemented.

3. In the technical solution of the disclosure, the $i^{th}$ coil antenna includes a first part overlapping with a $j^{th}$ coil antenna and a second part other than the first part, where the $j^{th}$ coil antenna is a coil antenna partly overlapping with the $i^{th}$ coil antenna, where j is a positive integer less than or equal to N. After the $i^{th}$ coil antenna is determined to be capable of detecting the electronic tag, it is determined whether the $j^{th}$ coil antenna is capable of detecting the first electronic tag; a first part position corresponding to the first part is determined as the position of the first electronic tag if the determination result indicates that the $j^{th}$ coil antenna is capable of detecting the first electronic tag; or a second part position corresponding to the second part is determined as the position of the first electronic tag if the determination result indicates that the $j^{th}$ coil antenna is not capable of detecting the first electronic tag. Thus, the technical solution of the disclosure achieves the technical effect of precise location of the electronic tag.

It should be understood by those skilled in the art that the embodiments of the disclosure may be provided as a method, system or computer program product. Accordingly, the disclosure may employ the form of an entirely hardware embodiment, an entirely software embodiment or a combination of a software and a hardware. Moreover, the disclosure may employ the form of computer program product implemented on one and more computer available storage medium in which computer available program code (including but not limited to disk storage, CD-ROM, optical memory, and the like) is included.

The disclosure has been described with reference to the flow charts and/or block diagrams of a method, device and computer program product according to the embodiments of the disclosure. It should be understood that each flow and/or block in the flow charts and/or block diagrams, and a combination of the flow and/or block in the flow charts and/or block diagrams may be implemented by the computer program instruction. Those computer program instructions may be provided to a processor of a general purpose computer, a special purpose computer, an embedded processing system or other programmable data processing devices to generate a machine, so that the instructions executed by the processors of the computer or other programmable data processing devices generates an apparatus which is configured to implement the functions specified in a flow or flows in the flowchart and/or a block or blocks in the block diagrams.

Those computer program instructions can also be stored in a computer-readable storage that can instruct a computer or other programmable data processing devices to operate in a particular way, so that the instructions stored in this computer-readable storage generate the manufactured goods including instruction apparatus, wherein the instruction apparatus implements the function specified in a flow or flows in the flowchart and/or a block or blocks in the block diagrams.

Those computer program instructions may also be loaded onto a computer or other programmable data processing device, so that a series of operations are performed on the computer or other programmable data processing device to achieve the processing realized by a computer. Thus, the instructions executed on the computer or other programmable data processing devices provide the steps for implementing the function specified in a flow or flows in the flowchart and/or a block or blocks in the block diagrams.

Specifically, those computer program instructions corresponding to the location method in the embodiments of the present disclosure can be stored in a storage medium such as an optical disk, a hard disc, a USB flash disk. When the computer program instructions corresponding to the location method stored in the storage medium is read or executed by an electronic device, the following steps are performed:

determining a recognition region of each of the N coil antennas on a display unit of the electronic device to obtain N recognition regions;

determining M coil antennas capable of detecting a first electronic tag among the N coil antennas when the first electronic tag is positioned on the display unit, where M is an integer less than or equal to N;

obtaining M recognition regions of the M coil antennas from the N recognition regions; and determining a tag position of the first electronic tag on the display unit based on the M recognition regions.

Optionally, when the computer program instructions stored in the storage medium, which are corresponding to the step of determining the recognition region of each of the N coil antennas on the display unit of the electronic device to obtain the N recognition regions, are executed, the following specific steps are performed:

for i being a value from 1 to N in turn, controlling an $i^{th}$ coil antenna of the N coil antennas to be in a on-state, and controlling N−1 coil antennas of the N coil antennas other than the $i^{th}$ coil antenna to be in an off-state, where i is an positive integer less than or equal to N;

determining an $i^{th}$ recognition region of the $i^{th}$ coil antenna corresponding to an $i^{th}$ on the display unit when the $i^{th}$ coil antenna is in the on state; and obtaining the N recognition regions when i is equal to N.

Optionally, when the computer program instructions stored in the storage medium, which are corresponding to the step of determining the recognition region of each of the N coil antennas on the display unit of the electronic device to obtain the N recognition regions, are executed, the following specific steps are performed:

for i being a value from 1 to N in turn, determining a region of the $i^{th}$ coil antenna of the N coil antennas on the display unit right above the $i^{th}$ coil antenna as an $i^{th}$ recognition region of the $i^{th}$ coil antenna, to obtain the N recognition regions.

Optionally, when the computer program instructions stored in the storage medium, which are corresponding to the step of determining the M coil antennas capable of detecting the first electronic tag among the N coil antennas when the first electronic tag is positioned on the display unit, are executed, the following specific steps are performed:

for i being a value from 1 to N in turn, controlling an $i^{th}$ coil antenna of the N coil antennas to be in a on-state, and controlling N−1 coil antennas of the N coil antennas other than the $i^{th}$ coil antenna to be in an off-state;

determining the $i^{th}$ coil antenna as one of the M coil antennas if the $i^{th}$ coil antenna is in the on-state and capable of detecting the electronic tag; and obtaining the M coil antennas when i is equal to N.

Optionally, the storage medium further stores other computer program instructions which are executed after the computer program instructions corresponding to the step of determining the $i^{th}$ coil antenna as one of the M coil antennas are executed, and when the other computer program instructions are executed, the following specific steps are performed:

recording an $i^{th}$ identifier of the ith coil antenna and a first identity number of the first electronic tag.

Optionally, the $i^{th}$ coil antenna includes a first part overlapping with a $j^{th}$ coil antenna and a second part other than the first part, where the $j^{th}$ coil antenna is a coil antenna partly overlapping with the $i^{th}$ coil antenna, where j is a positive integer less than or equal to N.

Optionally, the storage medium further stores other computer program instructions which are executed after the computer program instructions corresponding to the step of determining the $i^{th}$ coil antenna as one of the M coil antennas are executed, and when the other computer program instructions are executed, the following specific steps are performed:

for j being a value from i+1 to N in turn, determining whether an $j^{th}$ coil antenna is capable of detecting the first electronic tag and obtaining a first determination result;

determining a first part position corresponding to the first part as the position of the first electronic tag if the first determination result indicates that the $j^{th}$ coil antenna is capable of detecting the first electronic tag; or determining a second part position corresponding to the second part as the first electronic tag position if the first determination result indicates that the $j^{th}$ coil antenna is not capable of detecting the first electronic tag.

Optionally, the N coil antennas are N NFC antennas, and the first electronic tag is a first NFC tag.

Figure 20:
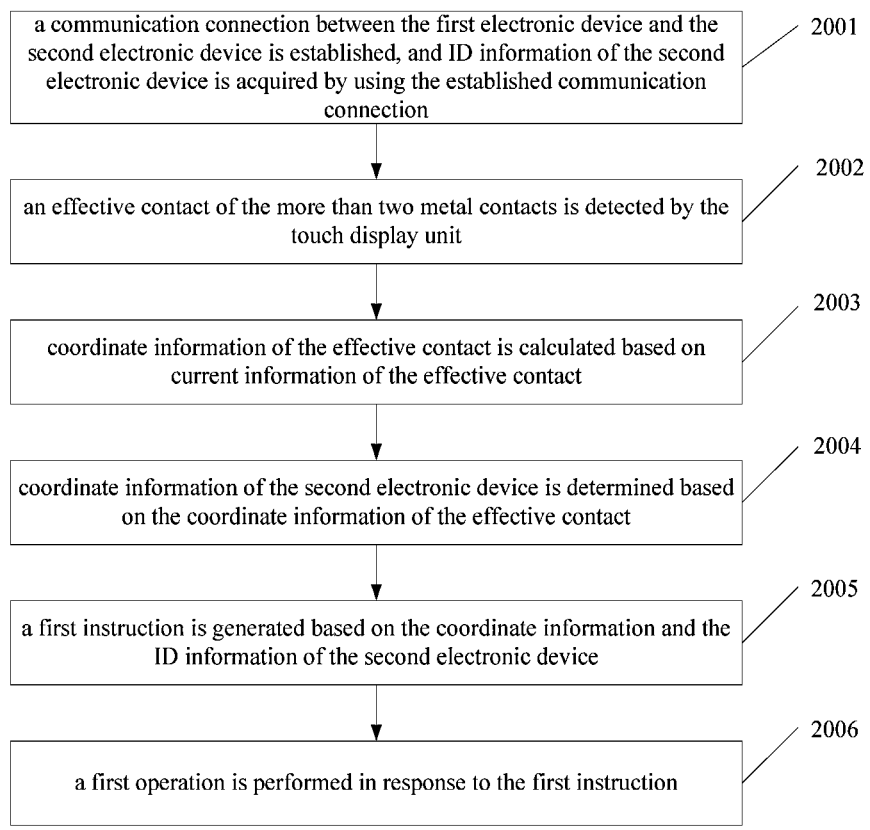
FIG. 20 is a schematic flow diagram of an interaction method according to an embodiment of the disclosure.

FIG. 20 is a schematic flow diagram of an interaction method according to a first embodiment of the invention, the interaction method in the embodiment is applied to a first electronic device, and the first electronic device includes a touch display unit; the first electronic device can interact with a second electronic device; the second electronic device includes more than two metal contacts, and any two metal contacts of the more than two metal contacts are connected via a wire; with reference to FIG. 20, the interaction method includes step 2001 to step 2006.

In step 2001, a communication connection between the first electronic device and the second electronic device is established, and ID information of the second electronic device is acquired by using the established communication connection.

In the embodiments of the invention, the first electronic device may be an electronic device such as a mobile phone, a tablet PC, an all-in-one machine; this kind of electronic device includes a touch display unit, for example a capacitive touch display screen; the capacitive touch display screen operates by using body's current sensing, specifically, a contact may be formed when a finger comes into contact with the capacitive touch display screen, since that a person is acted as a conductor, and a capacitor is formed when the finger comes into contact with the capacitive touch display screen, a current generated by capacitance coupling is conducted to the ground via the body. Based on this, a condition for forming the contact is to form a stable capacitor by contacting the conductor with the capacitive touch display screen.

In the embodiments of the invention, the second electronic device is a NFC tag, a NFC antenna and a NFC chip are built into the NFC tag, and an operation mode of the NFC tag is a passive mode. Correspondingly, a NFC antenna and a NFC chip are built into the first electronic device, and an operation mode of the first electronic device is an active mode.

Specifically, the first electronic device transmits a RF signal actively by using the NFC antenna, and the RF signal is sensed by the NFC antenna in the second electronic device when the second electronic device gets close to the first electronic device, and the second electronic device establishes a NFC communication connection with the first electronic device; the first electronic device can read/write data in the second electronic device by the established NFC communication connection. In the embodiments of the invention, the first electronic device acquires the ID information of the second electronic device by the established NFC communication connection. Here, the ID information of the second electronic device is used to characterize attributes of the second electronic device, and the ID information of the second electronic device may be represented by a series of numbers, such as 122331122. The attributes of the second electronic device may characterize which tag the second electronic device is, such as a chessman-type tag or a seal-type tag.

In the embodiments of the invention, a RF field is provided by the first electronic device in a communication process, one of transmission rates 106 kpbs, 212 kbps and 424 kbps may be chosen to interact with the second electronic device. It is not necessary for the second electronic device to generate a RF field, and the second electronic device transmits data back to the first electronic device at the same rate by using a load modulated technology.

In step 2002, an effective contact of the more than two metal contacts is detected by the touch display unit.

Figure 30:
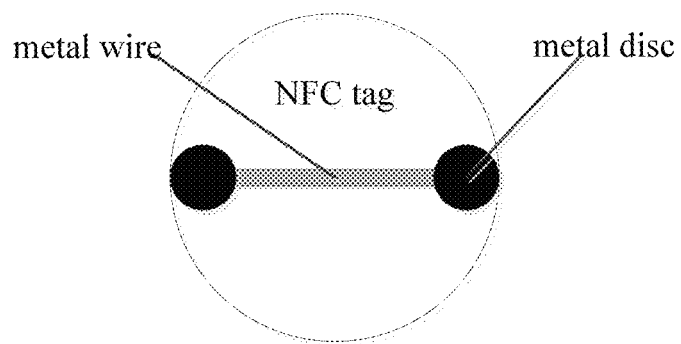
FIG. 30 is a first schematic diagram of a NFC tag according to the embodiments of the disclosure.

In the embodiments of the invention, the second electronic device includes more than two metal contacts, and any two metal contacts of the more than two metal contacts are connected via a wire; specifically, with reference to FIG. 30, more than two metal discs having a certain size are printed at the bottom end of the NFC tag, and the more than two metal discs are connected by printing a metal wire.

Figure 31:
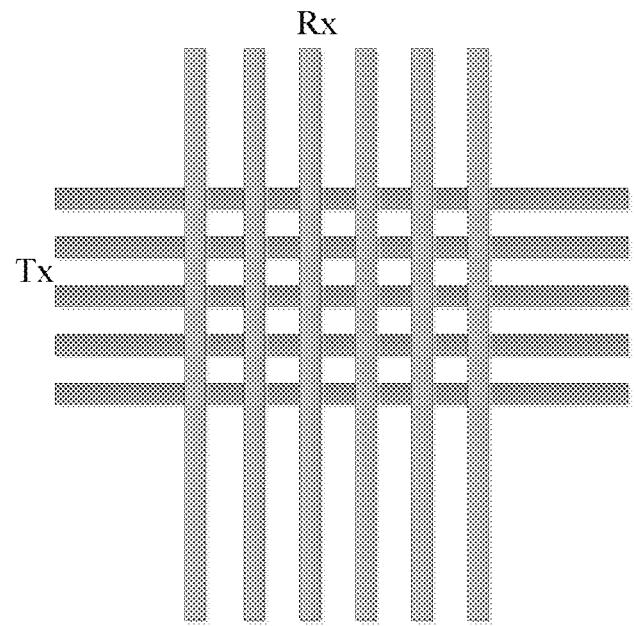
FIG. 31 is a schematic diagram of an electrode according to the embodiments of the disclosure.

In the embodiments of the invention, the touch display unit has a conducting layer, with reference to FIG. 31, the conducting layer includes a cluster of horizontal electrodes Tx and a cluster of vertical electrodes Rx; and specifically, voltages between any two electrodes of each cluster of the horizontal electrodes and each cluster of the vertical electrodes are different.

Figure 32:
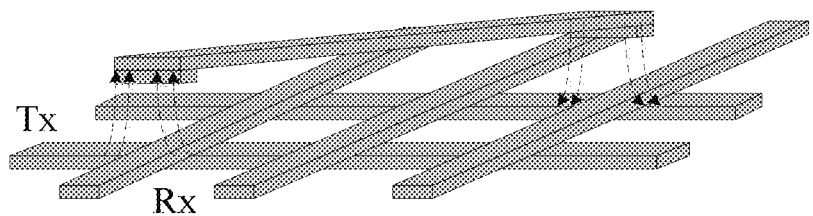
FIG. 32 is a schematic diagram of triggering an electrode by an metal contact according to the embodiments of the disclosure.

When the second electronic device is placed on the touch display unit of the first electronic device, more than two metal contacts of the second electronic device contact with an electrode of the first electronic device. With reference to FIG. 32, when Tx electrode under the first metal disc is triggered, Tx electrode under the second metal disc is in a non-triggered state, in this case, the first metal disc and the touch screen constitute a capacitor, and the second metal disc constitutes the ground, the capacitor is connected to the ground via the metal wire between the discs, then a coupling current is formed, and the capacitive touch display screen is further triggered to generate a stable contact. Since the voltages of different electrodes are different from each other, voltages of the two metal contacts are different in a case that the two metal contacts are not placed on the same electrode, and a current flows between the two metal contacts, in this case, the effective contact exists. In the embodiments of the invention, a contact of the two metal contacts at a side having a higher voltage is referred to as the effective contact.

In the embodiments of the invention, the capacitance of the capacitor between the metal disc and the capacitive touch display screen depends on the size of the metal disc, and a distance between the discs depends on a distance between adjacent electrodes in the touch screen, a capacitor is formed by the touch screen and one of the metal discs, and another of the metal discs constitutes the virtual ground at another position of the touch screen, the current may be coupled into the virtual ground by the capacitor, and a stable triggering is further formed. In addition, it is inadvisable that a width of the metal connection wire is large, and other processing is performed in a case that the width of the metal connection wire is large, for example, a position of the contact is raised, so that there is a certain distance between the metal connection wire and the touch screen when the NFC tag is placed, the processing ensures that other unstable contact will not be brought by the connection wire. The NFC antenna is inside of the NFC tag, and an unstable contact is also be brought by a coil antenna having a metal structure in some cases, taking this into account, it must ensure when the metal disc is designed that there is a certain distance between the NFC tag and the capacitive touch display screen when the NFC tag is placed on the capacitive touch display screen, the distance is related to the size of the coil antenna of the tag, and the distance is normally greater than or equal to 1 mm.

In step 2003, coordinate information of the effective contact is calculated based on current information of the effective contact.

Specifically, a small current of the electrode is brought from the contact by the metal disc of the effective contact. The current flows out of four electrodes at the four corners of the capacitive touch display screen, and the current flowing via the four electrodes is in a direct proportion to distances between the finger and the four corners, and the first electronic device obtains the coordinate information of the effective contact by performing precise calculation on ratios between the four current.

In step 2004, coordinate information of the second electronic device is determined based on the coordinate information of the effective contact.

Figure 33:
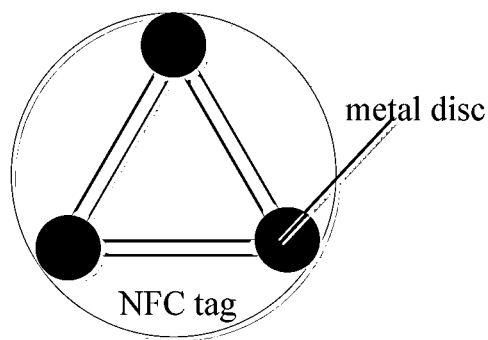
FIG. 33 is a second schematic diagram of a NFC tag according to the embodiments of the disclosure.

In the embodiments of the invention, with reference to FIG. 33, in a case that the two metal contacts are placed on a same electrode, the two metal discs are above a same electrode Tx or a same electrode Rx, the virtual ground can not be formed on the touch screen, and the stable contact can not be realized, therefore, this is avoided by providing more than three metal discs in the NFC tag, since it is impossible that the more than three metal contacts are placed above a same electrode Tx or the electrode Rx simultaneously.

Based on this, in a case that there are more than three metal contacts in the NFC tag, an effective contact may be formed between every two metal contacts of the more than three metal contacts, therefore, the number of effective contacts is greater than or equal to 2. In the embodiments of the invention, coordinate information of more than two effective contacts is averaged, to determine the coordinate information of the second electronic device. Practically, the coordinate information of one of the effective contacts may also be set in advance as the coordinate information of the second electronic device.

In step 2005, a first instruction is generated based on the coordinate information and the ID information of the second electronic device.

In the embodiments of the invention, a corresponding first instruction is generated by combining the coordinate information and the ID information of the NFC tag, to recognize and position the NFC tag. In some scenarios, for example, in a case that the NFC tag is a chessman, and a chessboard is displayed by the capacitive touch display screen, the capacitive touch display screen may distinguish where the chessman is, and further generate a corresponding first instruction to response. Also for example, in a case that the NFC tag is a seal, and a paper is displayed by the capacitive touch display screen, the capacitive touch display screen may distinguish a content of the seal and where the seal is affixed, and further generate a corresponding first instruction to response.

In step 2006, a first operation is performed in response to the first instruction.

In the embodiments of the invention, in a case that the second electronic device is placed on the touch display unit of the first electronic device, the first electronic device establishes the NFC communication connection with the second electronic device, and acquires the ID information of the second electronic device; furthermore, the touch display unit of the first electronic device can detect the effective contact of the more than two metal contacts in the second electronic device, and further acquire the coordinate information of the effective contact, the coordinate information of the effective contact is the coordinate information of the second electronic device; then, a corresponding operation is performed by combining the acquired ID information and the coordinate information of the second electronic device.

In the technical solution according to the embodiment of the invention, the NFC tag can not only be recognized, but also be positioned.

Figure 21:
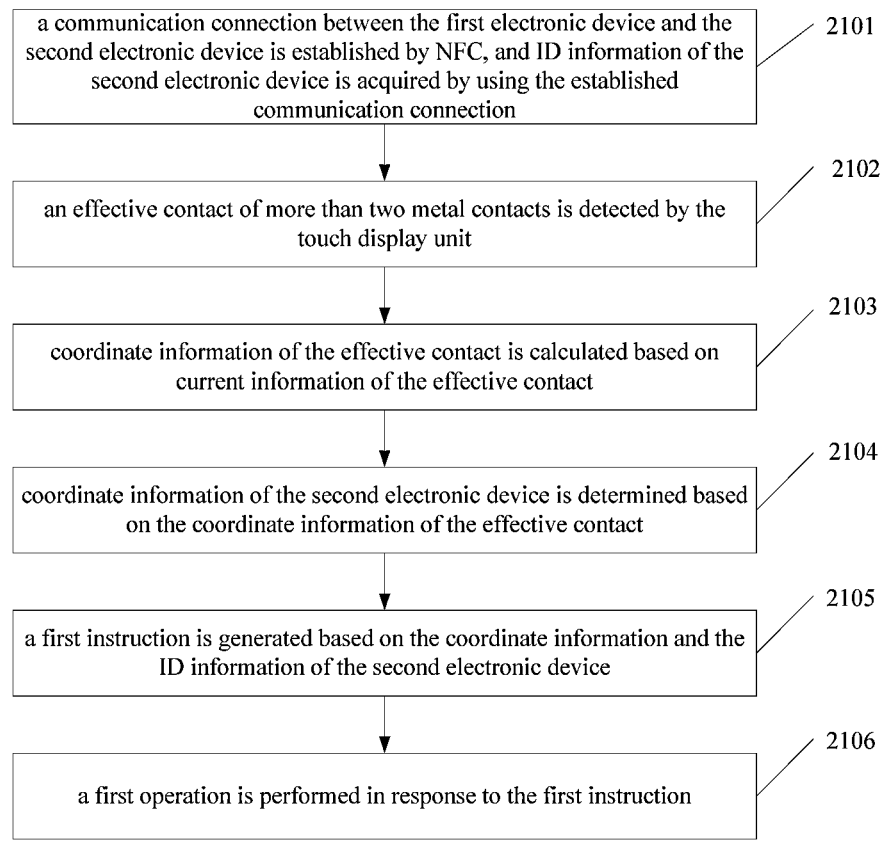
FIG. 21 is a schematic flow diagram of an interaction method according to an embodiment of the disclosure.

FIG. 21 is a schematic flow diagram of an interaction method according to a second embodiment of the invention, the interaction method in the embodiment is applied to a first electronic device, the first electronic device includes a touch display unit; the first electronic device can interact with a second electronic device; the second electronic device includes more than two metal contacts, and any two metal contacts of the more than two metal contacts are connected via a wire; with reference to FIG. 21, the interaction method includes step 2101 to step 2106.

In step 2101, a communication connection between the first electronic device and the second electronic device is established by NFC, and ID information of the second electronic device is acquired by using the established communication connection.

In the embodiments of the invention, the first electronic device may be an electronic device such as a mobile phone, a tablet PC, an all-in-one machine; this kind of electronic device includes a touch display unit, for example a capacitive touch display screen; the capacitive touch display screen operates by using body's current sensing, specifically, a contact may be formed when a finger comes into contact with the capacitive touch display screen, since that a person is acted as a conductor, and a capacitor is formed when the finger comes into contact with the capacitive touch display screen, a current generated by capacitance coupling is conducted to the ground via the body. Based on this, a condition for forming the contact is to form a stable capacitor by contacting the conductor with the capacitive touch display screen.

In the embodiment of the invention, the second electronic device is a NFC tag, a NFC antenna and a NFC chip are built into the NFC tag, and an operation mode of the NFC tag is a passive mode. Correspondingly, a NFC antenna and a NFC chip are built into the first electronic device, and an operation mode of the first electronic device is an active mode.

Specifically, the first electronic device transmits a RF signal actively by using the NFC antenna, and the RF signal is sensed by the NFC antenna in the second electronic device when the second electronic device gets close to the first electronic device, and the second electronic device establishes a NFC communication connection with the first electronic device; the first electronic device can read/write data in the second electronic device by the established NFC communication connection. In the embodiments of the invention, the first electronic device acquires the ID information of the second electronic device by the established NFC communication connection. Here, the ID information of the second electronic device is used to characterize attributes of the second electronic device, and the ID information of the second electronic device may be represented by a series of numbers, such as 122331122. The attributes of the second electronic device may characterize which tag the second electronic device is, such as a chessman-type tag or a seal-type tag.

In the embodiments of the invention, a RF field is provided by the first electronic device in a communication process, one of transmission rates 206 kpbs, 212 kbps and 424 kbps may be chosen to interact with the second electronic device. It is not necessary for the second electronic device to generate a RF field, and the second electronic device transmits data back to the first electronic device at the same rate by using a load modulated technology.

In step 2102, an effective contact of more than two metal contacts is detected by the touch display unit.

In the embodiments of the invention, the second electronic device includes more than two metal contacts, and any two metal contacts of the more than two metal contacts are connected via a wire; specifically, with reference to FIG. 30, more than two metal discs having a certain size are printed at the bottom end of the NFC tag, and the more than two metal discs are connected by printing a metal wire.

In the embodiments of the invention, the touch display unit has a conducting layer, with reference to FIG. 31, the conducting layer includes a cluster of horizontal electrodes Tx and a cluster of vertical electrodes Rx; and specifically, voltages between any two electrodes of each cluster of the horizontal electrodes and each cluster of the vertical electrodes are different.

When the second electronic device is placed on the touch display unit of the first electronic device, more than two metal contacts of the second electronic device contact with an electrode of the first electronic device. With reference to FIG. 32, when Tx electrode under the first metal disc is triggered, Tx electrode under the second metal disc is in a non-triggered state, in this case, the first metal disc and the touch screen constitute a capacitor, and the second metal disc constitutes the ground, the capacitor is connected to the ground via the metal wire between the discs, then a coupling current is formed, and the capacitive touch display screen is further triggered to generate a stable contact. Since voltages of different electrodes are different from each other, voltages of the two metal contacts are different in a case that the two metal contacts are not placed on the same electrode, and a current flows between the two metal contacts, in this case, the effective contact exists. In the embodiment of the invention, a contact of the two metal contacts at a side having a higher voltage is referred to as the effective contact.

In the embodiments of the invention, the capacitance of the capacitor between the metal disc and the capacitive touch display screen depends on the size of the metal disc, and a distance between the discs depends on a distance between adjacent electrodes in the touch screen, a capacitor is formed by the touch screen and one of the metal discs, and another of the metal discs constitutes the virtual ground at another position of the touch screen, the current may be coupled into the virtual ground by the capacitor, and a stable triggering is further formed. In addition, it is inadvisable that a width of the metal connection wire is large, and other processing is performed in a case that the width of the metal connection wire is large, for example, a position of the contact is raised, so that there is a certain distance between the metal connection wire and the touch screen when the NFC tag is placed, the processing ensures that other unstable contact will not be brought by the connection wire. The NFC antenna is inside of the NFC tag, and an unstable contact is also be brought by a coil antenna having a metal structure in some cases, taking this into account, it must ensure when the metal disc is designed that there is a certain distance between the NFC tag and the capacitive touch display screen when the NFC tag is placed on the capacitive touch display screen, the distance is related to the size of the coil antenna of the tag, and the distance is normally greater than or equal to 1 mm.

In step 2103, coordinate information of the effective contact is calculated based on current information of the effective contact.

Specifically, a small current of the electrode is brought from the contact by the metal disc of the effective contact. The current flows out of four electrodes at the four corners of the capacitive touch display screen, and the current flowing via the four electrodes is in a direct proportion to distances between the finger and the four corners, and the first electronic device obtains the coordinate information of the effective contact by performing precise calculation on ratios between the four current.

In step 2104, coordinate information of the second electronic device is determined based on the coordinate information of the effective contact.

In the embodiments of the invention, with reference to FIG. 33, in a case that the two metal contacts are placed on a same electrode, the two metal discs are above a same electrode Tx or a same electrode Rx, the virtual ground can not be formed on the touch screen, and the stable contact can not be realized, therefore, this is avoided by providing more than three metal discs in the NFC tag, since it is impossible that the more than three metal contacts are placed above a same electrode Tx or the electrode Rx simultaneously.

Based on this, in a case that there are more than three metal contacts in the NFC tag, an effective contact may be formed between every two metal contacts of the more than three metal contacts, therefore, the number of effective contacts is greater than or equal to 2. In the embodiments of the invention, coordinate information of more than two effective contacts is averaged, to determine the coordinate information of the second electronic device. Practically, the coordinate information of one of the effective contacts may also be set in advance as the coordinate information of the second electronic device.

In step 2105, a first instruction is generated based on the coordinate information and the ID information of the second electronic device.

In the embodiments of the invention, a corresponding first instruction is generated by combining the coordinate information and the ID information of the NFC tag, to recognize and position the NFC tag. In some scenarios, for example, in a case that the NFC tag is a chessman, and a chessboard is displayed by the capacitive touch display screen, the capacitive touch display screen may distinguish where the chessman is, and further generate a corresponding first instruction to response. Also for example, in a case that the NFC tag is a seal, and a paper is displayed by the capacitive touch display screen, the capacitive touch display screen may distinguish a content of the seal and where the seal is affixed, and further generate a corresponding first instruction to response.

In step 2106, a first operation is performed in response to the first instruction.

In the embodiments of the invention, when the second electronic device is placed on the touch display unit of the first electronic device, the first electronic device establishes the NFC communication connection with the second electronic device, and acquires the ID information of the second electronic device; furthermore, the touch display unit of the first electronic device can detect the effective contact of the more than two metal contacts in the second electronic device, and further acquire the coordinate information of the effective contact, the coordinate information of the effective contact is the coordinate information of the second electronic device; then, a corresponding operation is performed by combining the acquired ID information and the coordinate information of the second electronic device. In the technical solution according to the embodiment of the invention, the NFC tag can not only be recognized, but also be positioned.

Figure 22:
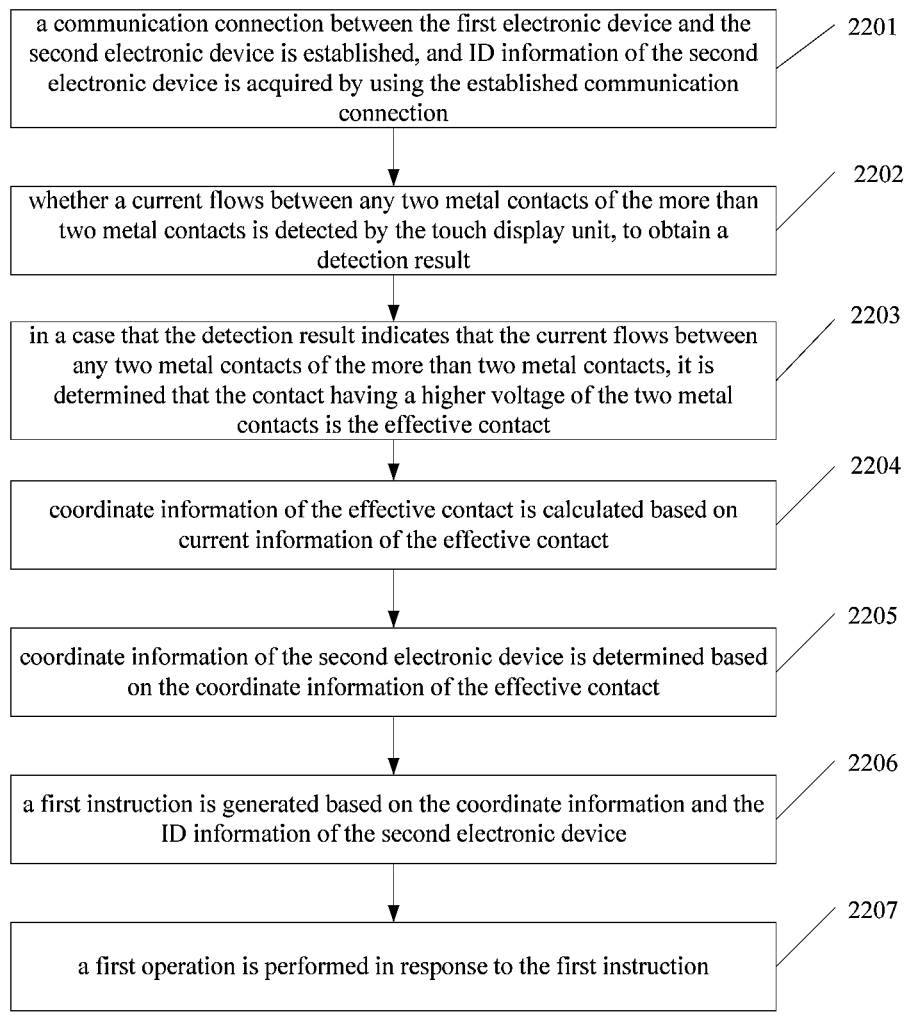
FIG. 22 is a schematic flow diagram of an interaction method according to an embodiment of the disclosure.

FIG. 22 is a schematic flow diagram of an interaction method according to a third embodiment of the invention, the interaction method in the embodiment is applied to a first electronic device, the first electronic device includes a touch display unit; the first electronic device can interact with a second electronic device; the second electronic device includes more than two metal contacts, and any two metal contacts of the more than two metal contacts are connected via a wire; with reference to FIG. 22, the interaction method includes step 2201 to step 2207.

In step 2201, a communication connection between the first electronic device and the second electronic device is established, and ID information of the second electronic device is acquired by using the established communication connection.

In the embodiment of the invention, the first electronic device may be an electronic device such as a mobile phone, a tablet PC, an all-in-one machine; this kind of electronic device includes a touch display unit, for example a capacitive touch display screen; the capacitive touch display screen operates by using body's current sensing, specifically, a contact may be formed when a finger comes into contact with the capacitive touch display screen, since that a person is acted as a conductor, and a capacitor is formed when the finger comes into contact with the capacitive touch display screen, a current generated by capacitance coupling is conducted to the ground via the body. Based on this, a condition for forming the contact is to form a stable capacitor by contacting the conductor with the capacitive touch display screen.

In the embodiments of the invention, the second electronic device is a NFC tag, a NFC antenna and a NFC chip are built into the NFC tag, and an operation mode of the NFC tag is a passive mode. Correspondingly, a NFC antenna and a NFC chip are built into the first electronic device, and an operation mode of the first electronic device is an active mode.

Specifically, the first electronic device transmits a RF signal actively by using the NFC antenna, and the RF signal is sensed by the NFC antenna in the second electronic device when the second electronic device gets close to the first electronic device, and the second electronic device establishes a NFC communication connection with the first electronic device; the first electronic device can read/write data in the second electronic device by the established NFC communication connection. In the embodiments of the invention, the first electronic device acquires the ID information of the second electronic device by the established NFC communication connection. Here, the ID information of the second electronic device is used to characterize attributes of the second electronic device, and the ID information of the second electronic device may be represented by a series of numbers, such as 122331122. The attributes of the second electronic device may characterize which tag the second electronic device is, such as a chessman-type tag or a seal-type tag.

In the embodiment of the invention, a RF field is provided by the first electronic device in a communication process, one of transmission rates 306 kpbs, 212 kbps and 424 kbps may be chosen to interact with the second electronic device. It is not necessary for the second electronic device to generate a RF field, and the second electronic device transmits data back to the first electronic device at the same rate by using a load modulated technology.

In step 2202, whether a current flows between any two metal contacts of the more than two metal contacts is detected by the touch display unit, to obtain a detection result.

In the embodiments of the invention, the second electronic device includes more than two metal contacts, and any two metal contacts of the more than two metal contacts are connected via a wire; specifically, with reference to FIG. 30, more than two metal discs having a certain size are printed at the bottom end of the NFC tag, and the more than two metal discs are connected by printing a metal wire.

In the embodiments of the invention, the touch display unit has a conducting layer, with reference to FIG. 31, the conducting layer includes a cluster of horizontal electrodes Tx and a cluster of vertical electrodes Rx; and specifically, voltages between any two electrodes of each cluster of the horizontal electrodes and each cluster of the vertical electrodes are different.

When the second electronic device is placed on the touch display unit of the first electronic device, more than two metal contacts of the second electronic device contact with an electrode of the first electronic device. With reference to FIG. 32, when Tx electrode under the first metal disc is triggered, Tx electrode under the second metal disc is in a non-triggered state, in this case, the first metal disc and the touch screen constitute a capacitor, and the second metal disc constitutes the ground, the capacitor is connected to the ground via the metal wire between the discs, then a coupling current is formed, and the capacitive touch display screen is further triggered to generate a stable contact. Since voltages of different electrodes are different from each other, voltages of the two metal contacts are different in a case that the two metal contacts are not placed on the same electrode, and a current flows between the two metal contacts, in this case, the effective contact exists. In the embodiment of the invention, a contact of the two metal contacts at a side having a higher voltage is referred to as the effective contact.

In step 2203, in a case that the detection result indicates that the current flows between any two metal contacts of the more than two metal contacts, it is determined that the contact having a higher voltage of the two metal contacts is the effective contact.

In the embodiments of the invention, the capacitance of the capacitor between the metal disc and the capacitive touch display screen depends on the size of the metal disc, and a distance between the discs depends on a distance between adjacent electrodes in the touch screen, a capacitor is formed by the touch screen and one of the metal discs, and another of the metal discs constitutes the virtual ground at another position of the touch screen, the current may be coupled into the virtual ground by the capacitor, and a stable triggering is further formed. In addition, it is inadvisable that a width of the metal connection wire is large, and other processing is performed in a case that the width of the metal connection wire is large, for example, a position of the contact is raised, so that there is a certain distance between the metal connection wire and the touch screen when the NFC tag is placed, the processing ensures that other unstable contact will not be brought by the connection wire. The NFC antenna is inside of the NFC tag, and an unstable contact is also be brought by a coil antenna having a metal structure in some cases, taking this into account, it must ensure when the metal disc is designed that there is a certain distance between the NFC tag and the capacitive touch display screen when the NFC tag is placed on the capacitive touch display screen, the distance is related to the size of the coil antenna of the tag, and the distance is normally greater than or equal to 1 mm.

In step 2204, coordinate information of the effective contact is calculated based on current information of the effective contact.

Specifically, a small current of the electrode is brought from the contact by the metal disc of the effective contact. The current flows out of four electrodes at the four corners of the capacitive touch display screen, and the current flowing via the four electrodes is in a direct proportion to distances between the finger and the four corners, and the first electronic device obtains the coordinate information of the effective contact by performing precise calculation on ratios between the four current.

In step 2205, coordinate information of the second electronic device is determined based on the coordinate information of the effective contact.

In the embodiments of the invention, with reference to FIG. 33, in a case that the two metal contacts are placed on a same electrode, the two metal discs are above a same electrode Tx or a same electrode Rx, the virtual ground can not be formed on the touch screen, and the stable contact can not be realized, therefore, this is avoided by providing more than three metal discs in the NFC tag, since it is impossible that the more than three metal contacts are placed above a same electrode Tx or the electrode Rx simultaneously.

Based on this, in a case that there are more than three metal contacts in the NFC tag, an effective contact may be formed between every two metal contacts of the more than three metal contacts, therefore, the number of effective contacts is greater than or equal to 2. In the embodiments of the invention, coordinate information of more than two effective contacts is averaged, to determine the coordinate information of the second electronic device. Practically, the coordinate information of one of the effective contacts may also be set in advance as the coordinate information of the second electronic device.

In step 2206, a first instruction is generated based on the coordinate information and the ID information of the second electronic device.

In the embodiments of the invention, a corresponding first instruction is generated by combining the coordinate information and the ID information of the NFC tag, to recognize and position the NFC tag. In some scenarios, for example, in a case that the NFC tag is a chessman, and a chessboard is displayed by the capacitive touch display screen, the capacitive touch display screen may distinguish where the chessman is, and further generate a corresponding first instruction to response. Also for example, in a case that the NFC tag is a seal, and a paper is displayed by the capacitive touch display screen, the capacitive touch display screen may distinguish a content of the seal and where the seal is affixed, and further generate a corresponding first instruction to response.

In step 2207, a first operation is performed in response to the first instruction.

In the embodiments of the invention, when the second electronic device is placed on the touch display unit of the first electronic device, the first electronic device establishes the NFC communication connection with the second electronic device, and acquires the ID information of the second electronic device; furthermore, the touch display unit of the first electronic device can detect the effective contact of the more than two metal contacts in the second electronic device, and further acquire the coordinate information of the effective contact, the coordinate information of the effective contact is the coordinate information of the second electronic device; then, a corresponding operation is performed by combining the acquired ID information and the coordinate information of the second electronic device. In the technical solution according to the embodiment of the invention, the NFC tag can not only be recognized, but also be positioned.

Figure 23:
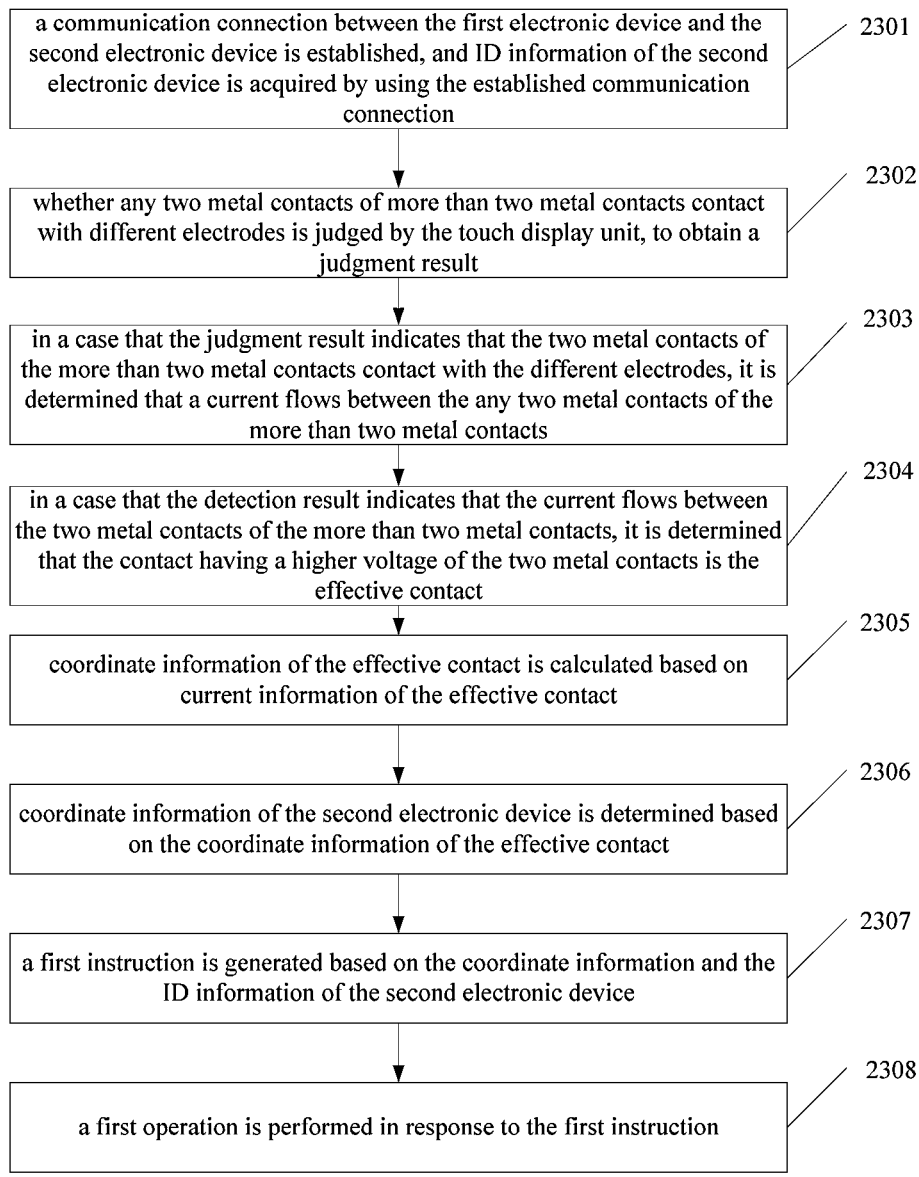
FIG. 23 is a schematic flow diagram of an interaction method according to an embodiment of the disclosure.

FIG. 23 is a schematic flow diagram of an interaction method according to a fourth embodiment of the invention, the interaction method in the embodiment is applied to a first electronic device, the first electronic device includes a touch display unit; the first electronic device can interact with a second electronic device; the second electronic device includes more than two metal contacts, and any two metal contacts of the more than two metal contacts are connected via a wire; with reference to FIG. 23, the interaction method includes step 2301 to step 2308.

In step 2301, a communication connection between the first electronic device and the second electronic device is established, and ID information of the second electronic device is acquired by using the established communication connection.

In the embodiments of the invention, the first electronic device may be an electronic device such as a mobile phone, a tablet PC, an all-in-one machine; this kind of electronic device includes a touch display unit, for example a capacitive touch display screen; the capacitive touch display screen operates by using body's current sensing, specifically, a contact may be formed when a finger comes into contact with the capacitive touch display screen, since that a person is acted as a conductor, and a capacitor is formed when the finger comes into contact with the capacitive touch display screen, a current generated by capacitance coupling is conducted to the ground via the body. Based on this, a condition for forming the contact is to form a stable capacitor by contacting the conductor with the capacitive touch display screen.

In the embodiment of the invention, the second electronic device is a NFC tag, a NFC antenna and a NFC chip are built into the NFC tag, and an operation mode of the NFC tag is a passive mode. Correspondingly, a NFC antenna and a NFC chip are built into the first electronic device, and an operation mode of the first electronic device is an active mode.

Specifically, the first electronic device transmits a RF signal actively by using the NFC antenna, and the RF signal is sensed by the NFC antenna in the second electronic device when the second electronic device gets close to the first electronic device, and the second electronic device establishes a NFC communication connection with the first electronic device; the first electronic device can read/write data in the second electronic device by the established NFC communication connection. In the embodiments of the invention, the first electronic device acquires the ID information of the second electronic device by the established NFC communication connection. Here, the ID information of the second electronic device is used to characterize attributes of the second electronic device, and the ID information of the second electronic device may be represented by a series of numbers, such as 122331122. The attributes of the second electronic device may characterize which tag the second electronic device is, such as a chessman-type tag or a seal-type tag.

In the embodiments of the invention, a RF field is provided by the first electronic device in a communication process, one of transmission rates 406 kpbs, 212 kbps and 424 kbps may be chosen to interact with the second electronic device. It is not necessary for the second electronic device to generate a RF field, and the second electronic device transmits data back to the first electronic device at the same rate by using a load modulated technology.

In step 2302, whether any two metal contacts of more than two metal contacts contact with different electrodes is judged by the touch display unit, to obtain a judgment result.

In the embodiments of the invention, the second electronic device includes more than two metal contacts, and any two metal contacts of the more than two metal contacts are connected via a wire; specifically, with reference to FIG. 30, more than two metal discs having a certain size are printed at the bottom end of the NFC tag, and the more than two metal discs are connected by printing a metal wire.

In the embodiments of the invention, the touch display unit has a conducting layer, with reference to FIG. 31, the conducting layer includes a cluster of horizontal electrodes Tx and a cluster of vertical electrodes Rx; and specifically, voltages between any two electrodes of each cluster of the horizontal electrodes and each cluster of the vertical electrodes are different.

In step 2303, in a case that the judgment result indicates that the two metal contacts of the more than two metal contacts contact with the different electrodes, it is determined that a current flows between the any two metal contacts of the more than two metal contacts.

When the second electronic device is placed on the touch display unit of the first electronic device, more than two metal contacts of the second electronic device contact with an electrode of the first electronic device. With reference to FIG. 32, when Tx electrode under the first metal disc is triggered, Tx electrode under the second metal disc is in a non-triggered state, in this case, the first metal disc and the touch screen constitute a capacitor, and the second metal disc constitutes the ground, the capacitor is connected to the ground via the metal wire between the discs, then a coupling current is formed, and the capacitive touch display screen is further triggered to generate a stable contact. Since voltages of different electrodes are different from each other, voltages of the two metal contacts are different in a case that the two metal contacts are not placed on the same electrode, and a current flows between the two metal contacts, in this case, the effective contact exists. In the embodiment of the invention, a contact of the two metal contacts at a side having a higher voltage is referred to as the effective contact.

In step 2304, in a case that the detection result indicates that the current flows between the two metal contacts of the more than two metal contacts, it is determined that the contact having a higher voltage of the two metal contacts is the effective contact.

In the embodiments of the invention, the capacitance of the capacitor between the metal disc and the capacitive touch display screen depends on the size of the metal disc, and a distance between the discs depends on a distance between adjacent electrodes in the touch screen, a capacitor is formed by the touch screen and one of the metal discs, and another of the metal discs constitutes the virtual ground at another position of the touch screen, the current may be coupled into the virtual ground by the capacitor, and a stable triggering is further formed. In addition, it is inadvisable that a width of the metal connection wire is large, and other processing is performed in a case that the width of the metal connection wire is large, for example, a position of the contact is raised, so that there is a certain distance between the metal connection wire and the touch screen when the NFC tag is placed, the processing ensures that other unstable contact will not be brought by the connection wire. The NFC antenna is inside of the NFC tag, and an unstable contact is also be brought by a coil antenna having a metal structure in some cases, taking this into account, it must ensure when the metal disc is designed that there is a certain distance between the NFC tag and the capacitive touch display screen when the NFC tag is placed on the capacitive touch display screen, the distance is related to the size of the coil antenna of the tag, and the distance is normally greater than or equal to 1 mm.

In step 2305, coordinate information of the effective contact is calculated based on current information of the effective contact.

Specifically, a small current of the electrode is brought from the contact by the metal disc of the effective contact. The current flows out of four electrodes at the four corners of the capacitive touch display screen, and the current flowing via the four electrodes is in a direct proportion to distances between the finger and the four corners, and the first electronic device obtains the coordinate information of the effective contact by performing precise calculation on ratios between the four current.

In step 2306, coordinate information of the second electronic device is determined based on the coordinate information of the effective contact.

In the embodiments of the invention, with reference to FIG. 33, in a case that the two metal contacts are placed on a same electrode, the two metal discs are above a same electrode Tx or a same electrode Rx, the virtual ground can not be formed on the touch screen, and the stable contact can not be realized, therefore, this is avoided by providing more than three metal discs in the NFC tag, since it is impossible that the more than three metal contacts are placed above a same electrode Tx or the electrode Rx simultaneously.

Based on this, in a case that there are more than three metal contacts in the NFC tag, an effective contact may be formed between every two metal contacts of the more than three metal contacts, therefore, the number of effective contacts is greater than or equal to 2. In the embodiments of the invention, coordinate information of more than two effective contacts is averaged, to determine the coordinate information of the second electronic device. Practically, the coordinate information of one of the effective contacts may also be set in advance as the coordinate information of the second electronic device.

In step 2307, a first instruction is generated based on the coordinate information and the ID information of the second electronic device.

In the embodiments of the invention, a corresponding first instruction is generated by combining the coordinate information and the ID information of the NFC tag, to recognize and position the NFC tag. In some scenarios, for example, in a case that the NFC tag is a chessman, and a chessboard is displayed by the capacitive touch display screen, the capacitive touch display screen may distinguish where the chessman is, and further generate a corresponding first instruction to response. Also for example, in a case that the NFC tag is a seal, and a paper is displayed by the capacitive touch display screen, the capacitive touch display screen may distinguish a content of the seal and where the seal is affixed, and further generate a corresponding first instruction to response.

In step 2308, a first operation is performed in response to the first instruction.

In the embodiments of the invention, when the second electronic device is placed on the touch display unit of the first electronic device, the first electronic device establishes the NFC communication connection with the second electronic device, and acquires the ID information of the second electronic device; furthermore, the touch display unit of the first electronic device can detect the effective contact of the more than two metal contacts in the second electronic device, and further acquire the coordinate information of the effective contact, the coordinate information of the effective contact is the coordinate information of the second electronic device; then, a corresponding operation is performed by combining the acquired ID information and the coordinate information of the second electronic device. In the technical solution according to the embodiment of the invention, the NFC tag can not only be recognized, but also be positioned.

Figure 24:
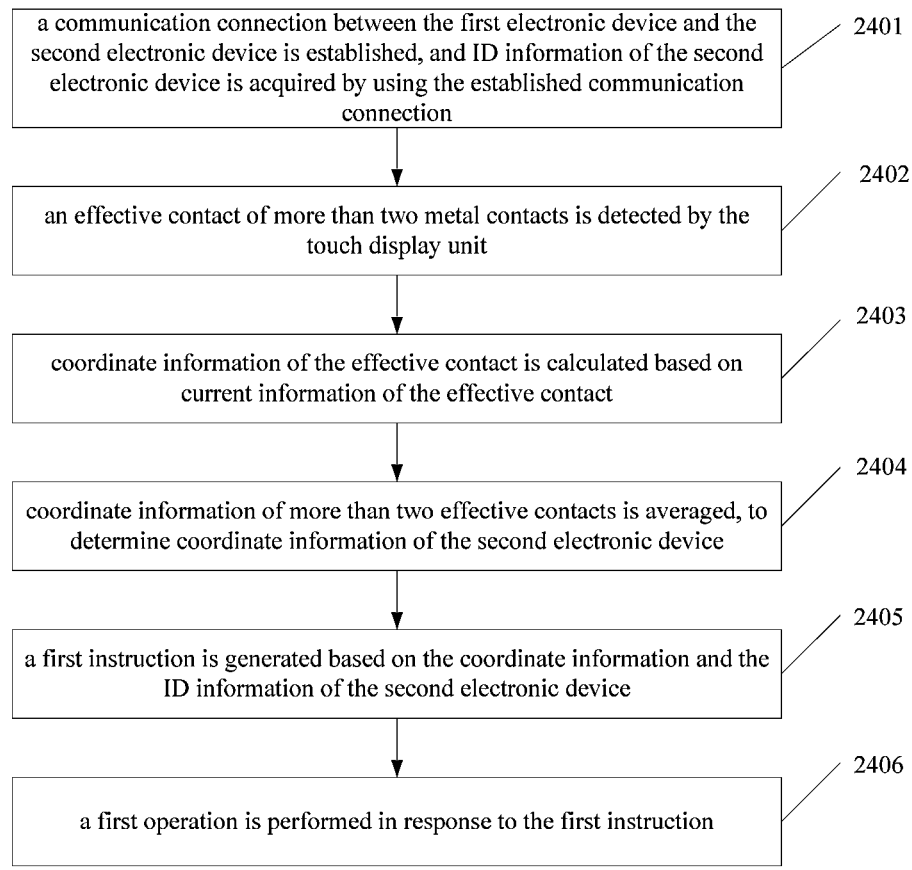
FIG. 24 is a schematic flow diagram of an interaction method according to an embodiment of the disclosure.

FIG. 24 is a schematic flow diagram of an interaction method according to a fifth embodiment of the invention, the interaction method in the embodiment is applied to a first electronic device, the first electronic device includes a touch display unit; the first electronic device can interact with a second electronic device; the second electronic device includes more than two metal contacts, and any two metal contacts of the more than two metal contacts are connected via a wire; with reference to FIG. 5, the interaction method includes step 2401 to step 2406.

In step 2401, a communication connection between the first electronic device and the second electronic device is established, and ID information of the second electronic device is acquired by using the established communication connection.

In the embodiment of the invention, the first electronic device may be an electronic device such as a mobile phone, a tablet PC, an all-in-one machine; this kind of electronic device includes a touch display unit, for example a capacitive touch display screen; the capacitive touch display screen operates by using body's current sensing, specifically, a contact may be formed when a finger comes into contact with the capacitive touch display screen, since that a person is acted as a conductor, and a capacitor is formed when the finger comes into contact with the capacitive touch display screen, a current generated by capacitance coupling is conducted to the ground via the body. Based on this, a condition for forming the contact is to form a stable capacitor by contacting the conductor with the capacitive touch display screen.

In the embodiments of the invention, the second electronic device is a NFC tag, a NFC antenna and a NFC chip are built into the NFC tag, and an operation mode of the NFC tag is a passive mode. Correspondingly, a NFC antenna and a NFC chip are built into the first electronic device, and an operation mode of the first electronic device is an active mode.

Specifically, the first electronic device transmits a RF signal actively by using the NFC antenna, and the RF signal is sensed by the NFC antenna in the second electronic device when the second electronic device gets close to the first electronic device, and the second electronic device establishes a NFC communication connection with the first electronic device; the first electronic device can read/write data in the second electronic device by the established NFC communication connection. In the embodiments of the invention, the first electronic device acquires the ID information of the second electronic device by the established NFC communication connection. Here, the ID information of the second electronic device is used to characterize attributes of the second electronic device, and the ID information of the second electronic device may be represented by a series of numbers, such as 122331122. The attributes of the second electronic device may characterize which tag the second electronic device is, such as a chessman-type tag or a seal-type tag.

In the embodiment of the invention, a RF field is provided by the first electronic device in a communication process, one of transmission rates 506 kpbs, 212 kbps and 424 kbps may be chosen to interact with the second electronic device. It is not necessary for the second electronic device to generate a RF field, and the second electronic device transmits data back to the first electronic device at the same rate by using a load modulated technology.

In step 2402, an effective contact of more than two metal contacts is detected by the touch display unit.

In the embodiments of the invention, the second electronic device includes more than two metal contacts, and any two metal contacts of the more than two metal contacts are connected via a wire; specifically, with reference to FIG. 30, more than two metal discs having a certain size are printed at the bottom end of the NFC tag, and the more than two metal discs are connected by printing a metal wire.

In the embodiments of the invention, the touch display unit has a conducting layer, with reference to FIG. 31, the conducting layer includes a cluster of horizontal electrodes Tx and a cluster of vertical electrodes Rx; and specifically, voltages between any two electrodes of each cluster of the horizontal electrodes and each cluster of the vertical electrodes are different.

When the second electronic device is placed on the touch display unit of the first electronic device, more than two metal contacts of the second electronic device contact with an electrode of the first electronic device. With reference to FIG. 32, when Tx electrode under the first metal disc is triggered, Tx electrode under the second metal disc is in a non-triggered state, in this case, the first metal disc and the touch screen constitute a capacitor, and the second metal disc constitutes the ground, the capacitor is connected to the ground via the metal wire between the discs, then a coupling current is formed, and the capacitive touch display screen is further triggered to generate a stable contact. Since voltages of different electrodes are different from each other, voltages of the two metal contacts are different in a case that the two metal contacts are not placed on the same electrode, and a current flows between the two metal contacts, in this case, the effective contact exists. In the embodiment of the invention, a contact of the two metal contacts at a side having a higher voltage is referred to as the effective contact.

In the embodiments of the invention, the capacitance of the capacitor between the metal disc and the capacitive touch display screen depends on the size of the metal disc, and a distance between the discs depends on a distance between adjacent electrodes in the touch screen, a capacitor is formed by the touch screen and one of the metal discs, and another of the metal discs constitutes the virtual ground at another position of the touch screen, the current may be coupled into the virtual ground by the capacitor, and a stable triggering is further formed. In addition, it is inadvisable that a width of the metal connection wire is large, and other processing is performed in a case that the width of the metal connection wire is large, for example, a position of the contact is raised, so that there is a certain distance between the metal connection wire and the touch screen when the NFC tag is placed, the processing ensures that other unstable contact will not be brought by the connection wire. The NFC antenna is inside of the NFC tag, and an unstable contact is also be brought by a coil antenna having a metal structure in some cases, taking this into account, it must ensure when the metal disc is designed that there is a certain distance between the NFC tag and the capacitive touch display screen when the NFC tag is placed on the capacitive touch display screen, the distance is related to the size of the coil antenna of the tag, and the distance is normally greater than or equal to 1 mm.

In step 2403, coordinate information of the effective contact is calculated based on current information of the effective contact.

Specifically, a small current of the electrode is brought from the contact by the metal disc of the effective contact. The current flows out of four electrodes at the four corners of the capacitive touch display screen, and the current flowing via the four electrodes is in a direct proportion to distances between the finger and the four corners, and the first electronic device obtains the coordinate information of the effective contact by performing precise calculation on ratios between the four current.

In step 2404, coordinate information of more than two effective contacts is averaged, to determine coordinate information of the second electronic device.

In the embodiments of the invention, with reference to FIG. 33, in a case that the two metal contacts are placed on a same electrode, the two metal discs are above a same electrode Tx or a same electrode Rx, the virtual ground can not be formed on the touch screen, and the stable contact can not be realized, therefore, this is avoided by providing more than three metal discs in the NFC tag, since it is impossible that the more than three metal contacts are placed above a same electrode Tx or the electrode Rx simultaneously.

Based on this, in a case that there are more than three metal contacts in the NFC tag, an effective contact may be formed between every two metal contacts of the more than three metal contacts, therefore, the number of effective contacts is greater than or equal to 2. In the embodiments of the invention, the coordinate information of the more than two effective contacts is averaged, to determine the coordinate information of the second electronic device. Practically, the coordinate information of one of the effective contacts may also be set in advance as the coordinate information of the second electronic device.

In step 2405, a first instruction is generated based on the coordinate information and the ID information of the second electronic device.

In the embodiments of the invention, a corresponding first instruction is generated by combining the coordinate information and the ID information of the NFC tag, to recognize and position the NFC tag. In some scenarios, for example, in a case that the NFC tag is a chessman, and a chessboard is displayed by the capacitive touch display screen, the capacitive touch display screen may distinguish where the chessman is, and further generate a corresponding first instruction to response. Also for example, in a case that the NFC tag is a seal, and a paper is displayed by the capacitive touch display screen, the capacitive touch display screen may distinguish a content of the seal and where the seal is affixed, and further generate a corresponding first instruction to response.

In step 2406, a first operation is performed in response to the first instruction.

In the embodiments of the invention, when the second electronic device is placed on the touch display unit of the first electronic device, the first electronic device establishes the NFC communication connection with the second electronic device, and acquires the ID information of the second electronic device; furthermore, the touch display unit of the first electronic device can detect the effective contact of the more than two metal contacts in the second electronic device, and further acquire the coordinate information of the effective contact, the coordinate information of the effective contact is the coordinate information of the second electronic device; then, a corresponding operation is performed by combining the acquired ID information and the coordinate information of the second electronic device. In the technical solution according to the embodiment of the invention, the NFC tag can not only be recognized, but also be positioned.

Figure 25:
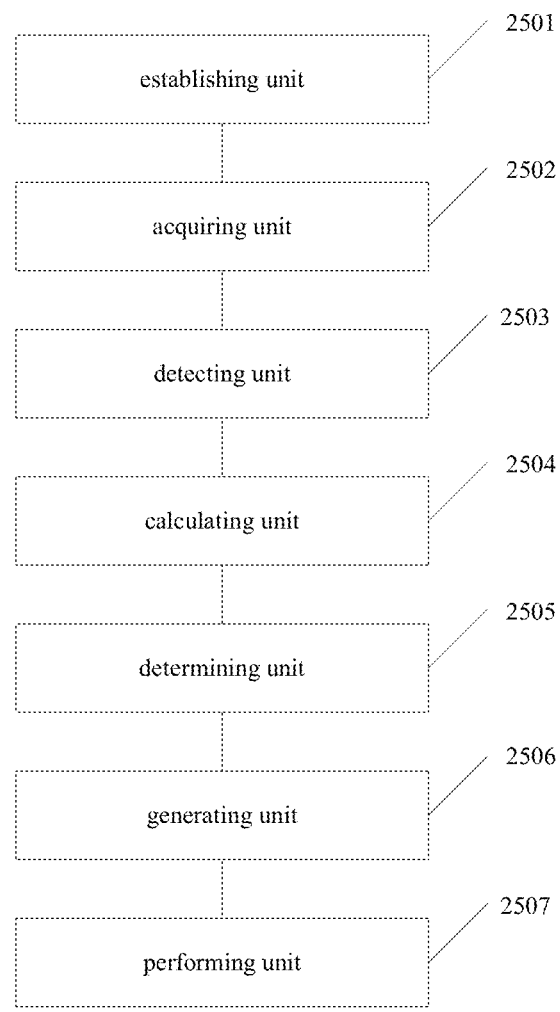
FIG. 25 is a schematic structural constitutional diagram of an electronic device according to an embodiment of the disclosure.

FIG. 25 is a schematic structural constitutional diagram of an electronic device according to a first embodiment of the invention, the electronic device includes a touch display unit; the electronic device can interact with a second electronic device; the second electronic device includes more than two metal contacts, and any two metal contacts of the more than two metal contacts are connected via a wire, the electronic device further includes:

an establishing unit 2501, configured to establish a communication connection between the electronic device and the second electronic device;

an acquiring unit 2502, configured to acquire Identity (ID) information of the second electronic device by using the established communication connection;

a detecting unit 2503, configured to detect an effective contact of the more than two metal contacts by the touch display unit;

a calculating unit 2504, configured to calculate coordinate information of the effective contact based on current information of the effective contact;

a determining unit 2505, configured to determine coordinate information of the second electronic device based on the coordinate information of the effective contact;

a generating unit 2506, configured to generate a first instruction based on the coordinate information and the ID information of the second electronic device; and an performing unit 2507, configured to perform a first operation in response to the first instruction.

It should be understood by those skilled in the art that a function realized by each unit in the electronic device according to the embodiment of the invention can be understood by referring to a related description for the interaction method described above. The function of each unit in the electronic device according to the embodiment of the invention may be realized by a program run on the processor, and may also be realized by a logic circuit.

Figure 26:
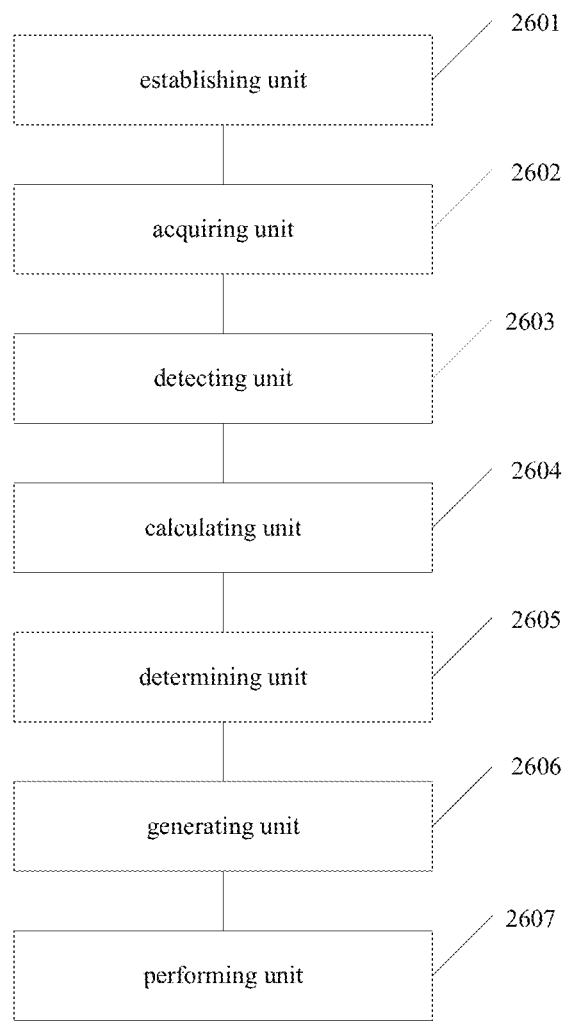
FIG. 26 is a schematic structural constitutional diagram of an electronic device according to an embodiment of the disclosure.

FIG. 26 is a schematic structural constitutional diagram of an electronic device according to a second embodiment of the invention, the electronic device includes a touch display unit; the electronic device can interact with a second electronic device; the second electronic device includes more than two metal contacts, and any two metal contacts of the more than two metal contacts are connected via a wire, the electronic device further includes:

an establishing unit 2601, configured to establish a communication connection between the electronic device and the second electronic device;

an acquiring unit 2602, configured to acquire Identity (ID) information of the second electronic device by using the established communication connection;

a detecting unit 2603, configured to detect an effective contact of the more than two metal contacts by the touch display unit;

a calculating unit 2604, configured to calculate coordinate information of the effective contact based on current information of the effective contact;

a determining unit 2605, configured to determine coordinate information of the second electronic device based on the coordinate information of the effective contact;

a generating unit 2606, configured to generate a first instruction based on the coordinate information and the ID information of the second electronic device; and an performing unit 2607, configured to perform a first operation in response to the first instruction.

Preferably, the establishing unit 2601 is further configured to establish a communication connection between the first electronic device and the second electronic device by using Near Field Communication (NFC).

It should be understood by those skilled in the art that a function realized by each unit in the electronic device according to the embodiment of the invention can be understood by referring to a related description for the interaction method described above. The function of each unit in the electronic device according to the embodiment of the invention may be realized by a program run on the processor, and may also be realized by a logic circuit.

Figure 27:
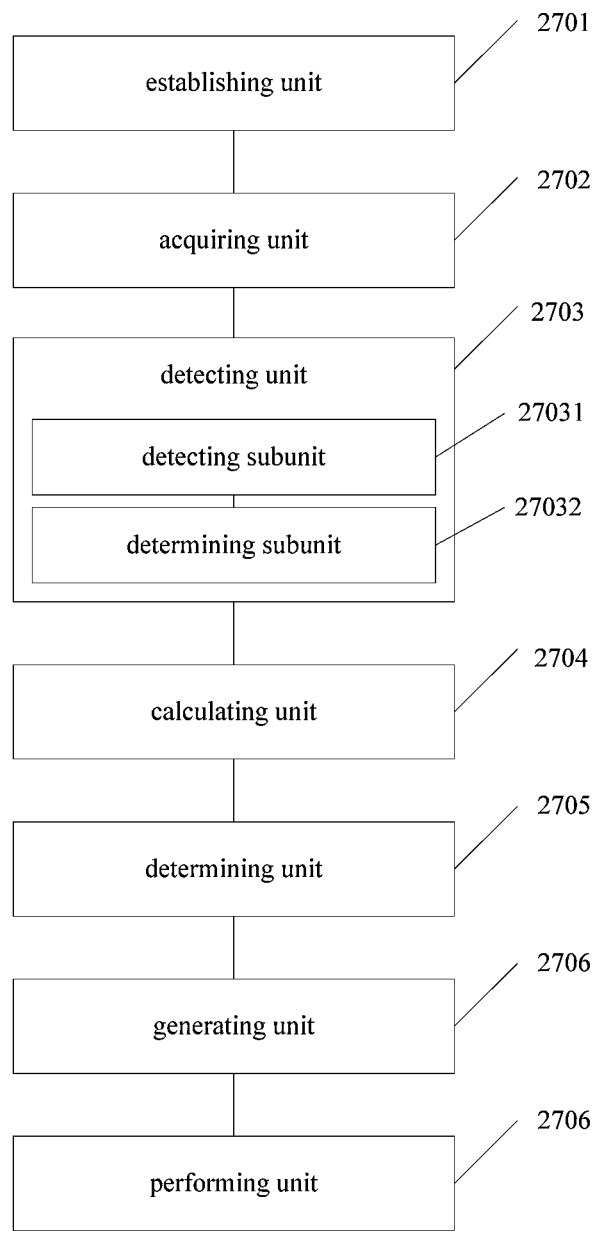
FIG. 27 is a schematic structural constitutional diagram of an electronic device according to an embodiment of the disclosure.

FIG. 27 is a schematic structural constitutional diagram of an electronic device according to a third embodiment of the invention, the electronic device includes a touch display unit; the electronic device can interact with a second electronic device; the second electronic device includes more than two metal contacts, and any two metal contacts of the more than two metal contacts are connected via a wire, the electronic device further includes:

an establishing unit 2701, configured to establish a communication connection between the electronic device and the second electronic device;

an acquiring unit 2702, configured to acquire Identity (ID) information of the second electronic device by using the established communication connection;

a detecting unit 2703, configured to detect an effective contact of the more than two metal contacts by the touch display unit;

a calculating unit 2704, configured to calculate coordinate information of the effective contact based on current information of the effective contact;

a determining unit 2705, configured to determine coordinate information of the second electronic device based on the coordinate information of the effective contact;

a generating unit 2706, configured to generate a first instruction based on the coordinate information and the ID information of the second electronic device; and an performing unit 2707, configured to perform a first operation in response to the first instruction.

Preferably, the detecting unit 2703 includes:

a detecting subunit 27031, configured to detect whether a current flows between any two metal contacts of the more than two metal contacts by the touch display unit, to obtain a detection result; and a determining subunit 27032, configured to, in a case that the detection result indicates that the current flows between any two metal contacts of the more than two metal contacts, determine that the contact having a higher voltage of the two metal contacts is the effective contact.

It should be understood by those skilled in the art that a function realized by each unit in the electronic device according to the embodiment of the invention can be understood by referring to a related description for the interaction method described above. The function of each unit in the electronic device according to the embodiment of the invention may be realized by a program run on the processor, and may also be realized by a logic circuit.

Figure 28:
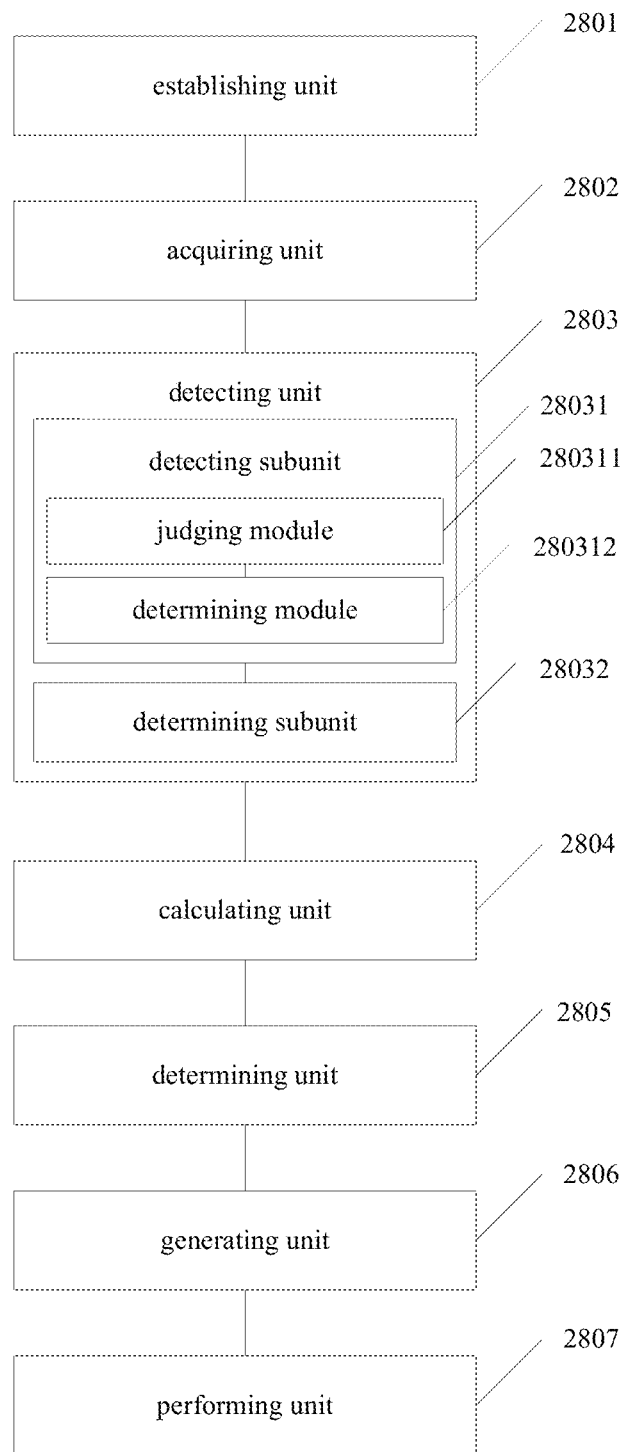
FIG. 28 is a schematic structural constitutional diagram of an electronic device according to an embodiment of the disclosure.

FIG. 28 is a schematic structural constitutional diagram of an electronic device according to a fourth embodiment of the invention, the electronic device includes a touch display unit; the electronic device can interact with a second electronic device; the second electronic device includes more than two metal contacts, and any two metal contacts of the more than two metal contacts are connected via a wire, the electronic device further includes:

an establishing unit 2801, configured to establish a communication connection between the electronic device and the second electronic device;

an acquiring unit 2802, configured to acquire Identity (ID) information of the second electronic device by using the established communication connection;

a detecting unit 2803, configured to detect an effective contact of the more than two metal contacts by the touch display unit;

a calculating unit 2804, configured to calculate coordinate information of the effective contact based on current information of the effective contact;

a determining unit 2805, configured to determine coordinate information of the second electronic device based on the coordinate information of the effective contact;

a generating unit 2806, configured to generate a first instruction based on the coordinate information and the ID information of the second electronic device; and an performing unit 2807, configured to perform a first operation in response to the first instruction.

Preferably, the detecting unit 2803 includes:

a detecting subunit 28031, configured to detect whether a current flows between any two metal contacts of the more than two metal contacts by the touch display unit, to obtain a detection result; and a determining subunit 28032 configured to, in a case that the detection result indicates that the current flows between any two metal contacts of the more than two metal contacts, determine that the contact having a higher voltage of the two metal contacts is the effective contact.

Preferably, the touch display unit includes a conducting layer, the conducting layer includes a cluster of horizontal electrodes Tx and a cluster of vertical electrodes Rx; and specifically, voltages between any two electrodes of each cluster of horizontal electrodes and each cluster of vertical electrodes are different; the detecting subunit 28031 includes:

a judging module 280311, configured to judge whether any two metal contacts of the more than two metal contacts contact with different electrodes by the touch display unit, to obtain a judgment result; and a determining module 280312, configured to, in a case that the judgment result indicates that any two metal contacts of the more than two metal contacts come into contact with different electrodes, determine that a current flows between the two metal contacts of the more than two metal contacts.

It should be understood by those skilled in the art that a function realized by each unit in the electronic device according to the embodiment of the invention can be understood by referring to a related description for the interaction method described above. The function of each unit in the electronic device according to the embodiment of the invention may be realized by a program run on the processor, and may also be realized by a logic circuit.

Figure 29:
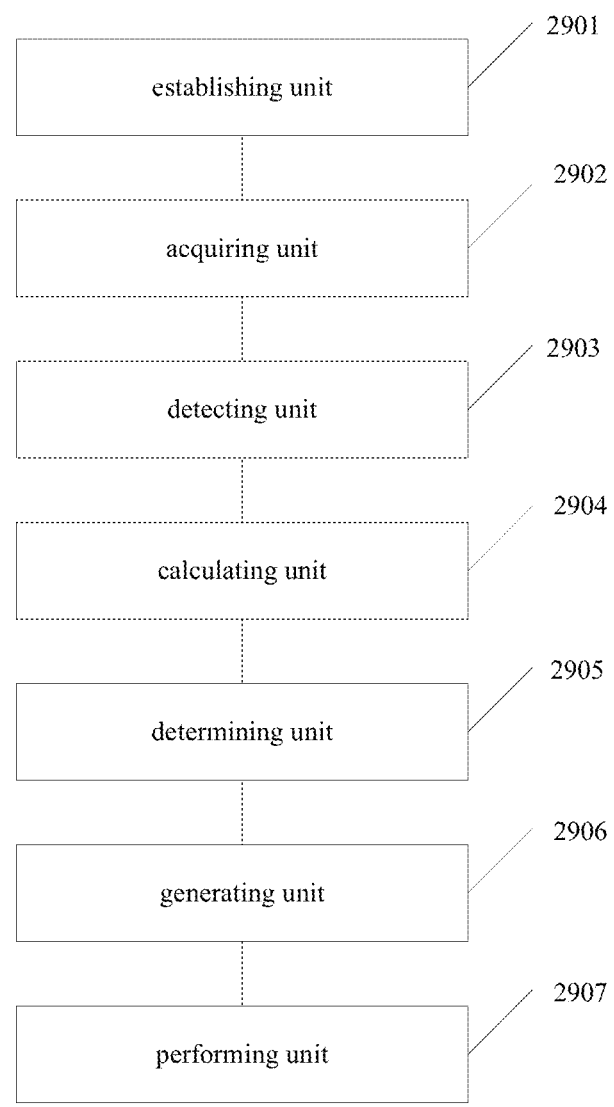
FIG. 29 is a schematic structural constitutional diagram of an electronic device according to an embodiment of the disclosure.

FIG. 29 is a schematic structural constitutional diagram of an electronic device according to a fifth embodiment of the invention, the electronic device includes a touch display unit; the electronic device can interact with a second electronic device; the second electronic device includes more than two metal contacts, and any two metal contacts of the more than two metal contacts are connected via a wire, the electronic device further includes:

an establishing unit 2901, configured to establish a communication connection between the electronic device and the second electronic device;

an acquiring unit 2902, configured to acquire Identity (ID) information of the second electronic device by using the established communication connection;

a detecting unit 2903, configured to detect an effective contact of the more than two metal contacts by the touch display unit;

a calculating unit 2904, configured to calculate coordinate information of the effective contact based on current information of the effective contact;

a determining unit 2905, configured to determine coordinate information of the second electronic device based on the coordinate information of the effective contact;

a generating unit 2906, configured to generate a first instruction based on the coordinate information and the ID information of the second electronic device; and an performing unit 2907, configured to perform a first operation in response to the first instruction.

Preferably, in a case that the number of the effective contacts is greater than or equal to 2, the determining unit 2905 is further configured to average coordinate information of more than two effective contacts, to determine coordinate information of the second electronic device.

Figure 34:
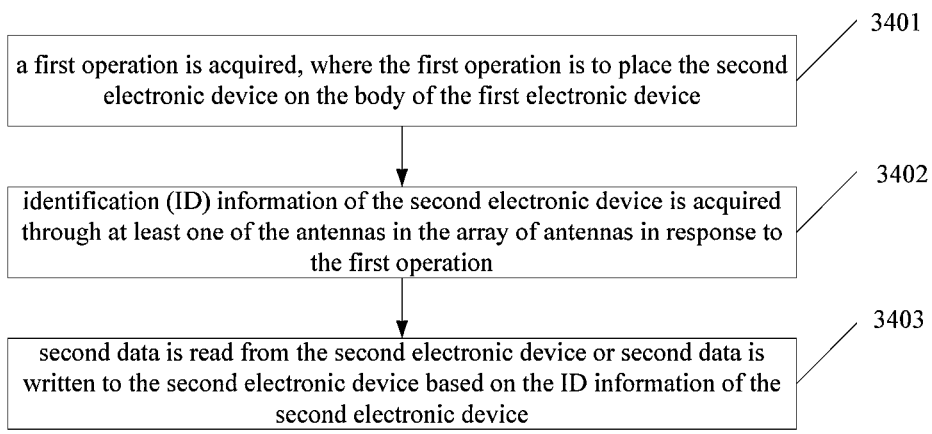
FIG. 34 is a schematic flow chart of a method for processing information according to an embodiment of the disclosure.

A schematic flow chart of a method for processing information according to a first embodiment of the present disclosure is shown in FIG. 34. The method for processing information in the present embodiment is applied to a first electronic device which can interact with a second electronic device. More than one array of antennas arranged in parallel are distributed in a body of the first electronic device. A value of a first parameter of each antenna in the array of antennas arranged in parallel is less than or equal to that of a second parameter of the second electronic device. A distance between two adjacent antennas in the array of antennas arranged in parallel is less than or equal to a first threshold. As shown in FIG. 34, the method for processing information includes following steps 3401 to 3403.

In step 3401, a first operation is acquired, where the first operation is to place the second electronic device on the body of the first electronic device.

In the embodiments of the present disclosure, the first electronic device is a NFC card reader, and the second electronic device is a NFC tag. NFC antennas are arranged at under the screen of the first electronic device, and NFC antennas are arranged inside the second electronic device. The first electronic device can exchange data with the second electronic device through the NFC antennas.

In the embodiments of the present disclosure, more than one array of antennas arranged in parallel are distributed under the screen of the first electronic device, a value of a first parameter of each antenna in the array of antennas arranged in parallel is less than or equal to that of a second parameter of the second electronic device, and a distance between two adjacent antennas in the array of antennas arranged in parallel is less than or equal to a first threshold.

Figure 42:
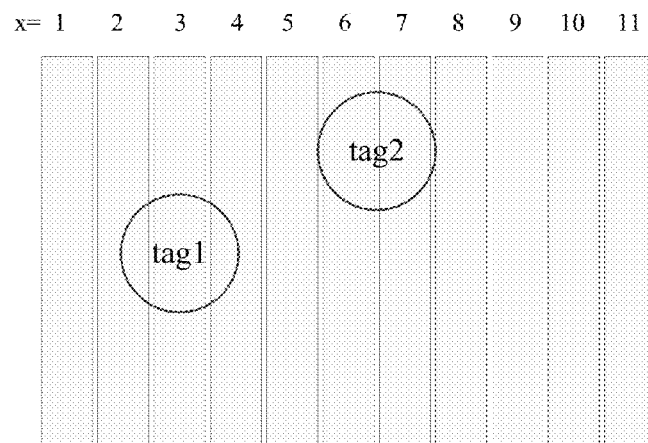
FIG. 42 is a schematic diagram of an array of antennas according to an embodiment of the disclosure.

Referring to FIG. 42, an array of antennas arranged in parallel is distributed under the screen of the first electronic device. The antennas in the array of antennas each have a stripe shape. The first parameter of the antenna with the stripe shape is the width of the antenna, the value of which is less than or equal to that of the second parameter of the second electronic device, i.e. For example, the second electronic device may be circular, and the width of the antenna with the stripe shape is less than or equal to the radius of the second electronic device. The length of the antenna with the stripe shape is equal to the width or length of the screen. The length of the antennas with the stripe shape is generally less than 40 cm. Once the second electronic device is on the screen, the second electronic device can be read through at least one antenna with the stripe shape. As shown in FIG. 42, tag1 can be read through one antenna, and tag2 can be read through two antennas at the same time. The distance between the two adjacent antennas is less than or equal to a first threshold which is less than or equal to the radius of the second electronic device, such that the case that a tag cannot be read through any one of the antennas can be avoided.

Figure 43:
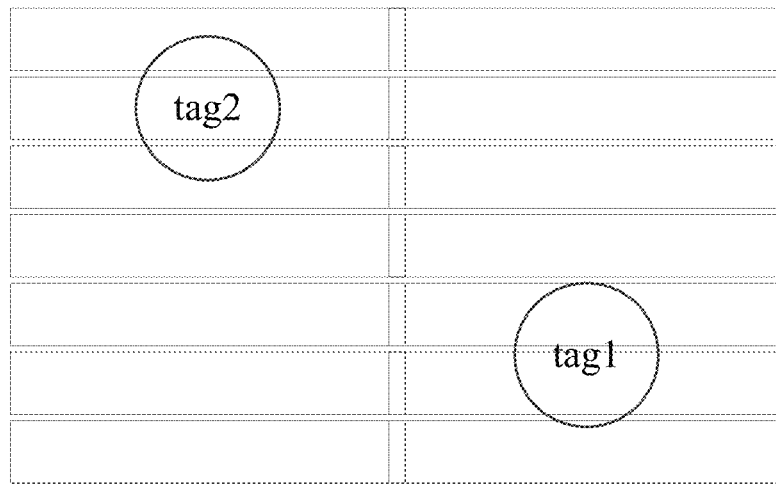
FIG. 43 is a schematic diagram of an array of antennas according to an embodiment of the disclosure.

If the size of the first electronic device is larger, two arrays of antennas arranged in parallel as shown in FIG. 43 can be distributed under the screen. As shown in FIG. 43, the lengths of the two antennas with the stripe shape are equal to the length of the screen.

If the second electronic device is placed on the body of the first electronic device, it means that the second electronic device is placed on the screen of the first electronic device.

In step 3402, identification (ID) information of the second electronic device is acquired through at least one of the antennas in the array of antennas in response to the first operation.

In the embodiments of the present disclosure, the ID information of the second electronic device can be acquired through the array of antennas distributed under the screen when the second electronic device is placed on the screen of the first electronic device.

In the embodiments of the present disclosure, the operation mode of the first electronic device is an active mode, and the operation mode of the second electronic device is a passive mode. Specifically, a radio frequency signal is transmitted actively by the first electronic device using the NFC antenna. When the second electronic device gets closer to the first electronic device, the radio frequency signal is sensed by the NFC antenna in the second electronic device and an NFC communication connection is established between the second electronic device and the first electronic device. The ID information of the second electronic device is acquired through the established NFC communication connection. Here, the ID information of the second electronic device is used to characterize the attribute of the second electronic device, and the ID information of the second electronic device may be represented by a series of numbers, such as 122331122. The attribute of the second electronic device may be used to characterize that which tag is represented by the second electronic device.

In the embodiments of the present disclosure, radio frequency switches control the antennas in the array of antennas to be turned on in a predetermined order. The input/output impedance of the radio frequency switch is 50 ohm, and a signal can be transmitted on a coaxial cable, such that the loss is decreased and the long distance transmission of signal can be achieved. And then the ID information of the second electronic device can be obtained through an antenna which is on the on-state. The ID information of the second electronic device is acquired through at least one of the antennas in the array of antennas. Referring to FIG. 42, the ID information of tag1 may be acquired through antenna 3, and the ID information of tag2 may be acquired through antenna 6 and antenna 7.

In the above solution, a Personal Computer (PC) can communicate with a Micro Control Unit (MCU) through a Universal Serial Bus (USB) interface. Different instructions are transmitted by the PC to the MCU to control ON/OFF of the radio frequency switch the operation mode of the radio frequency switch. The ON/OFF of the radio frequency switch is controlled by the MCU.

In step 3403, second data is read from the second electronic device or second data is written to the second electronic device based on the ID information of the second electronic device.

In the embodiments of the present disclosure, the ID information of the NFC tag can be obtained through at least one of the antennas in the array of antennas and the data of the NFC tag can be read/written based on the ID information when the NFC tag is placed on the screen of the NFC card reader. Thereby, it is achieved that the NFC tag at anywhere on the screen of the NFC card reader can be identified. That is to say, the ID information of the NFC tag can be acquired stably by the NFC card reader once the NFC tag is placed on the screen of the NFC card reader, and thus the seamless identification of the NFC card reader is achieved.

Figure 35:
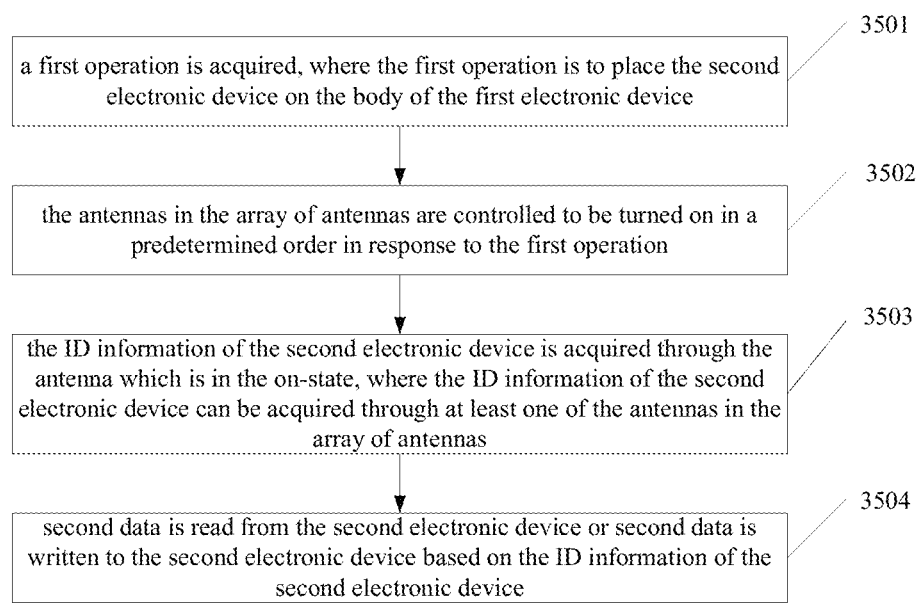
FIG. 35 is a schematic flow chart of a method for processing information according to an embodiment of the disclosure.

A schematic flow chart of a method for processing information according to a second embodiment of the present disclosure is shown in FIG. 35. The method for processing information in the present embodiment is applied to a first electronic device which can interact with a second electronic device. More than one array of antennas arranged in parallel are distributed in a body of the first electronic device. A value of a first parameter of each antenna in the array of antennas arranged in parallel is less than or equal to that of a second parameter of the second electronic device. A distance between two adjacent antennas in the array of antennas is less than or equal to a first threshold. As shown in FIG. 35, the method for processing information includes following steps 3501 to 3504.

In step 3501, a first operation is acquired, where the first operation is to place the second electronic device on the body of the first electronic device.

In the embodiments of the present disclosure, the first electronic device is a NFC card reader, and the second electronic device is a NFC tag. NFC antennas are arranged under the screen of the first electronic device, and NFC antennas are arranged inside the second electronic device. The first electronic device can exchange data with the second electronic device through the NFC antennas.

In the embodiments of the present disclosure, more than one array of antennas arranged in parallel are distributed under the screen of the first electronic device, a value of a first parameter of each antenna in the array of antennas is less than or equal to that of a second parameter of the second electronic device, and a distance between two adjacent antennas in the array of antennas arranged in parallel is less than or equal to a first threshold.

Referring to FIG. 42, an array of antennas arranged in parallel is distributed under the screen of the first electronic device. The antennas in the array of antennas each have a stripe shape. The first parameter of the antenna with the stripe shape is the width of the antenna, the value of which is less than or equal to that of the second parameter of the second electronic device, i.e. For example, the second electronic device may be circular, and the width of the antenna with the stripe shape is less than or equal to the radius of the second electronic device. The length of the antenna with the stripe shape is equal to the width or length of the screen. The length of the antenna with the stripe shape is generally less than 40 cm. Once the second electronic device is on the screen, the second electronic device can be read through at least one antenna with the stripe shape. As shown in FIG. 42, tag1 can be read through one antenna, and tag2 can be read through two antennas at the same time. The distance between the two adjacent antennas is less than or equal to a first threshold which is less than or equal to the radius of the second electronic device, such that the case that a tag cannot be read through any one of the antennas can be avoided.

If the size of the first electronic device is larger, two arrays of antennas arranged in parallel as shown in FIG. 43 can be distributed under the screen. As shown in FIG. 43, the lengths of the two antennas with the stripe shape are equal to the length of the screen.

If the second electronic device is placed on the body of the first electronic device, it means that the second electronic device is placed on the screen of the first electronic device.

In step 3502, the antennas in the array of antennas are controlled to be turned on in a predetermined order in response to the first operation.

In the embodiments of the present disclosure, radio frequency switches control the antennas in the array of antennas to be turned on in a predetermined order. The input/output impedance of the radio frequency switch is 50 ohm, and a signal can be transmitted on a coaxial cable, such that the loss is decreased and the long distance transmission of signal can be achieved. And then the ID information of the second electronic device can be obtained through the conducted antenna, referring to following step 3503.

In the above solution, a Personal Computer (PC) can communicate with a Micro Control Unit (MCU) through a Universal Serial Bus (USB) interface. Different instructions are transmitted by the PC to the MCU to control ON/OFF of the radio frequency switch the operation mode of the radio frequency switch. The ON/OFF of the radio frequency switch is controlled by the MCU.

In step 3503, the ID information of the second electronic device is acquired through the antenna which is in the on-state, where the ID information of the second electronic device can be acquired through at least one of the antennas in the array of antennas.

In the embodiments of the present disclosure, the ID information of the second electronic device can be acquired through an antenna which is in the on-state when the second electronic device is placed on the screen of the first electronic device.

In the embodiments of the present disclosure, the ID information of the second electronic device is used to characterize the attribute of the second electronic device, and the ID information of the second electronic device may be represented by a series of numbers, such as 122331122. The attribute of the second electronic device may be used to characterize that which label is represented by the second electronic device.

Referring to FIG. 42, the ID information of tag 1 may be acquired through antenna 3, and the ID information of tag2 may be acquired through antenna 6 and antenna 7.

In step 3504, second data is read from the second electronic device or second data is written to the second electronic device based on the ID information of the second electronic device.

In the embodiments of the present disclosure, the ID information of the NFC tag can be acquired through at least one of the antennas in the array of antennas and the data of the NFC tag can be read/written based on the ID information when the NFC tag is placed on the screen of the NFC card reader. Thereby, it is achieved that the NFC tag at anywhere on the screen of the NFC card reader can be identified. That is to say, the ID information of the NFC tag can be acquired stably by the NFC card reader when the NFC tag is placed on the screen of the NFC card reader, and thus the seamless identification of the NFC card reader is achieved.

Figure 36:
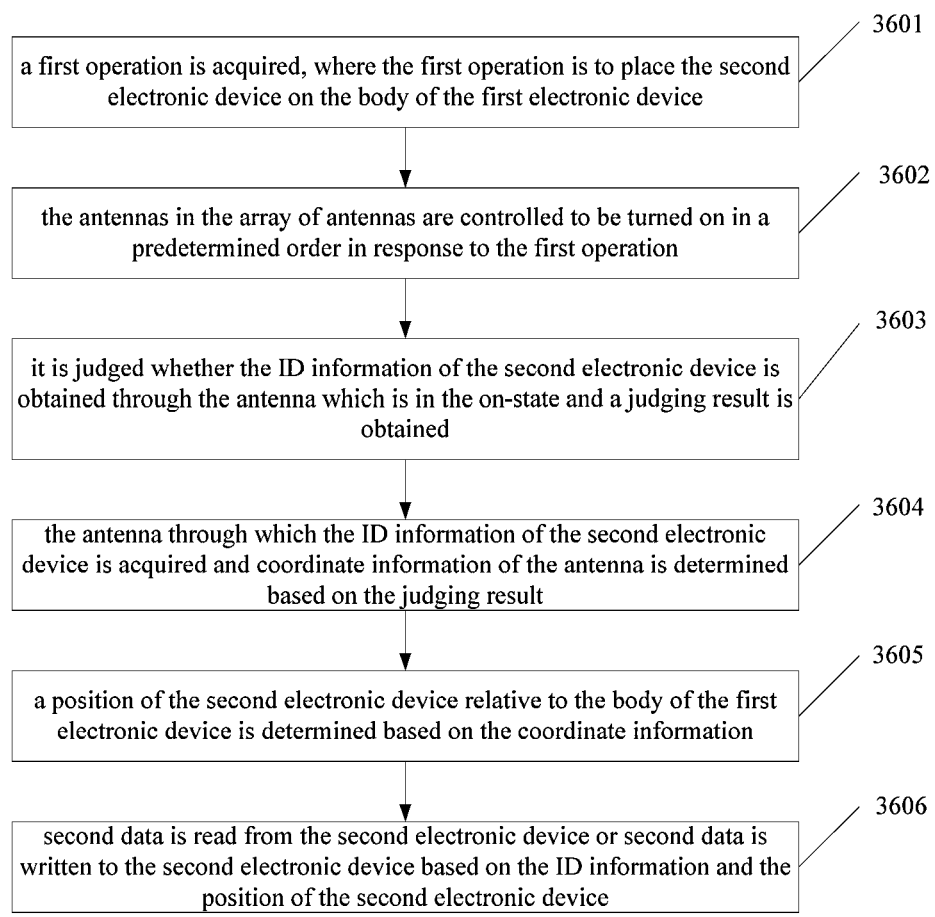
FIG. 36 is a schematic flow chart of a method for processing information according to an embodiment of the disclosure.

A schematic flow chart of a method for processing information according to a third embodiment of the present disclosure is shown in FIG. 36. The method for processing information in the present embodiment is applied to a first electronic device which can interact with a second electronic device. More than one array of antennas arranged in parallel are distributed in a body of the first electronic device. A value of a first parameter of each antenna in the array of antennas arranged in parallel is less than or equal to that of a second parameter of the second electronic device. A distance between two adjacent antennas in the array of antennas is less than or equal to a first threshold. As shown in FIG. 3, the method for processing information includes following steps 3601 to 3606.

In step 3601, a first operation is acquired, where the first operation is to place the second electronic device on the body of the first electronic device.

In the embodiments of the present disclosure, the first electronic device is a NFC card reader, and the second electronic device is a NFC tag. NFC antennas are arranged under the screen of the first electronic device, and NFC antennas are arranged inside the second electronic device. The first electronic device can exchange data with the second electronic device through the NFC antennas.

In the embodiment of the present disclosure, more than one array of antennas arranged in parallel are distributed under the screen of the first electronic device, a value of a first parameter of each antenna in the array of antennas is less than or equal to that of a second parameter of the second electronic device, and a distance between two adjacent antennas in the array of antennas arranged in parallel is less than or equal to a first threshold.

Referring to FIG. 42, an array of antennas arranged in parallel is distributed under the screen of the first electronic device. The antennas in the array of antennas each have a stripe shape. The first parameter of the antenna with the stripe shape is the width of the antenna, the value of which is less than or equal to that of the second parameter of the second electronic device, i.e. For example, the second electronic device may be circular, and the width of the antenna with the stripe shape is less than or equal to the radius of the second electronic device. The length of the antennas with the stripe shape is equal to the width or length of the screen. The length of the antenna with the stripe shape is generally less than 40 cm. Once the second electronic device is on the screen, the second electronic device can be read through at least one antenna with the stripe shape. As shown in FIG. 42, tag1 can be read through one antenna, and tag2 can be read through two antennas at the same time. The distance between the two adjacent antennas is less than or equal to a first threshold which is less than or equal to the radius of the second electronic device, such that the case that a tag cannot be read through any one of the antennas can be avoided.

If the size of the first electronic device is larger, two arrays of antennas arranged in parallel as shown in FIG. 43 can be distributed under the screen. As shown in FIG. 43, the lengths of the two antennas with the stripe shape are equal to the length of the screen.

If the second electronic device is placed on the body of the first electronic device, it means that the second electronic device is placed on the screen of the first electronic device.

In step 3602, the antennas in the array of antennas are controlled to be turned on in a predetermined order in response to the first operation.

In the embodiment of the present disclosure, radio frequency switches control the antennas in the array of antennas to be turned on in a predetermined order. The input/output impedance of the radio frequency switch is 50 ohm, and a signal can be transmitted on a coaxial cable, such that the loss is decreased and the long distance transmission of signal can be achieved. And then the ID information of the second electronic device can be obtained through the conducted antenna, referring to following step 3603.

In the above solution, a Personal Computer (PC) can communicate with a Micro Control Unit (MCU) through a Universal Serial Bus (USB) interface. Different instructions are transmitted by the PC to the MCU to control ON/OFF of the radio frequency switch the operation mode of the radio frequency switch. The ON/OFF of the radio frequency switch is controlled by the MCU.

In step 3603, it is judged whether the ID information of the second electronic device is obtained through the antenna which is in the on-state and a judging result is obtained.

In an embodiment of the present disclosure, the antennas in the array of antennas are turned on in a predetermined order, and it is judged for each antenna which is in the on-state whether the ID information of the second electronic device is acquired by the antenna which is in the on-state. Referring to FIG. 42, the ID information of the tag1 can be acquired if antenna 3 is in the on-state, and the ID information of the tag2 can be acquired if the antenna 6 or antenna 7 is in the on-state. While none ID information of the labels can be acquired if the rest of the antennas are in the on-state.

In step 3604, the antenna through which the ID information of the second electronic device is acquired and coordinate information of the antenna is determined based on the judging result.

In the embodiment of the present disclosure, the ID information of the second electronic device can be acquired through an antenna which is in the on-state when the second electronic device is placed on the screen of the first electronic device.

In an embodiment of the present disclosure, the ID information of the second electronic device is used to characterize the attribute of the second electronic device, and the ID information of the second electronic device may be represented by a series of numbers, such as 122331122. The attribute of the second electronic device may be used to characterize that which tag is represented by the second electronic device.

Referring to FIG. 42, the antenna through which the ID information of the tag1 is acquired is antenna 3, and the antenna through which the ID information of the tag2 is acquired is antenna 6 or antenna 7.

In an embodiment of the present disclosure, coordinate information of each antenna is determined in advance. Specifically, the radio frequency switches control the antennas in the array of antennas to be turned on, and the reading/writing scopes of an antenna which is in the on-state is judged using NFC reading/writing attribute. The reading/writing scope is the determined coordinate information of the antenna. Alternatively, the scope right above the antenna can be determined as its coordinate information directly. In this case, the coordinate information of antenna 3 is x=3, and the coordinate information of antenna 6 or antenna 7 is x=6 or x=7 respectively.

In step 3605, a position of the second electronic device relative to the body of the first electronic device is determined based on the coordinate information.

In step 3606, second data is read from the second electronic device or second data is written to the second electronic device based on the ID information and the position of the second electronic device.

In an embodiment of the present disclosure, when the NFC tag is placed on the screen of the NFC card reader, the ID information of the NFC tag can be acquired through at least one of the antennas in the array of antennas, and the position of the NFC tag can be determined through the antenna through which the ID information is acquired, such that the data of the NFC tag can be read/written based on the ID information and the position. Thereby, it is achieved that the NFC tag at anywhere on the screen of the NFC card reader can be identified. That is to say, the ID information of the NFC tag can be acquired stably by all the NFC card readers and the NFC tag can be positioned by the NFC card reader when the NFC tag is placed at anywhere on the screen of the NFC card reader, and thus the seamless identification of the NFC card reader is achieved.

Figure 37:
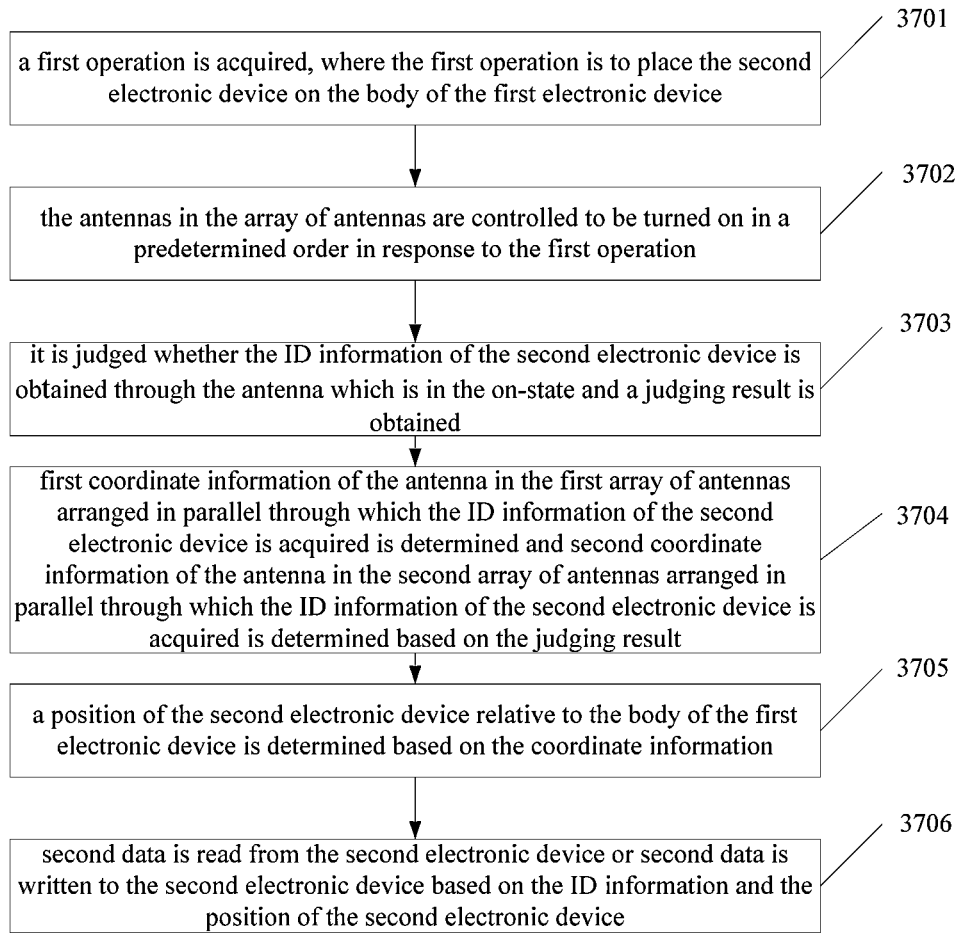
FIG. 37 is a schematic flow chart of a method for processing information according to an embodiment of the disclosure.

A schematic flow chart of a method for processing information according to a fourth embodiment of the present disclosure is shown in FIG. 37. The method for processing information in the present embodiment is applied to a first electronic device which can interact with a second electronic device. Two array of antennas arranged in parallel are distributed in the body of the first electronic device, referring to FIG. 44, with a first array of antennas arranged in parallel and a second array of antennas arranged in parallel being provided perpendicularly in the body in an overlapped pattern. A value of a first parameter of each antenna in the array of antennas arranged in parallel is less than or equal to that of a second parameter of the second electronic device. A distance between two adjacent antennas in the array of antennas arranged in parallel is less than or equal to a first threshold. As shown in FIG. 37, the method for processing information includes following steps 3701 to 3706.

In step 3701, a first operation is acquired, where the first operation is to place the second electronic device on the body of the first electronic device.

In an embodiment of the present disclosure, the first electronic device is a NFC card reader, and the second electronic device is a NFC tag. NFC antennas are arranged under the screen of the first electronic device, and NFC antennas are arranged inside the second electronic device. The first electronic device can exchange data with the second electronic device through the NFC antennas.

In an embodiment of the present disclosure, more than one array of antennas arranged in parallel are distributed under the screen of the first electronic device, a value of a first parameter of each antenna in the array of antennas is less than or equal to that of a second parameter of the second electronic device, and a distance between two adjacent antennas in the array of antennas arranged in parallel is less than or equal to a first threshold.

Figure 44:
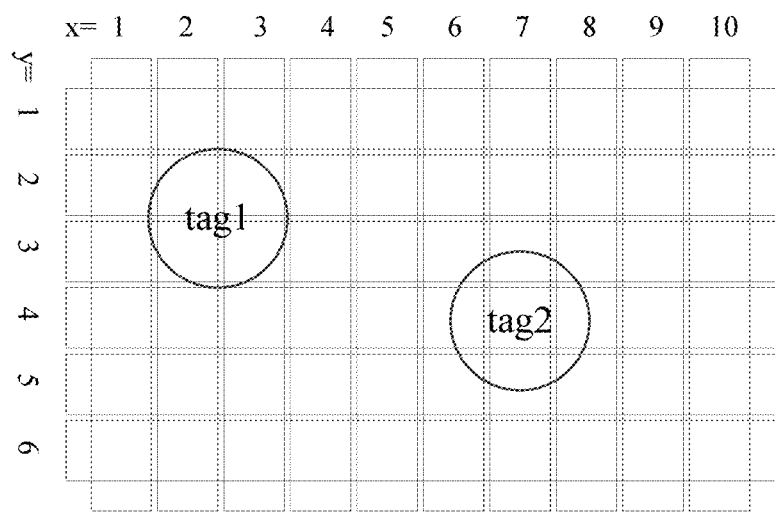
FIG. 44 is a schematic diagram of an array of antennas according to an embodiment of the disclosure.

Referring to FIG. 44, an array of antennas arranged in parallel is distributed under the screen of the first electronic device. The antennas in the array of antennas each have a stripe shape. The first parameter of the antenna with the stripe shape is the width of the antenna, the value of which is less than or equal to that of the second parameter of the second electronic device, i.e. For example, the second electronic device may be circular, and the width of the antenna with the stripe shape is less than or equal to the radius of the second electronic device. The length of the antennas with the stripe shape is equal to the width or length of the screen. The length of the antenna with the stripe shape is generally less than 40 cm. Once the second electronic device is on the screen, the second electronic device can be read through at least one antenna with the stripe shape. As shown in FIG. 44, tag1 can be read through two antennas, and tag2 can be read through four antennas at the same time. The distance between the two adjacent antennas is less than or equal to a first threshold which is less than or equal to the radius of the second electronic device, such that the case that a tag cannot be read through any one of the antennas can be avoided.

If the second electronic device is placed on the body of the first electronic device, it means that the second electronic device is placed on the screen of the first electronic device.

In step 3702, the antennas in the array of antennas are controlled to be turned on in a predetermined order in response to the first operation.

In an embodiment of the present disclosure, radio frequency switches control the antennas in the array of antennas to be turned on in a predetermined order. The input/output impedance of the radio frequency switch is 50 ohm, and a signal can be transmitted on a coaxial cable, such that the loss is decreased and the long distance transmission of signal can be achieved. And then the ID information of the second electronic device can be obtained through the conducted antenna, referring to following step 3703.

In the above solution, a Personal Computer (PC) can communicate with a Micro Control Unit (MCU) through a Universal Serial Bus (USB) interface. Different instructions are transmitted by the PC to the MCU to control ON/OFF of the radio frequency switch the operation mode of the radio frequency switch. The ON/OFF of the radio frequency switch is controlled by the MCU.

In step 3703, it is judged whether the ID information of the second electronic device is obtained through the antenna which is in the on-state and a judging result is obtained.

In an embodiment of the present disclosure, the antennas in the array of antennas are turned on in a predetermined order, and it is judged for each antenna which is in the on-state whether the ID information of the second electronic device is acquired by the antenna which is in the on-state. Referring to FIG. 11, the ID information of the tag1 can be acquired if antenna 2 or antenna 3 in the first array of antennas is in the on-state or antenna 2 or antenna 3 in the second array of antennas is in the on-state, and the ID information of tag2 can be acquired if antenna 7 in the first array of antennas is in the on-state or antenna 4 in the second array of antennas is in the on-state. While none ID information of the tags is acquired if the rest of the antennas are in the on-state.

In step 3704, first coordinate information of the antenna in the first array of antennas arranged in parallel through which the ID information of the second electronic device is acquired is determined and second coordinate information of the antenna in the second array of antennas arranged in parallel through which the ID information of the second electronic device is acquired is determined based on the judging result.

In an embodiment of the present disclosure, the ID information of the second electronic device can be acquired through an antenna which is in the on-state when the second electronic device is placed on the screen of the first electronic device. The ID information of the second electronic device is used to characterize the attribute of the second electronic device, and the ID information of the second electronic device may be represented by a series of numbers, such as 122331122. The attribute of the second electronic device may be used to characterize that which tag is represented by the second electronic device.

Referring to FIG. 44, the antenna through which the ID information of the tag1 is acquired is antenna 2 and antenna 3 in the first array of antennas and antenna 2 and antenna 3 in the second array of antennas; whereas the antenna through which the ID information of the tag2 is acquired is antenna 7 in the first array of antennas and antenna 4 in the second array of antennas.

In an embodiment of the present disclosure, coordinate information of each antenna is determined in advance. Specifically, the radio frequency switches control the antennas in the array of antennas to be turned on, and the reading/writing scopes of an antenna which is in the on-state is judged using NFC reading/writing attribute. The reading/writing scope is the determined coordinate information of the antenna. Alternatively, the scope right above the antenna can be determined as its coordinate information directly. In this case, the coordinate information of antenna 2 and antenna 3 in the first array of antennas is x=2 and x=3; the coordinate information of antenna 2 and antenna 3 in the second array of antennas is y=2 and y=3; the coordinate information of antenna 7 in the first array of antennas is x=7; and the coordinate information of antenna 4 in the second array of antennas is y=4.

In step 3705, a position of the second electronic device relative to the body of the first electronic device is determined based on the coordinate information.

Specifically, the position of the second electronic device relative to the body of the first electronic device is determined based on the first coordinate information and the second coordinate information.

Referring to FIG. 44, the position of tag1 relative to the body of the first electronic device can be determined based on horizontal axis x=2 and x=3 and vertical axis y=2 and y=3; and the position of tag2 relative to the body of the first electronic device can be determined based on horizontal axis x7 and vertical axis y=4.

In step 3706, second data is read from the second electronic device or second data is written to the second electronic device based on the ID information and the position of the second electronic device.

In an embodiment of the present disclosure, when the NFC tag is placed on the screen of the NFC card reader, the ID information of the NFC tag can be acquired through at least one of the antennas in the array of antennas, and the position of the NFC tag can be determined through the antenna through which the ID information is acquired, such that the data of the NFC tag can be read/written based on the ID information and the position. Thereby, it is achieved that the NFC label at anywhere on the screen of the NFC card reader can be identified. That is to say, the ID information of the NFC tag can be acquired stably by all the NFC card readers and the NFC tag can be positioned by the NFC card reader when the NFC tag is placed at anywhere on the screen of the NFC card reader, and thus the seamless identification of the NFC card reader is achieved.

Figure 38:
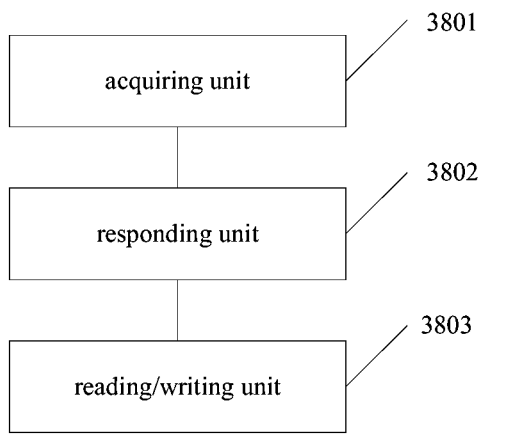
FIG. 38 is a schematic constitutional diagram of an electronic device according to an embodiment of the disclosure.

A schematic constitutional diagram of an electronic device according to a first embodiment of the present disclosure is shown in FIG. 38. The electronic device can interact with a second electronic device. More than one array of antennas arranged in parallel are distributed in a body of the electronic device. A value of a first parameter of each antenna in the array of antennas arranged in parallel is less than or equal to that of a second parameter of the second electronic device. A distance between two adjacent antennas in the array of antennas arranged in parallel is less than or equal to a first threshold. The electronic device includes an acquiring unit 3801, a responding unit 3802 and a reading/writing unit 3803.

The obtaining unit 3801 is configured to acquire a first operation to place the second electronic device on the body of the first electronic device.

The responding unit 3802 is configured to acquire information of the second electronic device through at least one of the antennas in the array of antennas in response to the first operation.

The reading/writing unit 3803 is configured to read second data from the second electronic device or write second data to the second electronic device based on the ID information of the second electronic device.

It should be understood by those skilled in the art that a function realized by each unit in the electronic device in the embodiments of the present disclosure may be understood with reference to a description for the information processing method described above. Function of each unit of the electronic devices in the embodiments of the present disclosure may be implemented through programs running on a processor, and also may be implemented through a specific logic circuit.

Figure 39:
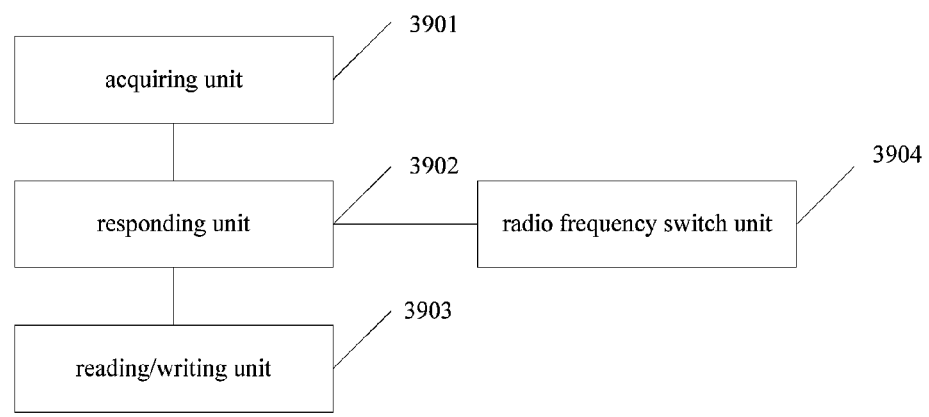
FIG. 39 is a schematic constitutional diagram of an electronic device according to an embodiment of the disclosure.

A schematic constitutional diagram of an electronic device according to a second embodiment of the present disclosure is shown in FIG. 39. The electronic device can interact with a second electronic device. More than one array of antennas arranged in parallel are distributed in a body of the electronic device. A value of a first parameter of each antenna in the array of antennas arranged in parallel is less than or equal to that of a second parameter of the second electronic device. A distance between two adjacent antennas in the array of antennas arranged in parallel is less than or equal to a first threshold. The electronic device includes an obtaining unit 3901, a responding unit 3902 and a reading/writing unit 3903.

The obtaining unit 3901 is configured to acquire a first operation to place the second electronic device on the body of the first electronic device.

The responding unit 3902 is configured to acquire information of the second electronic device through at least one of the antennas in the array of antennas in response to the first operation.

The reading/writing unit 3903 is configured to read second data from the second electronic device or write second data to the second electronic device based on the ID information of the second electronic device.

Preferably, the electronic device may further include a radio frequency switch unit 3904.

The radio frequency switch unit 3904 is configured to control antennas in the array of antennas to be turned on in a predetermined order.

The responding unit 3902 is further configured to acquire the ID information of the second electronic device through the antenna which is in the on-state, where the ID information of the second electronic device can be acquired through at least one of the antennas in the array of antennas.

It should be understood by those skilled in the art that a function realized by each unit in the electronic device in the embodiments of the present disclosure may be understood with reference to a description for the method for processing information described above. Function of each unit of the electronic devices in the embodiments of the present disclosure may be implemented through programs running on a processor, and also may be implemented through a specific logic circuit.

Figure 40:
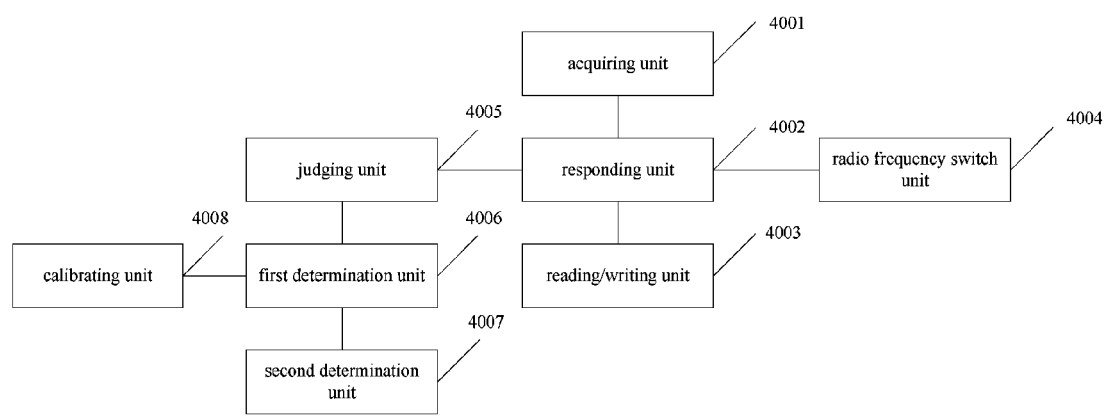
FIG. 40 is a schematic constitutional diagram of an electronic device according to an embodiment of the disclosure.

A schematic constitutional diagram of an electronic device according to a third embodiment of the present disclosure is shown in FIG. 40. The electronic device can interact with a second electronic device. More than one array of antennas arranged in parallel are distributed in a body of the electronic device. A value of a first parameter of each antenna in the array of antennas arranged in parallel is less than or equal to that of a second parameter of the second electronic device. A distance between two adjacent antennas in the array of antennas arranged in parallel is less than or equal to a first threshold. The electronic device includes an acquiring unit 4001, a responding unit 4002 and a reading/writing unit 4003.

The acquiring unit 4001 is configured to acquire a first operation to place the second electronic device on the body of the first electronic device.

The responding unit 4002 is configured to acquire information of the second electronic device through at least one of the antennas in the array of antennas in response to the first operation.

The reading/writing unit 4003 is configured to read second data from the second electronic device or write second data to the second electronic device based on the ID information of the second electronic device.

Preferably, the electronic device may further include a radio frequency switch unit 4004.

The radio frequency switch unit 4004 is configured to control antennas in the array of antennas to be turned on in a predetermined order.

The responding unit 4002 is further configured to acquire the ID information of the second electronic device through the antenna which is in the on-state, where the ID information of the second electronic device can be acquired through at least one of the antennas in the array of antennas.

Preferably, the electronic device may further include: a judging unit 4005, a first determination unit 4006 and a second determination unit 4007.

The judging unit 4005 is configured to judge whether the ID information of the second electronic device is acquired by the antenna which is in the on-state and obtain a judging result.

The first determination unit 4006 is configured to determine the antenna through which the ID information of the second electronic device is acquired and coordinate information of the antenna based on the judging result.

The second determination unit 4007 is configured to determine a position of the second electronic device relative to the body of the first electronic device.

Preferably, the electronic device may further include a calibrating unit 4008, which is configured to determine the coordinate information of each antenna in advance.

It should be understood by those skilled in the art that a function realized by each unit in the electronic device in the embodiments of the present disclosure may be understood with reference to a description for the method for processing information described above. Function of each unit of the electronic devices in the embodiments of the present disclosure may be implemented through programs running on a processor, and also may be implemented through a specific logic circuit.

Figure 41:
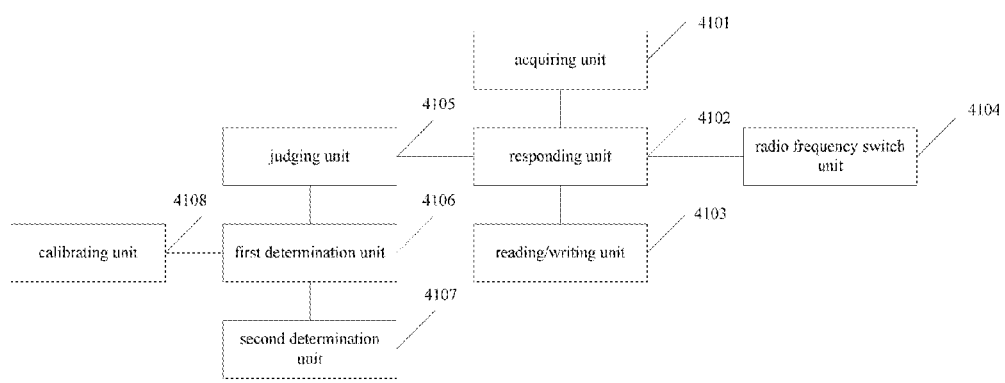
FIG. 41 is a schematic constitutional diagram an electronic device according to an embodiment of the disclosure.

A schematic constitutional diagram of an electronic device according to a fourth embodiment of the present disclosure is shown in FIG. 41. The electronic device can interact with a second electronic device. Two array of antennas arranged in parallel are distributed in the body of the first electronic device, where a first array of antennas arranged in parallel and a second array of antennas arranged in parallel are provided perpendicularly in the body in an overlapped pattern. A value of a first parameter of each antenna in the array of antennas arranged in parallel is less than or equal to that of a second parameter of the second electronic device. A distance between two adjacent antennas in the array of antennas arranged in parallel is less than or equal to a first threshold. The electronic device includes an acquiring unit 4101, a responding unit 4102 and a reading/writing unit 4103.

The acquiring unit 4101 is configured to acquire a first operation to place the second electronic device on the body of the first electronic device.

The responding unit 4102 is configured to acquire information of the second electronic device through at least one of the antennas in the array of antennas in response to the first operation.

The reading/writing unit 4103 is configured to read second data from the second electronic device or write the second data to the second electronic device based on the ID information of the second electronic device.

Preferably, the electronic device may further include a radio frequency switch unit 84.

The radio frequency switch unit 4104 is configured to control antennas in the array of antennas to be turned on in a predetermined order.

The responding unit 4102 is further configured to acquire the ID information of the second electronic device through the antenna which is in the on-state, where the ID information of the second electronic device can be acquired through at least one of the antennas in the array of antennas.

Preferably, the electronic device may further include: a judging unit 4105, a first determination unit 4106 and a second determination unit 4107.

The judging unit 4105 is configured to judge whether the ID information of the second electronic device is acquired by the antenna which is in the on-state and obtain a judging result.

The first determination unit 4106 is configured to determine the antenna through which the ID information of the second electronic device is acquired and coordinate information of the antenna based on the judging result.

The second determination unit 4107 is configured to determine a position of the second electronic device relative to the body of the first electronic device.

Preferably, the electronic device may further include a calibrating unit 4108, which is configured to determine the coordinate information of each antenna in advance.

Preferably, the first determination unit 4106 is further configured to determine first coordinate information of the antenna in the first array of antennas arranged in parallel through which the ID information of the second electronic device is acquired and determine second coordinate information of the antenna in the second array of antennas arranged in parallel through which the ID information of the second electronic device is acquired based on the judging result.

The second determination unit 4107 is further configured to determine a position of the second electronic device relative to the body of the first electronic device based on the first coordinate information and the second coordinate information.

It should be understood in the embodiments provided in the disclosure that the disclosed device and method may be implemented in other way. The device embodiments described above are only illustrative. For example, the division of the unit is only a logical function division, and other divisions may be implemented in practice. For example, multiple units or components may be combined or may be integrated into another system, or some features may be omitted or not performed. Further, the coupling, direct coupling or communication connection between the illustrated or discussed components may be indirect coupling or communication connection between the devices or units via some interfaces, and may be electrical, mechanical or other form.

The units illustrated as separated components may be or may be not separate physically. The components illustrated as a unit may be or may be not a physical unit, that is to say, may be located in one place and may also be distributed on multiple network units. And some or all of the units may be selected as required for implementing the solution of the embodiment of the disclosure.

Further, the functional units in the embodiment of the disclosure may each be integrated in one processing module, may each be set as a separate unit, and may also be integrated in one unit by two or more. The integrated unit may be implemented in hardware, and may also be implemented in hardware and software.

It can be understood by those skilled in the art that all or some of the steps for implementing the above method embodiment may be implemented in hardware related to program instructions. The program may be stored in a computer readable storage medium, which when executed performs the steps of the above method embodiment. The above storage medium includes various medium for storing program code, such as removable storage device, Read-Only Memory (ROM), Random Access Memory (RAM), magnetic disk or optical disk.

The above are only specific embodiment of the disclosure, and the scope of protection of the disclosure is not limited thereto. Changes or alternations can be conceived by those skilled in the art within the disclosed technical scope of the disclosure, which changes or alternations fall within the scope of protection of the disclosure. Thus, the scope of protection of the disclosure is subjected to the scope of protection of the claims.

The invention claimed is:

1. A method for processing information, applicable to a first electronic device, comprising:
   sending a first instruction to a second electronic device through a radio frequency identification unit to inquire identification information of the second electronic device;
   acquiring the identification information of the second electronic device; and
   obtaining position information of the second electronic device according to the identification information of the second electronic device;
   wherein the first electronic device comprises N coil antennas, N is a positive integer, obtaining position information of the second electronic device comprises:
   determining a recognition region of each of the N coil antennas corresponding to a recognizable region on a display unit of the first electronic device to obtain N recognition regions;
   determining M coil antennas having an ability of detecting the second electronic device among the N coil antennas when the second electronic device is positioned on the display unit, where M is an integer less than or equal to N;
   obtaining M recognition regions of the M coil antennas from the N recognition regions; and
   obtaining the position information of the second electronic device on the display unit based on the M recognition regions;
   or
   wherein the second electronic device comprises more than two metal contacts, any two metal contacts of the more than two metal contacts are connected via a wire, obtaining position information of the second electronic device comprises:
   detecting an effective contact of the more than two metal contacts by a display unit;
   calculating coordinate information of the effective contact based on current information of the effective contact; and
   determining coordinate information of the second electronic device based on the coordinate information of the effective contact;
   or
   wherein more than one array of antennas arranged in parallel are distributed in the first electronic device, receiving identification information of the second electronic device comprises:
   controlling antennas in the array of antennas to be in a on-state turn; and
   obtaining the identification information of the second electronic device through the antenna which is in the on-state;
   wherein obtaining position information of the second electronic device according to the identification information of the second electronic device comprises:
   judging whether the identification information of the second electronic device is obtained through the conducted antenna and obtaining a judging result;

determining the antenna through which the identification information of the second electronic device is obtained and coordinate information of the antenna based on the judging result; and determining a position of the second electronic device relative to the first electronic device based on the coordinate information.

2. The method according to claim 1, wherein obtaining position information of the second electronic device from the identification information sent by the second electronic device comprises:

generating a second instruction based on the identification information of the second electronic device;

sending the second instruction to the second electronic device through a first radio frequency identification unit;

receiving, by the second electronic device, and activating a second positioning unit according to the identification information of the second electronic device comprised in the second instruction;

obtaining position information of the second positioning unit; and setting the position information of the second positioning unit as the position information of the second electronic device.

3. The method according to claim 1, determining recognition region of each of the N coil antennas corresponding to the recognizable region on the display unit of the first electronic device to obtain the N recognition regions comprises:

for i being a value from 1 to N in turn, controlling an $i^{th}$ coil antenna of the N coil antennas to be in a on-state, and controlling N−1 coil antennas of the N coil antennas other than the $i^{th}$ coil antenna to be in a off-state, where i is an positive integer less than or equal to N;

determining an $i^{th}$ recognition region of the $i^{th}$ coil antenna corresponding to an $i^{th}$ recognizable region among recognizable regions on the display unit when the $i^{th}$ coil antenna is in the on-state; and obtaining the N recognition regions when i is equal to N.

4. The method according to claim 1, determining recognition region of each of the N coil antennas corresponding to the recognizable region on the display unit of the first electronic device to obtain the N recognition regions comprises:

for i being a value from 1 to N in turn, determining a position of the $i^{th}$ coil antenna of the N coil antennas on the display unit right above the $i^{th}$ coil antenna as an $i^{th}$ recognition region of the $i^{th}$ coil antenna corresponding to an $i^{th}$ recognizable region, to obtain the N recognition regions.

5. The method according to claim 3, wherein determining M coil antennas having an ability of detecting the second electronic device among the N coil antennas when the second electronic device is positioned on the display unit comprises:

for i being a value from 1 to N in turn, controlling an $i^{th}$ coil antenna of the N coil antennas to be in a on-state, and controlling N−1 coil antennas of the N coil antennas other than the $i^{th}$ coil antenna to be in an off-state;

determining the $i^{th}$ coil antenna as one of the M coil antennas if the $i^{th}$ coil antenna is in the on-state and has the ability of detecting the second electronic device; and obtaining the M coil antennas when i is equal to N.

6. The method according to claim 5, wherein the $i^{th}$ coil antenna comprises a first part overlapping with a $j^{th}$ coil antenna and a second part other than the first part, and wherein the $j^{th}$ coil antenna is a coil antenna partly overlapping with the $i^{th}$ coil antenna, where j is a positive integer less than or equal to N.

7. The method according to claim 6, wherein after determining the $i^{th}$ coil antenna as one of the M coil antennas, the method further comprises:

for j being a value from i+1 to N in turn, determining whether an $j^{th}$ coil antenna has the ability of detecting the second electronic device and obtaining a first determination result;

determining a first part position corresponding to the first part as the position of the second electronic device if the first determination result indicates that the $j^{th}$ coil antenna has the ability of detecting the second electronic device; or determining a second part position corresponding to the second part as the position of the second electronic device if the first determination result indicates that the $j^{th}$ coil antenna does not have the ability of detecting the second electronic device.

8. The method according to claim 1, wherein detecting an effective contact of the more than two metal contacts by a display unit comprises:

detecting, by the display unit, whether a current flows between any two metal contacts of the more than two metal contacts, to obtain a detection result; and determining, in a case that the detection result indicates that the current flows between any two metal contacts of the more than two metal contacts, that a contact having a high voltage is the effective contact.

9. The method according to claim 8, wherein the display unit comprises a conducting layer, and the conducting layer comprises a cluster of horizontal electrodes and a cluster of vertical electrodes, voltages between any two electrodes of each cluster of horizontal electrodes and each cluster of vertical electrodes are different; detecting, by the display unit, whether the current flows between any two metal contacts of the more than two metal contacts, to obtain a detection result comprises:

judging, by the display unit, whether any two metal contacts of the more than two metal contacts come into contact with different electrodes, to obtain a judgment result; and determining, in a case that the judgment result indicates that any two metal contacts of the more than two metal contacts come into contact with the different electrodes, that the current flows between the any two metal contacts of the more than two metal contacts.

10. The method according to claim 1, wherein two arrays of antennas arranged in parallel are distributed in the first electronic device, with a first array of antennas arranged in parallel and a second array of antennas arranged in parallel being provided perpendicularly in an overlapped manner, determining the antenna through which the identification information of the second electronic device is obtained and coordinate information of the antenna based on the judging result comprises:

determining first coordinate information of the antenna in the first array of antennas arranged in parallel through which the identification information of the second electronic device is obtained and determining second coordinate information of the antenna in the second array of antennas arranged in parallel through which the identification information of the second electronic device is obtained based on the judging result.

11. The method according to claim 10, determining a position of the second electronic device relative to the first electronic device based on the coordinate information comprises:
    determining the position of the second electronic device relative to the first electronic device based on the first coordinate information and the second coordinate information.

12. An electronic device, comprising: a radio frequency identification unit, one or more processors and memory having instructions stored thereon, the instructions, when executed by the one or more processors, cause the processors to perform operations comprising:
    pre-establishing an association between identification information of a second electronic device and position information of the second electronic device;
    sending a first instruction to the second electronic device through the radio frequency identification unit to inquire the identification information of the second electronic device;
    acquiring the identification information of the second electronic device; and
    obtaining the position information of the second electronic device according to the identification information of the second electronic device and the association between the identification information of the second electronic device and the position information of the second electronic device.

13. The electronic device according to claim 12, wherein the processors perform operations comprising:
    generating a second instruction based on the identification information of the second electronic device;
    sending the second instruction to the second electronic device through a first radio frequency identification unit;
    receiving, by the second electronic device, and activating a second positioning unit according to the identification information of the second electronic device comprised in the second instruction;
    obtaining position information of the second positioning unit;
    setting the position information of the second positioning unit as the position information of the second electronic device; and
    establishing the association between the identification information of the second electronic device and the position information of the second electronic device.

14. The electronic device according to claim 12, wherein in the case that the electronic device comprises N coil antennas, N is a positive integer, the processors perform operations comprising:
    determining a recognition region of each of the N coil antennas corresponding to a recognizable region on a display unit of the electronic device to obtain N recognition regions;
    determining M coil antennas having an ability of detecting the second electronic device among the N coil antennas when the second electronic device is positioned on the display unit, where M is an integer less than or equal to N;
    obtaining M recognition regions of the M coil antennas from the N recognition regions;
    obtaining the position information of the second electronic device on the display unit based on the M recognition regions; and
    establishing the association between the identification information of the second electronic device and the position information of the second electronic device.

15. The electronic device according to claim 14, wherein the processors perform operations comprising:
    for i being a value from 1 to N in turn, controlling an $i^{th}$ coil antenna of the N coil antennas to be in a on-state, and controlling N−1 coil antennas of the N coil antennas other than the $i^{th}$ coil antenna to be in a off-state, where i is an positive integer less than or equal to N;
    determining an $i^{th}$ recognition region of the $i^{th}$ coil antenna corresponding to an $i^{th}$ recognizable region among recognizable regions on the display unit when the $i^{th}$ coil antenna is in the on-state; and
    obtaining the N recognition regions when i is equal to N.

16. The electronic device according to claim 14, wherein the processors perform operations comprising:
    for i being a value from 1 to N in turn, determining a position of the $i^{th}$ coil antenna of the N coil antennas on the display unit right above the $i^{th}$ coil antenna as an $i^{th}$ recognition region of the $i^{th}$ coil antenna corresponding to an $i^{th}$ recognizable region, to obtain the N recognition regions.

17. The electronic device according to claim 14, wherein in the case that the second electronic device comprises more than two metal contacts, any two metal contacts of the more than two metal contacts are connected via a wire, the processors perform operations comprising:
    detecting an effective contact of the more than two metal contacts by a display unit;
    calculating coordinate information of the effective contact based on current information of the effective contact;
    determining coordinate information of the second electronic device based on the coordinate information of the effective contact; and
    establishing the association between the identification information of the second electronic device and the coordinate information of the second electronic device.

18. The electronic device according to claim 17, wherein the processors perform operations comprising:
    detecting, by the display unit, whether a current flows between any two metal contacts of the more than two metal contacts, to obtain a detection result; and
    determining, in a case that the detection result indicates that the current flows between any two metal contacts of the more than two metal contacts, that a contact having a high voltage is the effective contact.

19. The electronic device according to claim 18, wherein in the case that the display unit comprises a conducting layer, and the conducting layer comprises a cluster of horizontal electrodes and a cluster of vertical electrodes, voltages between any two electrodes of each cluster of horizontal electrodes and each cluster of vertical electrodes are different, the processors perform operations comprising:
    judging, by the display unit, whether any two metal contacts of the more than two metal contacts come into contact with different electrodes, to obtain a judgment result; and
    determining, in a case that the judgment result indicates that any two metal contacts of the more than two metal contacts come into contact with the different electrodes, that the current flows between the any two metal contacts of the more than two metal contacts.

20. The electronic device according to claim 14, wherein in the case that more than one array of antennas arranged in parallel are distributed in the first electronic device, the processors perform operations comprising:

receiving the identification information of the second electronic device through at least one of the antennas in the array of antennas.

21. The electronic device according to claim 20, wherein the processors perform operations comprising:
   judging whether the identification information of the second electronic device is obtained through the conducted antenna and obtaining a judging result;
   determining the antenna through which the identification information of the second electronic device is obtained and coordinate information of the antenna based on the judging result;
   determining a position of the second electronic device relative to the electronic device based on the coordinate information; and
establishing the association between the identification information of the second electronic device and the position information of the second electronic device.

22. The electronic device according to claim 21, wherein in the case that two arrays of antennas arranged in parallel are distributed in the electronic device, with a first array of antennas arranged in parallel and a second array of antennas arranged in parallel being provided perpendicularly in an overlapped manner, the processors perform operations comprising:
   determining first coordinate information of the antenna in the first array of antennas arranged in parallel through which the identification information of the second electronic device is obtained and determining second coordinate information of the antenna in the second array of antennas arranged in parallel through which the identification information of the second electronic device is obtained based on the judging result.

* * * * *